(12) United States Patent
Kim et al.

(10) Patent No.: US 10,048,530 B1
(45) Date of Patent: Aug. 14, 2018

(54) DISPLAY DEVICE AND METHOD OF MANUFACTURING THE SAME

(71) Applicant: Samsung Display Co., Ltd., Yongin-si (KR)

(72) Inventors: Min Uk Kim, Daejeon (KR); Eun Ae Kwak, Gunpo-si (KR); Sung Man Kim, Seoul (KR); Jun Ho Song, Seongnam-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 15/871,551

(22) Filed: Jan. 15, 2018

(30) Foreign Application Priority Data

Jul. 27, 2017 (KR) .......................... 10-2017-0095072

(51) Int. Cl.
*G02F 1/1335* (2006.01)

(52) U.S. Cl.
CPC .. *G02F 1/133514* (2013.01); *G02F 1/133512* (2013.01)

(58) Field of Classification Search
CPC ................ G02F 1/133514; G02F 1/133512
See application file for complete search history.

(56) References Cited

U.S. PATENT DOCUMENTS

| 2006/0210708 A1 | 9/2006 | Roh |
| 2015/0362776 A1 | 12/2015 | Jikumaru et al. |
| 2016/0370646 A1 | 12/2016 | Nishiyama et al. |

FOREIGN PATENT DOCUMENTS

| JP | 2016-027374 | 2/2016 |
| KR | 10-2007-0076286 | 7/2007 |
| KR | 10-2007-0077677 | 7/2007 |
| WO | 2014/203794 | 12/2014 |

*Primary Examiner* — Joseph L Williams
(74) *Attorney, Agent, or Firm* — H.C. Park & Associates, PLC

(57) ABSTRACT

A display device may include: a substrate; a transparent partition wall disposed on the substrate, the transparent partition configured to define a plurality of openings; a light-shielding member disposed on a top surface and side surfaces of the transparent partition wall, the light-shielding member including a negative photosensitive organic material; and a first color conversion pattern disposed in at least on of the plurality of openings, the first color conversion pattern including a quantum dot material or a fluorescent material.

35 Claims, 84 Drawing Sheets light developing light developing ized Korean Patent Application No. 10-2017-0095072, filed on

DISPLAY DEVICE AND METHOD OF MANUFACTURING THE SAME

CROSS-REFERENCE TO RELATED APPLICATION

This application claims priority from and the benefit of Korean Patent Application No. 10-2017-0095072, filed on Jul. 27, 2017, which is hereby incorporated by reference for all purposes as if fully set forth herein.

BACKGROUND

Field

Exemplary embodiments relate to a display device and a method of manufacturing the same.

Discussion of the Background

With the development of multimedia, display devices are becoming increasingly important. Accordingly, various display devices such as liquid crystal displays (LCDs) and organic light-emitting diode displays (OLEDs) are being developed.

In particular, an LCD includes a display panel which includes field generating electrodes, such as pixel electrodes and a common electrode, and a liquid crystal layer and a light source unit which provides light to the display panel. The LCD rearranges liquid crystals by applying voltages to the field generating electrodes, thereby controlling the amount of light that passes through the liquid crystal layer in each pixel. Accordingly, an image is displayed on the LCD.

As one way to make each pixel uniquely display one primary color, a color conversion pattern may be placed in each pixel on a light path from a light source to a viewer. For example, a color filter may realize a primary color by absorbing a specific wavelength band of incident light and transmitting only another specific wavelength band. Meanwhile, it is required to develop a method for further improving the color purity of a display device.

A wavelength shift material such as a quantum dot or a fluorescent material shifts a peak wavelength of incident light to emit light having a color different from that of the incident light. That is, a color conversion pattern can be implemented using the wavelength shift material. However, if light emitted by the wavelength shift material travels to another adjacent pixel, a defect in which light leaks from an unintended pixel, that is, a light leakage defect may occur.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a display device having improved display quality.

Exemplary embodiments also provide a method of manufacturing a display device having improved display quality.

Additional aspects will be set forth in the detailed description which follows, and, in part, will be apparent from the disclosure, or may be learned by practice of the inventive concept.

According to exemplary embodiments, a display device may include: a substrate; a transparent partition wall disposed on the substrate, the transparent partition wall configured to define a plurality of openings; a light-shielding member disposed on a top surface and side surfaces of the transparent partition wall, the light-shielding member including a negative photosensitive organic material; and a first color conversion pattern disposed in at least on of the plurality of openings, the first color conversion pattern including a quantum dot material or a fluorescent material.

The transparent partition wall may include: a plurality of first partition wall portions extending in a first direction; and a plurality of second partition wall portions extending in a second direction intersecting the first direction, wherein the openings may be defined by the first partition wall portions and the second partition wall portions, and the light-shielding member has a lattice shape in plan view.

A surface of the light-shielding member disposed on the top surface of the transparent partition wall may have a hydrophobicity greater than that of a surface of the light-shielding member disposed on the side surfaces of the transparent partition wall.

The light-shielding member disposed on the top surface of the transparent partition wall may have a thickness greater than that of the light-shielding member disposed on the side surfaces of the transparent partition wall.

The light-shielding member disposed on the top surface of the transparent partition wall may have a thickness of about 1.3 μm or more and an optical density of about 2.0/1.3 μm or more.

The light-shielding member may be disposed directly on the transparent partition wall, the light-shielding member including: a first surface, at least a part of the first surface directly contacting the transparent partition wall; and a second surface facing opposite to the first surface, wherein the roughness of the second surface may be greater than that of the first surface.

The light-shielding member may further include: a third surface connecting the first surface and the second surface, wherein the roughness of the second surface may be greater than that of the third surface.

The transparent partition wall may have a light transmittance of about 90% or more.

The transparent partition wall may include particles dispersed therein.

The side surfaces of the transparent partition wall may be inclined at an average inclination angle with respect to a surface of the substrate, wherein the transparent partition wall may have a height of about 7.0 μm or more, and wherein the average inclination angle may be about 30 to 85 degrees.

The display device may including: a first pixel configured to display a first color; a second pixel configured to display a second color having a shorter peak wavelength than the first color; a third pixel configured to display a third color having a shorter peak wavelength than the second color are defined, wherein the display device may further include: a liquid crystal layer disposed on the first color conversion pattern; a wavelength band filter disposed between the first color conversion pattern and the liquid crystal layer, the wavelength band filter is configured to selectively transmit light having a wavelength band including the peak wavelength of the third color, and selectively block light having a wavelength band including a peak wavelength longer than the peak wavelength of the third color; and a light source disposed on the liquid crystal layer, the light source configured to provide light of the third color, wherein the first color conversion pattern is disposed in the first pixel, the first color conversion pattern is configured to convert a color of incident light into the first color, and wherein at least a part of the wavelength band filter may directly contact the light-shielding member.

At least a part of the wavelength band filter may directly contact the first color conversion pattern and the light-shielding member, the wavelength band filter having a substantially constant thickness.

The display device may further include: a second color conversion pattern disposed in the second pixel; and a light transmission pattern disposed in the third pixel, wherein the second color conversion pattern is configured to convert a color of incident light into the second color, wherein the light-shielding member may be interposed between the first color conversion pattern and the second color conversion pattern, and wherein the light-shielding to member is interposed between the first color conversion pattern and the light transmission pattern.

The display device including: a first pixel configured to display a first color; a second pixel configured to display a second color having a shorter peak wavelength than the first color; and a third pixel configured to display a third color having a shorter peak wavelength than the second color are defined, wherein the display device may further include: a liquid crystal layer disposed on the first color conversion pattern; a light source disposed on the liquid crystal layer, the light source configured to provide light of the third color; and a wavelength band filter disposed between the light-shielding member and the first color conversion pattern, the wavelength band filter is configured to selectively transmit light having a wavelength band including a peak wavelength longer than the peak wavelength of the third color, and selectively block light having a wavelength band including the peak wavelength of the third color, wherein at least a part of the wavelength band filter may be disposed on the top surface of the transparent partition wall.

The display device may further include: a wavelength band filter disposed between the light-shielding member and the first color conversion pattern, the wavelength band filter is configured to selectively transmit light of a specific wavelength band, wherein the wavelength band filter does not overlap the top surface of the transparent partition wall, and wherein at least a part of the first color conversion pattern directly contacts the light-shielding member.

The display device may further include a wavelength band filter disposed between the substrate and the transparent partition wall, the wavelength band filter is configured to selectively transmit light of a specific wavelength band.

The display device may further include an opaque material pattern disposed between the wavelength band filter and the transparent partition wall, the opaque material pattern including a different material from the light-shielding member.

The display device may further include: a wavelength band filter disposed between the substrate and the first color conversion pattern, the wavelength band filter is configured to selectively transmit light of a specific wavelength band; and an opaque material pattern disposed between the substrate and the light-shielding member, the opaque material pattern including a different material from the light-shielding member.

The display device may further include: a wavelength band filter disposed between the substrate and the first color conversion pattern, the wavelength band filter is configured to selectively transmit light of a specific wavelength band; and an opaque material pattern disposed between the substrate and the transparent partition wall, the opaque material pattern including a different material from the light-shielding member.

The display device may further include: a first light-transmitting layer disposed on the light-shielding member to surround at least parts of the light-shielding member; and a second light-transmitting layer disposed directly on the first light-transmitting layer to surround at least parts of the first light-transmitting layer, wherein a refractive index of the second light-transmitting layer may be greater than that of the first light-transmitting layer.

The display device may further include: a first light-transmitting layer disposed on the top surface and the side surfaces of the transparent partition wall to surround at least parts of the transparent partition wall; and a second light-transmitting layer disposed between the first light-transmitting layer and the light-shielding member to surround at least parts of the first light-transmitting layer, wherein a refractive index of the second light-transmitting layer may be greater than that of the first light-transmitting layer.

According to exemplary embodiments, a method of manufacturing a display device may include: disposing a partition wall pattern having translucency and an opaque material pattern on a first surface of a substrate; applying a light-shielding member forming composition onto the partition wall pattern and the opaque material pattern; and forming a light-shielding member on a top surface and side surfaces of the partition wall pattern by radiating light from a second surface of the substrate, using the opaque material pattern as a light-shielding mask.

The disposing of the partition wall pattern and the opaque material pattern may include: disposing the opaque material pattern on the first surface of the substrate such that at least a part of the first surface of the substrate is exposed; and disposing the partition wall pattern on the exposed first surface of the substrate.

The disposing of the opaque material pattern may include: disposing an opaque material layer on the first surface of the substrate; disposing a positive photosensitive layer on the opaque material layer; forming a positive photosensitive pattern layer using a mask as a light-shielding mask; and forming the opaque material pattern by partially etching the opaque material layer using the positive photosensitive pattern layer as an etch mask, wherein the disposing of the partition wall pattern may include: disposing a negative photosensitive layer on the opaque material pattern; and forming the partition wall pattern using the mask as a light-shielding mask.

At least a part of the partition wall pattern may overlap the opaque material pattern.

The partition wall pattern may be separated from the opaque material pattern, and wherein at least a part of the first surface of the substrate may be exposed without being covered by the partition wall pattern and the opaque material pattern.

The applying of the light-shielding member forming composition includes disposing the light-shielding member forming composition in a space between the partition wall pattern and the opaque material pattern, and wherein at least a part of the light-shielding member may directly contact the substrate.

The applying of the light-shielding member forming composition may include disposing the light-shielding member forming composition to have a thickness greater than a height of the partition wall pattern.

The method of manufacturing a display device may further include: treating the entire surface of the applied light-shielding member forming composition with fluorine after the applying of the light-shielding member forming composition.

The method of manufacturing a display device may further include: forming a recessed and protruding pattern layer on the surface of the uncured light-shielding member forming composition and on a surface of the light-shielding member formed on the top surface of the partition wall pattern after radiating light.

The method of manufacturing a display device may further include: disposing a wavelength band filter pattern on the first surface of the substrate before the disposing of the partition wall pattern and the opaque material pattern, wherein the opaque material pattern may be formed on the wavelength band filter pattern to overlap the wavelength band filter pattern, and wherein the opaque material pattern may be narrower than the wavelength band filter pattern.

The disposing of the partition wall pattern and the opaque material pattern may include: disposing the partition wall pattern on the first surface of the substrate such that at least a part of the first surface of the substrate is exposed; and disposing the opaque material pattern on the part of the first surface of the substrate exposed by the partition wall pattern.

At least a part of the opaque material pattern overlaps the partition wall pattern.

The method of manufacturing a display device may further include, after the forming of the light-shielding member: exposing at least a part of the first surface of the substrate by removing at least a part of the opaque material pattern; disposing an ink composition onto the exposed first surface of the substrate, the ink composition containing a wavelength shift material; and curing the ink composition.

The forming of the light-shielding member may include: prebaking the light-shielding member forming composition; partially photo-curing the prebaked light-shielding member forming composition by using the opaque material pattern as a light-shielding mask; developing the light-shielding member disposed on the top surface and the side surfaces of the partition wall pattern by applying a developer onto the partially photo-cured light-shielding member forming composition; and hard-baking the light-shielding member, wherein the partially photo-curing of the prebaked light-shielding member forming composition may include: radiating light from the second surface of the substrate; transmitting the light through the substrate; transmitting the light through the partition wall pattern; transmitting the light through the top surface of the partition wall pattern; and transmitting the light through the side surfaces of the partition wall pattern.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1:
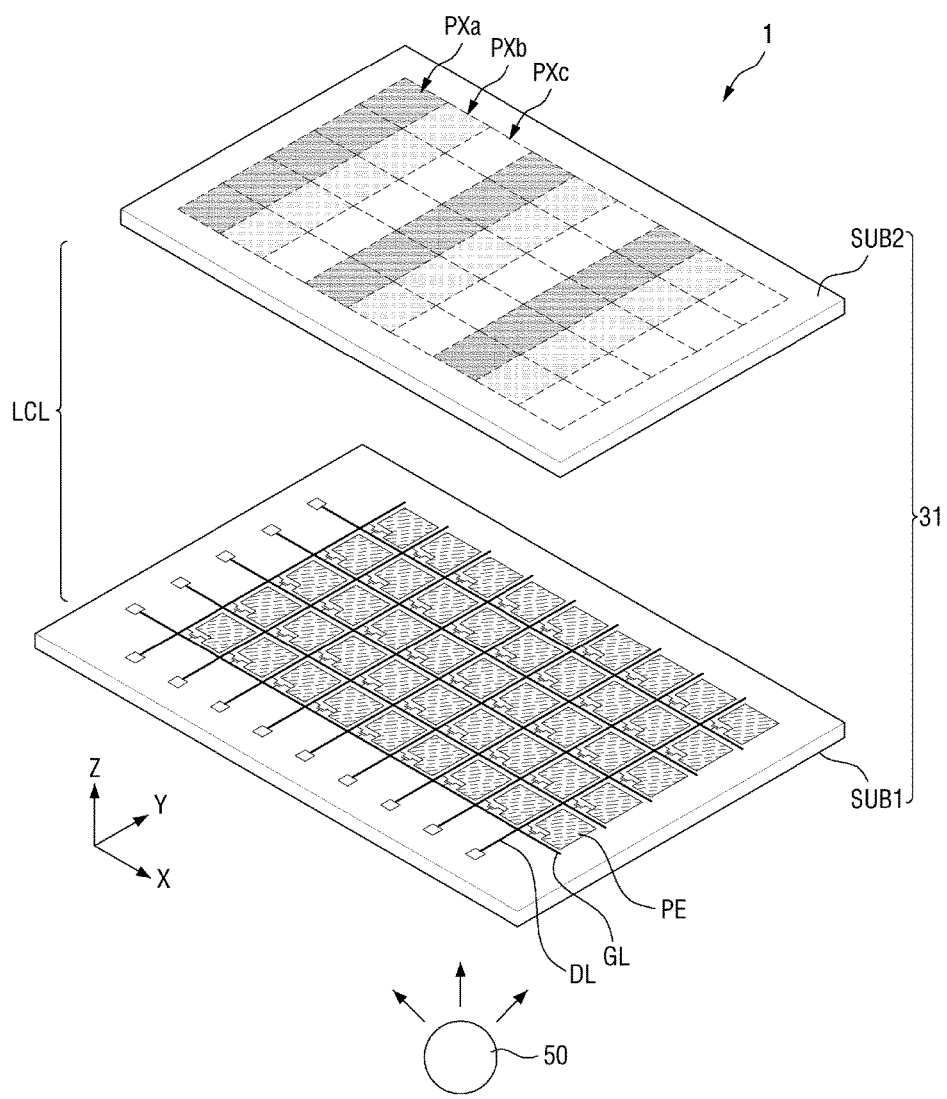
FIG. 1 is an exploded perspective view of a display device according to an exemplary embodiment.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Hereinafter, embodiments of the inventive concept will be described with reference to the accompanying drawings.

Figure 2:
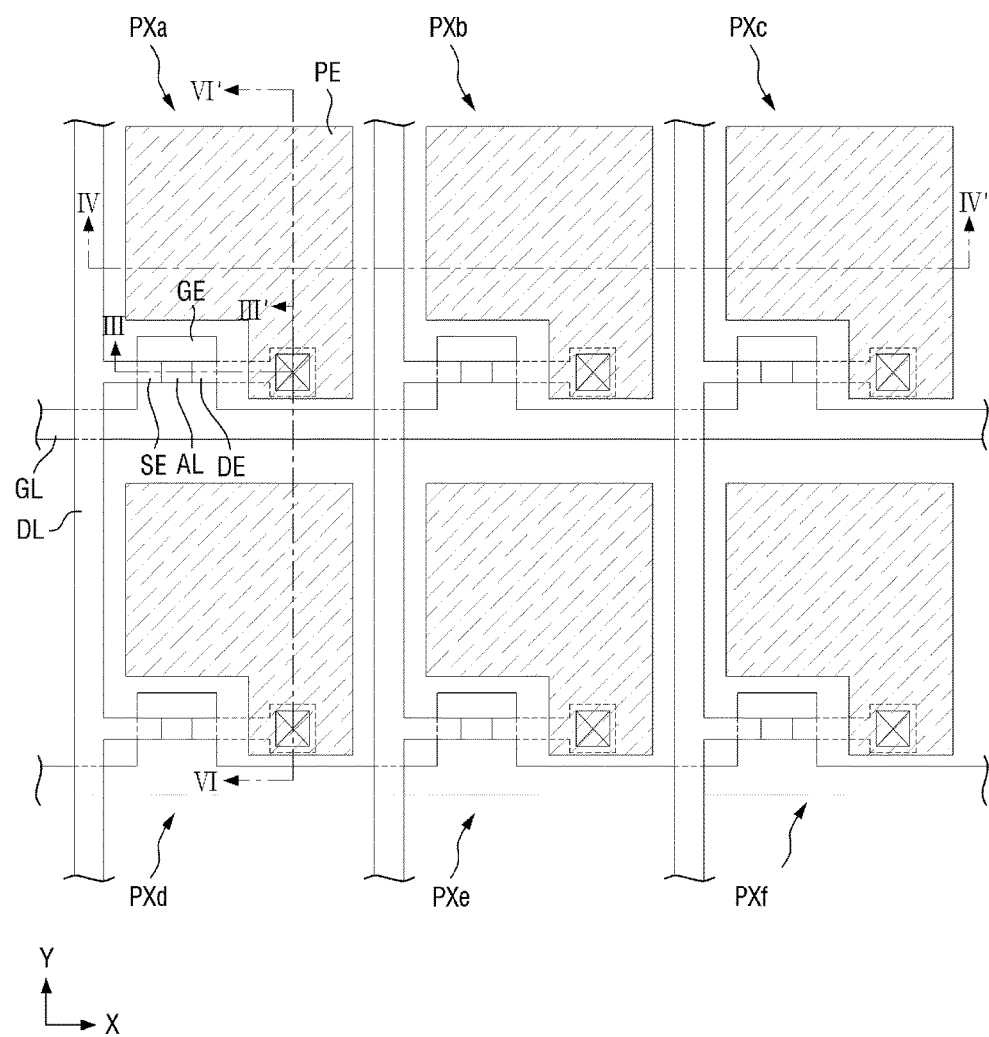
FIG. 2 is a layout of arbitrary pixels of the display device illustrated in FIG. 1.

FIG. 1 is an exploded perspective view of a display device 1 according to an exemplary embodiment. FIG. 2 is a layout of arbitrary pixels of the display device 1 illustrated in FIG. 1.

Referring to FIGS. 1 and 2, the display device 1 according to the exemplary embodiment includes a display panel 31 and a light source unit 50 which provides light to the display panel 31.

The display panel 31 may include a first display panel SUB1, a second display panel SUB2 facing the first display panel SUB1, and a liquid crystal layer LCL interposed between the first display panel SUB1 and the second display panel SUB2. The liquid crystal layer LCL may be sealed by the first display panel SUB1, the second display panel SUB2, and a sealing member bonding the first display panel SUB1 and the second display panel SUB2 together.

A plurality of pixels arranged substantially in a matrix form in plan view may be defined in the display panel 31. As used herein, 'pixels' refer to regions formed by dividing a display area in plan view to display color image, and one pixel may express a predetermined primary color. That is, one pixel may be a minimum unit of the display panel 31 which may express a color independent from other pixels.

The pixels may include a first pixel PXa which displays a first color, a second pixel PXb which displays a second color having a shorter peak wavelength than the first color, and a third pixel PXc which displays a third color having a shorter peak wavelength than the second color. In an exemplary embodiment, the first pixel PXa, the second pixel PXb, and the third pixel PXc arranged sequentially in the first direction X may form a basic unit, and the basic unit may be repeated in the first direction X. In addition, each of the first pixel PXa, the second pixel PXb, and the third pixel PXc may be repeated in the second direction Y.

For example, the first pixel PXa may be a pixel which displays the first color (red) having a peak wavelength in the range of about 610 to 650 nanometers (nm), the second pixel PXb adjacent to the first pixel PXa in the first direction X may be a pixel which displays the second color (green) having a peak wavelength in the range of about 530 to 570 nm, and the third pixel PXc adjacent to the second pixel PXb in the first direction X may be a pixel which displays the third color (blue) having a peak wavelength in the range of about 430 to 470 nm.

In addition, a fourth pixel PXd adjacent to the first pixel PXa in the second direction Y may also display the first color, a fifth pixel PXe adjacent to the second pixel PXb in the second direction Y may also display the second color, and a sixth pixel PXf adjacent to the third pixel PXc in the second direction Y may also display the third color.

The display panel 31 may include a plurality of gate lines GL extending in the first direction X and a plurality of data lines DL extending in the second direction Y and insulated from the gate lines GL. The gate lines GL and the data lines DL may be connected to a driving unit to transmit driving signals to pixel electrodes PE disposed in the pixels, respectively.

The light source unit 50 may be disposed under the display panel 31 and emit light having a specific wavelength toward the display panel 31. The light source unit 50 may include a light source which directly emits light and a light guide plate which guides light received from the light source toward the display panel 31. The material of the light guide plate is not particularly limited. For example, the light guide plate may include at least one of a glass material, a quartz material, and a plastic material such as polyethylene terephthalate or polycarbonate.

The light source may be a light-emitting diode (LED) or an organic light-emitting diode (OLED). In an exemplary embodiment, the light source may emit light having a shorter peak wavelength than the first color and the second color.

Although not illustrated in the drawings, one or more optical sheets may be disposed between the display panel 31 and the light source unit 50. The optical sheets may include at least one of a prism sheet, a diffusion sheet, a (reflective) polarizing sheet, a lenticular lens sheet, and a micro-lens sheet. The optical sheets can improve the display quality of the display device 1 by modulating optical characteristics (e.g., condensing, diffusing, scattering, or polarization characteristics) of light travelling toward the display panel 31 after being emitted from the light source unit 50.

The first display panel SUB1 of the display panel 31 will now be described in more detail with reference to FIG. 3.

Figure 3:
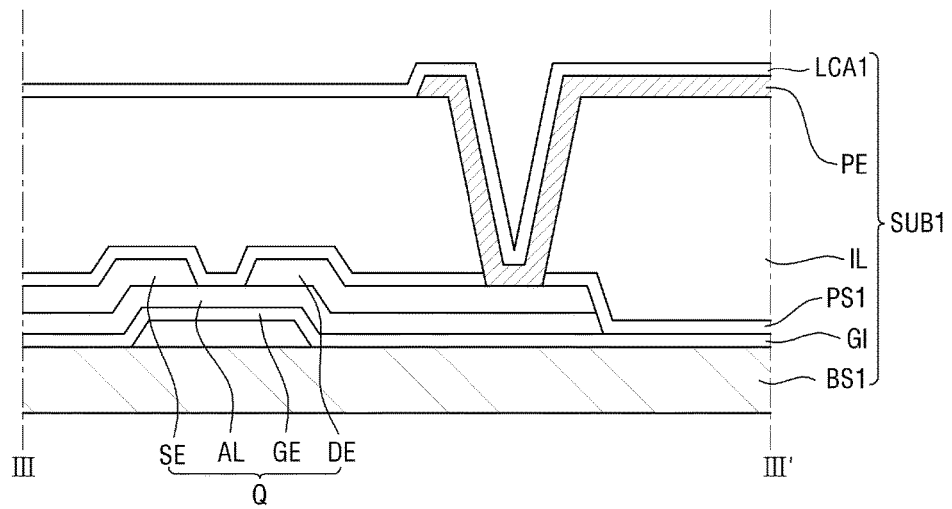
FIG. 3 is a cross-section view of a first display panel, taken along the sectional line III-III' of FIG. 2.

FIG. 3 is a cross-section view of the first display panel SUB1, taken along the sectional line III-III' of FIG. 2.

Referring to FIGS. 1, 2, and 3, the first display panel SUB1 includes a first substrate BS1, a switching element Q disposed on a surface (a top surface in FIG. 3) of the first substrate BS1, and a pixel electrode PE disposed on the switching element Q.

The first substrate BS1 may include a transparent insulating substrate. For example, the first substrate BS1 may include at least one of a substrate made of a glass material, a quartz material, and a translucent plastic material. In exemplary embodiments, the first substrate BS1 may be flexible, and the display device 1 may be a curved display device.

A plurality of switching elements Q may be disposed on the first substrate BS1. Each of the switching elements Q may be disposed in a corresponding pixel of the pixels PXa, PXb, and PXc to transmit a driving signal to the pixel electrode PE or block the driving signal. In an exemplary embodiment, each of the switching elements Q may be a thin-film transistor including a gate electrode GE, an active layer AL disposed on the gate electrode GE, and a source electrode SE and a drain electrode DE disposed on the active layer AL separated from each other.

The gate electrode GE may be a control terminal connected to a gate line GL to receive a gate driving signal, the source electrode SE may be an input terminal connected to a data line DL to receive a data driving signal, and the drain electrode DE may be an output terminal electrically connected to the pixel electrode PE. The active layer AL may include at least one of amorphous silicon and polycrystalline silicon or may include an oxide semiconductor. The active layer AL may serve as a channel of each of the switching elements Q, and the channel may be turned on or off according to the voltage applied to the gate electrode GE. The gate electrode GE and the active layer AL may be insulated from each other by an insulating film GI. Although not illustrated in the drawings, when the active layer AL is made of amorphous silicon, an ohmic contact layer may be further disposed between the active layer AL and the source and drain electrodes SE and DE.

A first protective layer PS1 may be disposed on the source electrode SE and the drain electrode DE to protect wiring and electrodes disposed under the first protective layer PS1. The first protective layer PS1 may include an inorganic material. Examples of the inorganic material may include at least one of silicon nitride ($SiN_x$), silicon oxide ($SiO_x$), silicon nitride oxide ($SiN_xO_y$, where x>y), and silicon oxynitride ($SiO_xN_y$, where x>y).

An intermediate layer IL may be disposed on the switching elements Q. The intermediate layer IL may electrically insulate elements disposed on the intermediate layer IL from elements disposed under the intermediate layer IL and planarize steps difference formed by a plurality of elements stacked on the first substrate BS1. The intermediate layer IL may include one or more layers. For example, the intermediate layer IL may include at least one of an organic material and an inorganic material, or may be a stacked structure of a layer including an organic material and a layer made of an inorganic material.

A plurality of pixel electrodes PE may be disposed on the intermediate layer IL. Each of the pixel electrodes PE may generate an electric field in the liquid crystal layer LCL together with a common electrode CE which will be described later, thereby controlling the alignment direction of liquid crystals LC in a corresponding pixel. The pixel electrodes PE may be electrically connected to the respective drain electrodes DE of the switching elements Q through contact holes formed in the intermediate layer IL, respectively. The pixel electrodes PE may be disposed in the pixels PXa through PXc, respectively. Thus, independent voltages can be applied to the pixel electrodes PE through the switching elements Q, respectively. Each of the pixel electrodes PE may be a transparent electrode made of a transparent conductive material. For example, the transparent electrode may include indium tin oxide (ITO) and indium zinc oxide (IZO). In FIG. 2, each of the pixel electrodes PE is shaped like a flat plate without a slit. However, in an exemplary embodiment, each of the pixel electrodes PE may have radial slits.

A first liquid crystal alignment layer LCA1 may be disposed on the pixel electrodes PE. The first liquid crystal alignment layer LCA1 can induce the initial alignment of the liquid crystals LC in the adjacent liquid crystal layer LCL. As used herein, 'initial alignment of liquid crystals' refers to the alignment of liquid crystals in a state where no electric field has been formed in a liquid crystal layer. The first liquid crystal alignment layer LCA1 may include a polymer organic material having an imide group in a repeating unit of a main chain.

The liquid crystal layer LCL and the second display panel SUB2 of the display panel 31 will now be described in more detail with reference to FIGS. 4, 5, 6, and 7.

Figure 4:
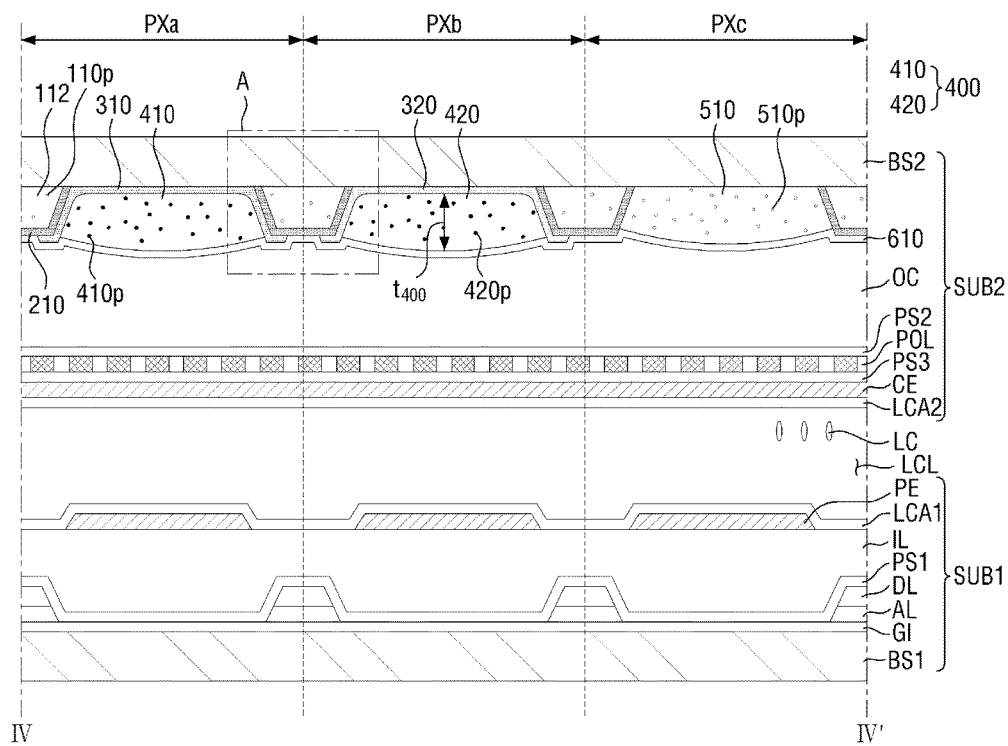
FIG. 4 is a cross-section view taken along the sectional line IV-IV' of FIG. 2.
Figure 5:
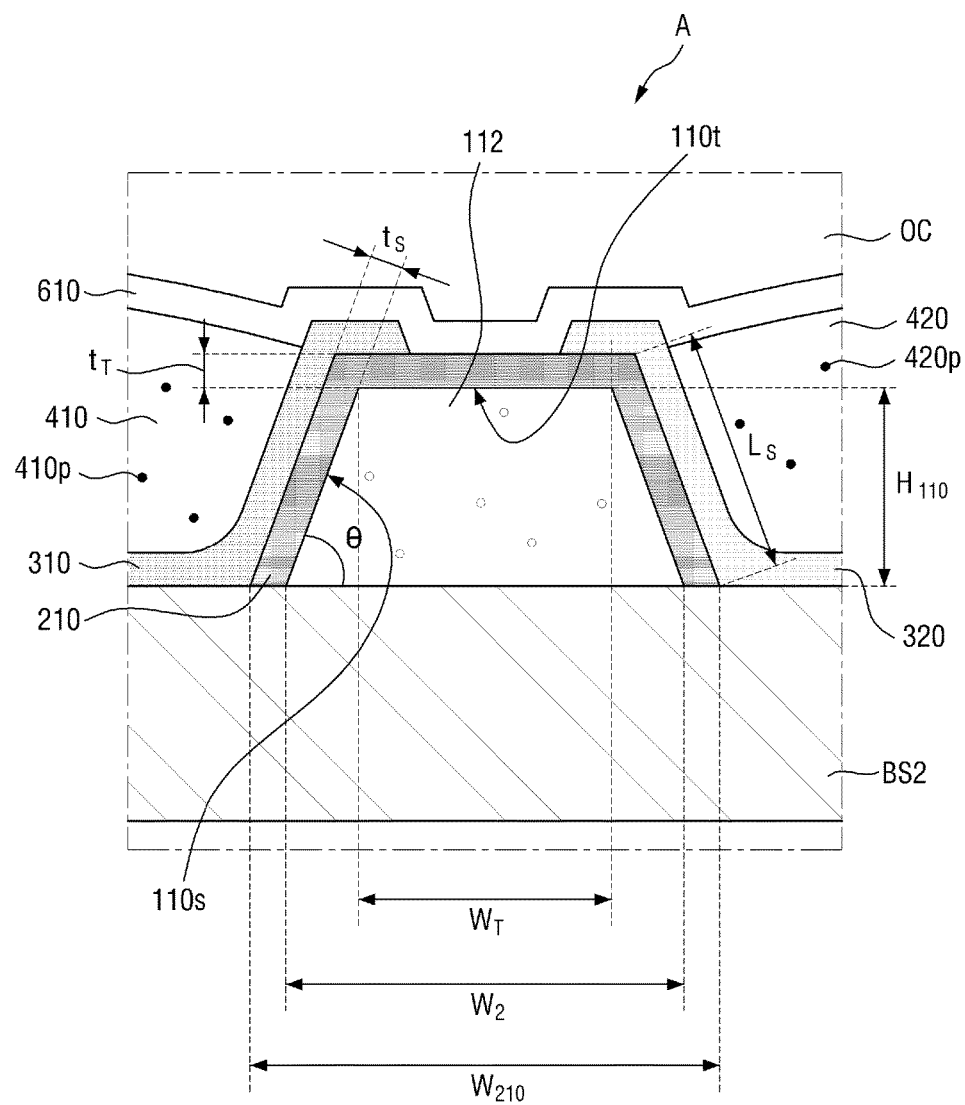
FIG. 5 is an enlarged view of an area 'A' of FIG. 4.
Figure 6:
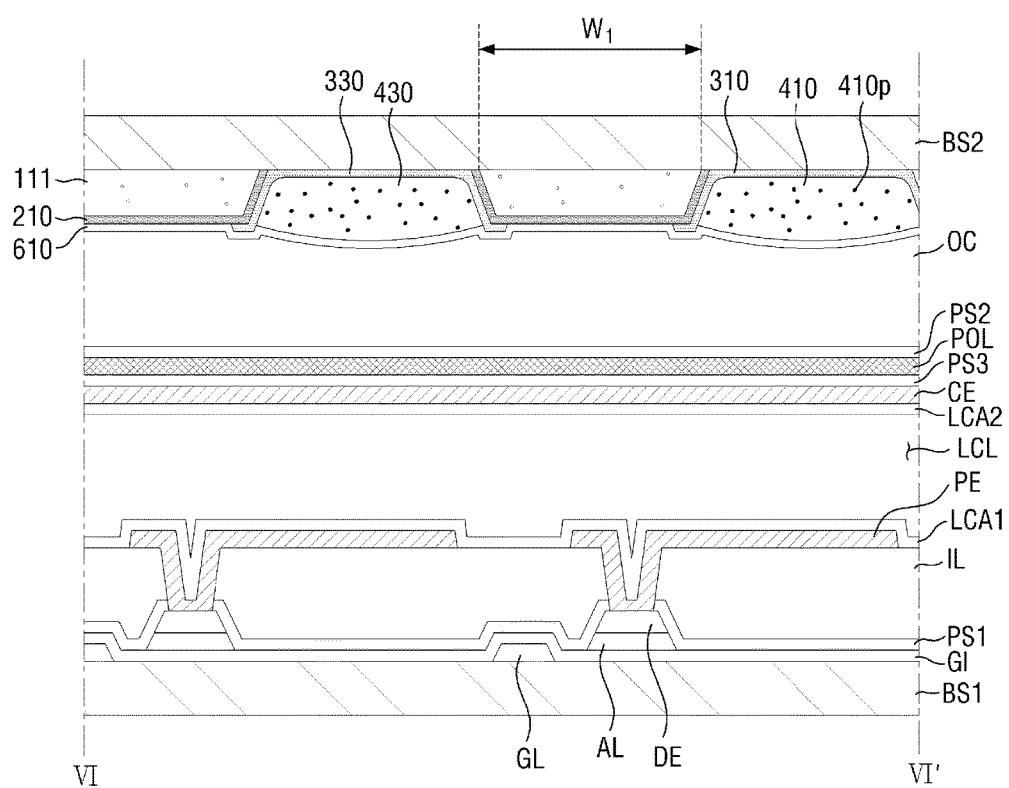
FIG. 6 is a cross-section view taken along the sectional line VI-VI' of FIG. 2.
Figure 7:
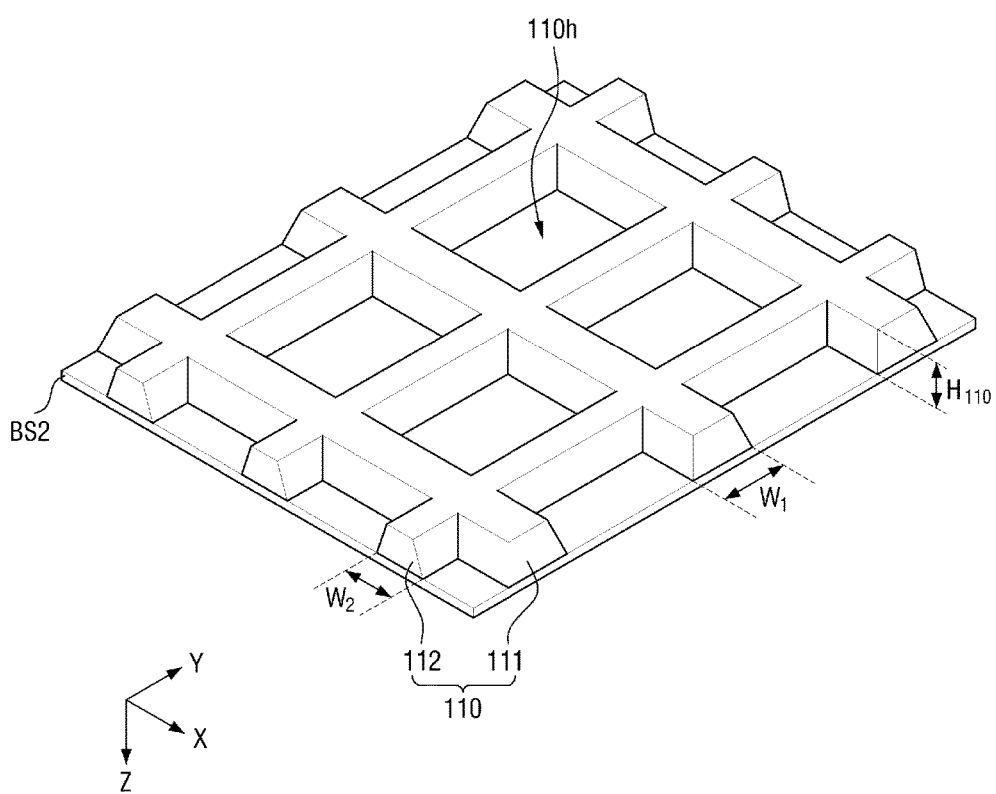
FIG. 7 is a schematic perspective view of a partition wall illustrated in FIGS. 4 and 6.

FIG. 4 is a cross-section view taken along the sectional line IV-IV' of FIG. 2. FIG. 5 is an enlarged view of an area 'A' of FIG. 4. FIG. 6 is a cross-section view taken along the sectional line VI-VI' of FIG. 2. FIG. 7 is a schematic perspective view of a partition wall 110 illustrated in FIGS. 4 and 6.

First, the liquid crystal layer LCL will be described.

Referring to FIGS. 1, 2, 3, and 4, the liquid crystal layer LCL includes a plurality of initially aligned liquid crystals LC. The liquid crystals LC may have negative dielectric anisotropy and be vertically aligned in an initial alignment state. The liquid crystals LC may have a predetermined pretilt angle in the initial alignment state. The initial alignment of the liquid crystals LC can be induced by the first liquid crystal alignment layer LCA1 and a second liquid crystal alignment layer LCA2. When an electric field is formed between the pixel electrodes PE and the common electrode CE, the liquid crystals LC may be tilted in a specific direction to change the polarization state of light transmitted through the liquid crystal layer LCL. In an exemplary embodiment, the liquid crystals LC may have positive dielectric anisotropy and be horizontally aligned in the initial alignment state. When an electric field is formed, the liquid crystals LC may rotate to change the polarization state of light.

Next, the second display panel SUB2 will be described.

Referring to FIGS. 1, 2, 3, 4, 5, 6, and 7, the second display panel SUB2 includes a second substrate BS2, the partition wall 110 disposed on a surface (a bottom surface in FIG. 4) of the second substrate BS2, a light-shielding member 210 disposed on the partition wall 110, color conversion patterns 400 disposed on the light-shielding member 210, and the common electrode CE disposed on the color conversion patterns 400. The second display panel SUB2 may further include a polarizing layer POL disposed between the color conversion patterns 400 and the common electrode CE.

Like the first substrate BS1, the second substrate BS2 may be a transparent insulating substrate. The partition wall 110 may be disposed on the second substrate BS2. The partition wall 110 may expose at least a part of the surface of the second substrate BS2. That is, the partition wall 110 may have openings 110h that expose at least a part of the surface of the second substrate BS2.

For example, the partition wall 110 may include a plurality of first partition wall portions 111 extending in the first direction X and a plurality of second partition wall portions 112 extending in the second direction Y. The first partition wall portions 111 and the second partition wall portions 112 may intersect each other and may be physically integrated with each other. That is, the first partition wall portions 111 are portions of the partition wall 110 which extend in the first direction X in plan view, and the second partition wall portions 112 are portions of the partition wall 110 which extend in the second direction Y in plan view. Each of the openings 110h may be surrounded and defined by two adjacent first partition wall portions 111 and two adjacent second partition wall portions 112. In other words, the partition wall 110 may be disposed at boundaries between adjacent pixels and may have a substantially lattice shape in plan view.

In an exemplary embodiment, the first partition wall portions 111 may overlap the gate electrodes GE, the active layer AL, the source electrodes SE, the drain electrodes DE and the contact holes formed in the intermediate layer IL, and the second partition wall portions 112 may overlap the data lines DL. A maximum width $W_1$ of each of the first partition wall portions 111 in the second direction Y may be greater than a maximum width $W_2$ of each of the second partition wall portions 112 in the first direction X.

Although the exemplary embodiments are not limited to the following example, when the color conversion patterns 400 are formed by an inkjet process, the partition wall 110 can help to align an ejected ink composition. That is, the partition wall 110 may serve as a guide for accurately ejecting and stably positioning the ink composition for forming the color conversion patterns 400 at a desired position. In other words, the partition wall 110 may make it easy to form the color conversion patterns 400. To form the color conversion patterns 400 having a sufficient thickness, a height $H_{110}$ of the partition wall 110 may have a lower limit of about 5.0 µm, about 5.5 µm, about 6.0 µm, about 6.5 µm, about 7.0 µm, about 7.5 µm, about 8.0 µm, about 8.5 µm, about 9.0 µm, about 9.5 µm, about 10.0 µm, about 10.5 µm, about 11.0 µm, about 11.5 µm, about 12.0 µm, or about 15.0 µm. The height $H_{110}$ of the partition wall 110 may be at least 5.0 µm or more, according to a thickness of the color conversion patterns 400. Accordingly, the color conversion patterns 400 having excellent or improved color conversion efficiency can be formed.

The partition wall 110 may have a top surface and side surfaces inclined downward from the top surface. For example, each of the first and second partition wall portions 111 and 112 may have a top surface 110t which forms a flat surface and side surfaces 110s which are inclined downward from the top surface 110t. In an exemplary embodiment, the lower limit of an average inclination angle θ of the side surfaces 110s of the partition wall 110 with respect to the surface of the second substrate BS2 may be about 30 degrees, about 35 degrees, or about 40 degrees. The upper limit of the average inclination angle θ of the side surfaces 110s with respect to the surface of the second substrate BS2 may be about 85 degrees, about 80 degrees, about 70 degrees, about 60 degrees, or about 50 degrees. Although the exemplary embodiments are not limited to the following example, when the light-shielding member 210 is to be formed by a back exposure process, the side surfaces 110s may have a predetermined inclination so that a sufficient amount of light can easily transmit not only through the top surface 110t of the partition wall 110 but also through the side surfaces 110s of the partition wall 110. Therefore, the light-shielding member 210 having a sufficient thickness can be formed on the side surfaces 110s of the partition wall 110. The light-shielding member 210 having a sufficient thickness can suppress or reduce a defect in which, for example, when a first color conversion pattern 410 includes a first wavelength shift material 410p, light of the first color emitted by the first wavelength shift material 410p proceeds into a second color conversion pattern 420 and thus the first color is expressed in the second pixel PXb. That is, a light leakage defect can be suppressed or reduced.

As a non-limiting example, a bottom surface of the partition wall 110 may be wider than the top surface of the partition wall 110. For example, the width $W_2$ of a bottom surface of each of the second partition wall portions 112 of the partition wall 110 may be about 17 to 30 µm, about 18 to about 25 µm, or about 20 µm. In addition, a width $W_T$ of the top surface 110t of each of the second partition wall portions 112 of the partition wall 110 may be about 15 to 25 µm, about 17 to 20 µm, or about 18 µm.

The partition wall 110 may have translucency. The light transmittance of the partition wall 110 may be about 90 percent (%) or more, about 95% or more, about 98% or more, or about 99% or more. The material of the partition wall 110 is not particularly limited as long as it has an excellent or improved light transmittance. For example, the material of the partition wall 110 may include an organic material such as epoxy resin, acrylic resin or imide resin. Specifically, for example, the partition wall 110 may include at least one of ethylene glycol di(meth)acrylate-based, polyethylene glycol di(meth)acrylate-based, trimethylolpropane di(meth)acrylate-based, trimethylolpropane tri(meth)acrylate-based, pentaerythritol tri(meth)acrylate-based, pentaerythritol tetra(meth)acrylate-based, propylene glycol di(meth)acrylate-based, dipentaerythritol penta(meth)acrylate-based, dipentaerythritol hexa(meth)acrylate-based, bisphenol A epoxy(meth)acrylate-based, tri(acryloyloxy ethyl) phosphate-based, and cardo epoxy diacrylate-based polymers.

When the partition wall 110 includes an organic material, it may include a photosensitive organic material. The photosensitive organic material may include, but not limited to, a negative photosensitive material whose portions irradiated to light are cured.

In exemplary embodiments, the partition wall 110 may further include first particles 110p dispersed therein. The first particles 110p may be light-scattering materials that may scatter light transmitted through the partition wall 110. The first particles 110p may have a spherical shape or various polygonal shapes that are regular or irregular. A refractive index of the first particles 110p may be different from that of the partition wall 110. The first particles 110p are not particularly limited as long as they can scatter and reflect transmitted light. For example, the first particles 110p may be metal oxide particles or organic particles. Examples of the metal oxide may include at least one of titanium oxide ($TiO_2$), zirconium oxide ($ZrO_2$), aluminum oxide ($Al_2O_3$), indium oxide ($In_2O_3$), zinc oxide (ZnO), and tin oxide ($SnO_2$). Examples of the organic material may include at least one of acrylic resin and urethane resin.

The light-shielding member 210 may be disposed on the partition wall 110. The light-shielding member 210 may cover the surface of the partition wall 110 protruding from the second substrate BS2. For example, the light-shielding member 210 may be disposed on the top surface 110t of the partition wall 110. In addition, at least a part of the light-shielding member 210 may be disposed on the side surfaces 110s of the partition wall 110.

The light-shielding member 210 may block the transmission of light. The light-shielding member 210 may be disposed at planar boundaries between adjacent pixels to prevent or reduce color mixing between neighboring pixels. In addition, the light-shielding member 210 may be disposed between the first color conversion pattern 410 and the second color conversion pattern 420 and between the second color conversion pattern 420 and a light transmission pattern 510. The light-shielding member 210 can suppress or reduce a defect in which, for example, when the first color conversion pattern 410 includes the first wavelength shift material 410p, light of the first color emitted by the first wavelength shift material 410p proceeds into the second color conversion pattern 420 and thus the first color is expressed in the second pixel PXb. The light-shielding member 210 may have an optical density of about 2.0/1.3 μm or more, about 3.0/1.3 μm or more, or about 4.0/1.3 μm or more. That means that, the optical density of the light-shielding member 210 having a thickness of 1.3 μm in a thickness direction may be about 2.0 or more, about 3.0 or more, or about 4.0 or more.

The material of the light-shielding member 210 is not particularly limited as long as it can block the transmission of light. For example, the light-shielding member 210 may include an organic material including a coloring agent such as a black pigment or dye.

Examples of the coloring agent (such as the black pigment or dye) of the light-shielding member 210 may include inorganic pigments such as carbon black, titanium black, lignin black, perylene black, cyanine black, a complex oxide pigment such as iron/manganese, and combinations of the above pigments.

In addition, the light-shielding member 210 may further include an organic base material. The organic base material is not particularly limited as long as it can provide the dispersibility of the black pigment or dye. Examples of the organic base material include at least one of ethylene glycol di(meth)acrylate-based, diethylene glycol di(meth)acrylate-based, triethylene glycol di(meth)acrylate-based, 1,6-hexanediol di(meth)acrylate-based, pentaerythritol tri(meth)acrylate-based, pentaerythritol tetra(meth)acrylate-based, dipentaerythritol penta(meth)acrylate-based, dipentaerythritol hexa(meth)acrylate-based, bisphenol A epoxy(meth)acrylate-based, ethylene glycol monomethyl ether(meth)acrylate-based, trimethylolpropane tri(meth)acrylate-based, trisacryloyloxyethyl phosphate-based, and cardo epoxy diacrylate-based polymers. When the light-shielding member 210 includes an organic base material, the organic base material may include a photosensitive organic material. The photosensitive organic material may include, but not limited to, a negative photosensitive material whose portions irradiated with light are cured.

In an exemplary embodiment, a first thickness $t_T$ of the light-shielding member 210 disposed on the top surface 110t of the partition wall 110 may be different from a second thickness $t_S$ of the light-shielding member 210 disposed on the side surfaces 110s of the partition wall 110. For example, the first thickness $t_T$ of the light-shielding member 210 disposed on the top surface 110t of the partition wall 110 may be greater than the second thickness $t_S$ of the light-shielding member 210 disposed on the side surfaces 110s of the partition wall 110. The second thickness $t_S$ refers to a vertical distance from each side surface 110s of the partition wall 110 to a top surface of the light-shielding member 210 in a direction perpendicular to the side surfaces 110s of the partition wall 110. The first thickness $t_T$ and the second thickness $t_S$ of the light-shielding member 210 are not particularly limited as long as the light-shielding member 210 may completely block or minimize the transmission of light. For example, the lower limit of each of the first thickness $t_T$ and the second thickness $t_S$ may be about 1.3 μm, about 1.4 μm, about 1.5 μm, about 2.0 μm, about 2.5 μm, or about 3.0 μm.

In addition, a length $L_S$ of the light-shielding member 210 disposed on the side surfaces 110s of the partition wall 110 may be greater than the height $H_{110}$ of the partition wall 110. For example, the length $L_S$ of the light-shielding member 210 measured along each side surface 110s of the partition wall 110 may be about 7.0 μm or more. The length $L_S$ of the light-shielding member 210 enables the light-shielding member 210 to have a sufficient height component in the third direction Z. In a non-limiting example, a maximum width $W_{210}$ of the light-shielding member 210 may be about 33 μm or less, about 28 μm or less, or about 23 μm or less.

Furthermore, the height $H_{110}$ of the partition wall 110 may be about two times or more, about 2.5 times or more, or about three times or more the first thickness $t_T$ of the light-shielding member 210 disposed on the top surface 110t of the partition wall 110. When the partition wall 110 has a height of about two times or more, about 2.5 times or more, or about 3 times or more the thickness $t_T$ of the light-shielding member 210 which enables the light-shielding member 210 to exhibit sufficient light-absorbing characteristics, the color conversion patterns 400 having a sufficient thickness can be formed. In addition, the height $H_{110}$ of the partition wall 110 may be about 10 times or less the first thickness $t_T$ of the light-shielding member 210 disposed on the top surface 110t of the partition wall 110.

According to a conventional light-shielding member, it is difficult to photo-cure the light-shielding member made of a photosensitive material due to light-absorbing characteristics of the light-shielding member. Therefore, it is impossible or difficult to form a light-shielding member having a sufficient thickness (height), or the process of forming a light-shielding member having a sufficient thickness (height) is complicated. For example, a conventional light-shielding member cannot be formed to a thickness (height) greater than 1.3 μm when a light-shielding member material having a high absorbance is used. On the other hand, when a light-shielding member material having a low absorbance is used, the light-shielding member cannot properly exhibit light-shielding characteristics, resulting in the light leakage defect.

However, in the display device 1 according to the exemplary embodiment, the partition wall 110 having a sufficient height is formed, and the light-shielding member 210 is disposed to cover the surface of the partition wall 110. Therefore, the light-shielding member 210 can be formed in a height direction to a length greater than the height of the partition wall 110, thereby preventing or reducing the light leakage defect between adjacent pixels.

In exemplary embodiments, hydrophobicity of the surface of the light-shielding member 210 disposed on the top surface 110t of the partition wall 110 may be greater than that of the surface of the light-shielding member 210 disposed on the side surfaces 110s of the partition wall 110. For example, fluorine content per unit area bonded to the surface of the light-shielding member 210 disposed on the top surface 110t of the partition wall 110 may be greater than fluorine content per unit area bonded to the surface of the light-shielding member 210 disposed on the side surfaces 110s of the partition wall 110. That is, the difference in fluorine content in each area of the surface of the light-shielding member 210 may result in the difference in hydrophobicity in each area of the surface of the light-shielding member 210. Although the exemplary embodiments are not limited to the following example, when the color conversion patterns 400 are to be formed by an inkjet process, the side surfaces 110s of the partition wall 110, which correspond to positions where an ink composition is ejected, may be lyophilic to the ink composition, and the top surface 100t of the partition wall 110 may be repellant to the ink composition, thereby facilitating the formation of the color conversion patterns 400.

A first wavelength band filter 310 and a second wavelength band filter 320 may be disposed on the light-shielding member 210. Each of the first wavelength band filter 310 and the second wavelength band filter 320 is a wavelength-selective optical filter that transmits only predetermined wavelength bands of incident light by transmitting light having certain wavelength band and blocking light having other wavelength band. The first wavelength band filter 310 may be disposed in an opening 110h formed by the partition wall 110 in the first pixel PXa, and the second wavelength band filter 320 may be disposed in an opening 110h formed by the partition wall 110 in the second pixel PXb.

In an exemplary embodiment, each of the first wavelength band filter 310 and the second wavelength band filter 320 may selectively transmit light having a peak wavelength longer than the peak wavelength of the third color provided by the light source unit 50 and absorb or reflect light of the third color.

For example, the first wavelength band filter 310 may be disposed in the first pixel PXa to transmit light having a wavelength band including the peak wavelength of the first color and to absorb light having a wavelength band including the peak wavelength of the third color. At least a part of the first wavelength band filter 310 may be disposed on the top surface 110t of the partition wall 110. That is, at least a part of the first wavelength band filter 310 may overlap the top surface 110t of the partition wall 110 in the third direction Z.

In addition, the second wavelength band filter 320 may be disposed in the second pixel PXb to transmit light having a wavelength band including the peak wavelength of the second color and to absorb light having a wavelength band including the peak wavelength of the third color. At least a part of the second wavelength band filter 320 may be disposed on the top surface 110t of the partition wall 110. That is, at least a part of the second wavelength band filter 320 may overlap the top surface 110t of the partition wall 110 in the third direction Z.

Each of the first wavelength band filter 310 and the second wavelength band filter 320 may include, but not limited to, a colorant or dye that absorbs light of a specific wavelength band.

Accordingly, the first wavelength band filter 310 may block the light of the third color provided from the light source unit 50 and transmitted through the first color conversion pattern 410 without being color-converted by the first color conversion pattern 410. In addition, the second wavelength band filter 320 may block the light of the third color provided from the light source unit 50 and transmitted through the second color conversion pattern 420 without being color-converted by the second color conversion pattern 420. Thus, the purity of the first color displayed by the first pixel PXa and the purity of the second color displayed by the second pixel PXb can be improved, thereby improving the display quality of the display device 1.

At least a part of each of the first wavelength band filter 310 and the second wavelength band filter 320 may be disposed on the top surface 110t of the partition wall 110. That is, each of the first wavelength band filter 310 and the second wavelength band filter 320 may overlap at least a part of the top surface 110t of the partition wall 110 in the third direction Z. The first wavelength band filter 310 and the second wavelength band filter 320 protruding further upward than the top (i.e., the top surface) of the partition wall 110 may make the openings 110h deeper, which, in turn, makes it easy to form the color conversion patterns 400.

A third wavelength band filter 330 may be disposed in the fourth pixel PXd. Like the first wavelength band filter 310, the third wavelength band filter 330 may transmit light having a wavelength band including the peak wavelength of the first color and absorb light having a wavelength band including the peak wavelength of the third color. The third wavelength band filter 330 may be separated from the first wavelength band filter 310 in the second direction Y.

The color conversion patterns 400 may be disposed on the first wavelength band filter 310 and the second wavelength band filter 320. Each of the color conversion patterns 400 can convert the color of transmitted light into a color different from that of incident light. That is, light may be converted into light of a predetermined wavelength band as it passes through each of the color conversion patterns 400. In an exemplary embodiment, the first color conversion pattern 410 and the second color conversion pattern 420 of the color conversion patterns 400 may include a material, that is, a wavelength shift material 410p or 420p that converts or shifts the peak wavelength of incident light to a predetermined peak wavelength. Examples of the wavelength shift material include a quantum dot material and a fluorescent material.

For example, a quantum dot may emit light of a specific color when an electron transitions from a conduction band to a valence band. The quantum dot material may have a core-shell structure. The core may include a semiconductor nanocrystalline material. Examples of the core of the quantum dot may include at least one of, but not limited to, silicon (Si) nanocrystals, group II-VI compound nanocrystals, and group III-V compound nanocrystals. As a non-limiting example, the wavelength shift material may include a core including at least one of cadmium selenide (CdSe), cadmium telluride (CdTe), cadmium sulfide (CdS) and indium phosphide (InP) and an outer shell made of zinc sulfide (ZnS).

When each of the color conversion patterns 400 includes the wavelength shift material 410p or 420p, at least a part of light that transmits through the corresponding color conversion pattern 400 and travels in the third direction Z can contribute to light emission of the wavelength shift material 410p or 420p. To increase the degree to which transmitted light contributes to light emission of the wavelength shift material 410p or 420p, it is advantageous for each of the color conversion patterns 400 to have a sufficient thickness $t_{400}$. For example, the lower limit of the thickness $t_{400}$ of each of the color conversion patterns 400 may be about 5.0 μm, about 5.5 μm, about 6.0 μm, about 6.5 μm, about 7.0 μm, about 7.5 μm, about 8.0 μm, about 8.5 μm, about 9.0 μm, about 9.5 μm, about 10.0 μm, about 10.5 μm, about 11.0 μm, about 11.5 μm, about 12.0 μm, or about 15.0 μm. By forming the partition wall 110 to a sufficient height as described above, it is possible to easily form the color conversion patterns 400 having a sufficient thickness.

The color conversion patterns 400 may include the first color conversion pattern 410 and the second color conversion pattern 420. The first color conversion pattern 410 may be disposed in the opening 110h formed by the partition wall 110 in the first pixel PXa, and the second color conversion pattern 420 may be disposed in the opening 110h formed by the partition wall 110 in the second pixel PXb.

The first color conversion pattern 410 may include the first wavelength shift material 410p. The first wavelength shift material 410p may be a material that emits light having the peak wavelength of the first color. The size of the first wavelength shift material 410p may be, but is not limited to, about 55 to 65 Å. In addition, the second color conversion pattern 420 may include the second wavelength shift material 420p. The second wavelength shift material 420p may be a material that emits light having the peak wavelength of the second color. The size of the second wavelength shift material 420p may be, but is not limited to, about 40 to 50 Å.

Light emitted from the first wavelength shift material 410p and the second wavelength shift material 420p is radiated in various directions regardless of an incident angle of incident light and therefore, lateral visibility of the first color and the second color displayed by the display device 1 may be improved. Light emitted from the first color conversion pattern 410 and the second color conversion pattern 420 toward the viewer side (an upper side in FIG. 4) may be depolarized to become unpolarized light. As used herein, 'unpolarized light' refers to light that is not composed only of polarization components in a specific direction and not polarized only in a specific direction. In other words, unpolarized light is composed of random polarization components. An example of the unpolarized light is natural light.

The light-shielding member 210 may be interposed between the first color conversion pattern 410 and the second color conversion pattern 420 separated from each other in a horizontal direction (e.g., the first direction X). That is, the first color conversion pattern 410, the light-shielding member 210, and the second color conversion pattern 420 may at least partially overlap each other in the horizontal direction. By placing the light-shielding member 210 having sufficient light-absorbing characteristics between the first color conversion pattern 410 and the second color conversion pattern 420, it is possible to suppress or reduce a defect in which, for example, light emitted from the first wavelength shift material 410p proceeds toward the second color conversion pattern 420 to cause the second pixel PXb to display the first color or a defect in which light emitted from the second wavelength shift material 420p proceeds toward the first color conversion pattern 410 to cause the first wavelength shift material 410p to emit light.

The light transmission pattern 510 may be disposed in an opening 110h formed by the partition wall 110 in the third pixel PXc. For example, the light transmission pattern 510 may be disposed directly on the second substrate BS2 and the light-shielding member 210. The light transmission pattern 510 may transmit incident light without changing the color of the incident light. That is, light that passes through the light transmission pattern 510 may still have the third color provided by the light source unit 50.

In exemplary embodiments, the light transmission pattern 510 may further include second particles 510p. The second particles 510p may be light-scattering materials that may scatter light transmitted through the light transmission pattern 510. The second particles 510p are not particularly limited as long as they can scatter and reflect transmitted light. For example, the second particles 510p may be metal oxide particles or organic particles. Examples of the metal oxide may include at least one of titanium oxide, zirconium oxide, aluminum oxide, indium oxide, zinc oxide, and tin oxide. Examples of the organic material may include at least one of acrylic resin and urethane resin.

The second particles 510p scatter light of the third color, which is provided from the light source unit 50 and transmitted through the light transmission pattern 510, in various directions regardless of an incident angle without changing the wavelength of the light of the third color. Thus, the second particles 510p can improve lateral visibility of the third color displayed by the display device 1. Light emitted toward the viewer side via the light transmission pattern 510 may be in an unpolarized state. In an exemplary embodiment, the light transmission pattern 510 may be omitted.

The light-shielding member 210 may be interposed between the second color conversion pattern 420 and the light transmission pattern 510 separated from each other in the horizontal direction (e.g., the first direction X). That is, the second color conversion pattern 420, the light-shielding member 210, and the light transmission pattern 510 may at least partially overlap each other in the horizontal direction. By placing the light-shielding member 210 having sufficient light-absorbing characteristics between the second color conversion pattern 420 and the light transmission pattern 510, it is possible to suppress or reduce a defect in which, for example, light emitted from the second wavelength shift material 420p proceeds toward the light transmission pattern 510 to cause the third pixel PXc to display the second color or a defect in which light scattered by the second particles 510p of the light transmission pattern 510 proceeds toward the second color conversion pattern 420 to cause the second wavelength shift material 420p to emit light.

A fourth wavelength band filter 610 may be disposed on the color conversion patterns 400 and the light transmission pattern 510. The fourth wavelength band filter 610 is a wavelength-selective optical filter that transmits only some wavelength bands of incident light by transmitting light having a specific wavelength band and blocking light having other wavelength band.

In an exemplary embodiment, the fourth wavelength band filter 610 may selectively reflect light having a peak wavelength longer than the peak wavelength of the third color provided by the light source unit 50 and transmit light of the third color. For example, the fourth wavelength band filter 610 may selectively reflect light having a wavelength band including the peak wavelength of the first color and light having a wavelength band including the peak wavelength of the second color and transmit light having a wavelength band including the peak wavelength of the third color. The fourth wavelength band filter 610 may include one or more layers including an inorganic material. For example, the fourth wavelength band filter 610 may include a plurality of low refractive layers and a plurality of high refractive layers stacked alternately. As used herein, 'low refractive layer' refers to a layer having a refractive index relatively lower than that of an adjacent layer, and 'high refractive layer' refers to a layer having a refractive index relatively higher than that of an adjacent layer. The transmission wavelength band and the reflection wavelength band of the fourth wavelength band filter 610 can be controlled by the materials of the low refractive layers and the high refractive layers, respective thicknesses of the low refractive layers and the high refractive layers and a difference between the thicknesses, and respective refractive indices of the low refractive layers and the high refractive layers and a difference between the refractive indices.

The fourth wavelength band filter 610 may be formed to a substantially constant thickness along outer surfaces of the first color conversion pattern 410, the second color conversion pattern 420, the light transmission pattern 510, the first wavelength band filter 310, the second wavelength band filter 320, and the light-shielding member 210. An average thickness of the fourth wavelength band filter 610 may be about 0.5 to 2.0 µm or about 1.0 µm. The fourth wavelength band filter 610 may at least partially contact the first color conversion pattern 410, the second color conversion pattern 420, the light transmission pattern 510, and the light-shielding member 210.

Accordingly, the fourth wavelength band filter 610 may reflect, among light emitted in various directions from the first wavelength shift material 410$p$ and the second wavelength shift material 420$p$, the light emitted toward the fourth wavelength band filter 610 toward the viewer side, so that the reflected light can contribute to the color display. This may increase light utilization efficiency and enable the display device 1 to display a clearer color. In addition, the fourth wavelength band filter 610 may, among light provided by the light source unit 50, transmit light having the peak wavelength of the third color while blocking light having a peak wavelength longer than that of the third color. Therefore, the color purity of the light provided by the light source unit 50 can be further improved.

An overcoat layer OC may be disposed on the fourth wavelength band filter 610. The overcoat layer OC may be a planarization layer that minimizes step differences formed by a plurality of elements stacked on the second substrate BS2. The overcoat layer OC may include one or more layers. For example, the overcoat layer OC may be a stacked structure of a plurality of layers. The overcoat layer OC may include an organic material having planarization characteristics. For example, the overcoat layer OC may include an organic material such as cardo resin, polyimide resin, or acrylic resin. The overcoat layer OC may be disposed directly on the fourth wavelength band filter 610 without distinction between the pixels PXa through PXc.

The polarizing layer POL may be disposed on the overcoat layer OC. The polarizing layer POL may perform an optical shutter function together with the liquid crystal layer LCL and another polarizing layer disposed between the liquid crystal layer LCL and the light source unit 50 to control the amount of light transmitted through each of the pixels PXa through PXc. In an exemplary embodiment, the polarizing layer POL may be a reflective polarizer including a wire grid pattern. As used herein, 'wire grid pattern' refers to a plurality of linear patterns extending parallel to each other and separated from each other. The reflective polarizer may polarize transmitted light by transmitting a polarization component parallel to a transmission axis and reflecting a polarization component parallel to a reflection axis. In an exemplary embodiment, the polarizing layer POL may include a coating-type polarizer.

The wire grid pattern of the polarizing layer POL may include a reflective material. For example, the wire grid pattern may include at least one of aluminum (Al), silver (Ag), gold (Au), copper (Cu), titanium (Ti), molybdenum (Mo), nickel (Ni), and an alloy of these materials.

In exemplary embodiments, a second protective layer PS2 may be disposed between the overcoat layer OC and the polarizing layer POL. The second protective layer PS2 may be in contact with the overcoat layer OC and the wire grid pattern. The second protective layer PS2 may include an inorganic material such as silicon nitride or silicon oxide. The second protective layer PS2 can prevent or reduce the overcoat layer OC from being damaged in the process of forming the wire grid pattern. In addition, the second protective layer PS2 can improve the adhesion of the wire grid pattern and prevent or reduce damage or corrosion of the wire grid pattern due to penetration of air or moisture, thereby improving the reliability of the display device 1.

A third protective layer PS3 may be disposed on the polarizing layer POL. The third protective layer PS3 may be disposed directly on the polarizing layer POL to cover and protect the wire grid pattern. The third protective layer PS3 can prevent or reduce the wire grid pattern from being damaged or corroded by penetration of air or moisture and can planarize a top surface of the polarizing layer POL. The third protective layer PS3 may include an inorganic insulating material such as silicon nitride or silicon oxide.

The common electrode CE may be disposed on the third protective layer PS3. The common electrode CE may be integrally formed as a single piece without distinction between the pixels PXa through PXc, and a common voltage may be applied to the common electrode CE. In an exemplary embodiment, the common electrode CE may be disposed directly on the third protective layer PS3 and may be a transparent electrode. The second liquid crystal alignment layer LCA2 may be disposed on the common electrode CE to induce the initial alignment of the liquid crystals LC in the adjacent liquid crystal layer LCL. The second liquid crystal alignment layer LCA2 may include a polymer organic material that is the same as or different from that of the first liquid crystal alignment layer LCA1.

Figure 8:
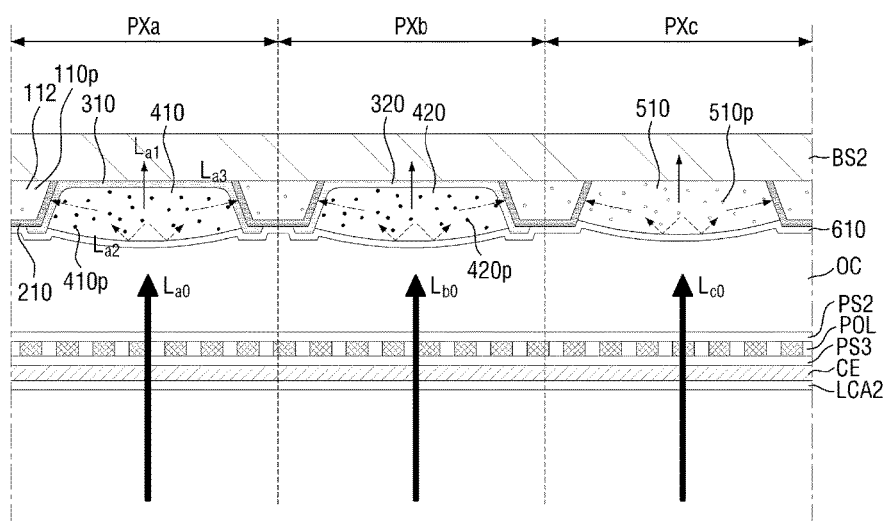
FIG. 8 illustrates paths of light that transmits through a second display panel of FIG. 4.
Figure 8:
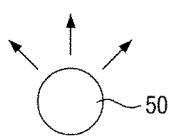

A process in which the display device 1 according to the exemplary embodiment realizes color display will now be described in more detail with reference to FIG. 8. FIG. 8 illustrates paths of light that transmits through the second display panel SUB2 of FIG. 4.

Referring to FIGS. 1, 2, 3, 4, 5, 6, 7, and 8, the light source unit 50 provides light of the third color to the display panel 31. In an exemplary embodiment, the light source unit 50 may provide the display panel 31 with light of the third color having a peak wavelength in the range of about 430 to 470 nm.

Light $L_{n0}$ provided by the light source unit 50 and incident on the first pixel PXa of the display panel 31 may be transmitted through the fourth wavelength band filter 610, converted or shifted to the peak wavelength of the first color by the first wavelength shift material 410p, and then emitted in various directions regardless of an incident angle of the light $L_{n0}$.

Specifically, of light emitted from the first wavelength shift material 410p, light $L_{a1}$ emitted toward the second substrate BS2 (an upper side in FIG. 8) may transmit through the first wavelength band filter 310 as it is, thereby contributing to the display of the first color by the first pixel PXa.

In addition, light $L_{a2}$ emitted from the first wavelength shift material 410p toward the fourth wavelength band filter 610 (a lower side in FIG. 8) may be reflected by the fourth wavelength band filter 610 toward to viewer side, thereby contributing to the display of the first color by the first pixel PXa.

In addition. Light $L_{a3}$ emitted toward the second color conversion pattern 420 (a left/right side in FIG. 8) may be absorbed by the light-shielding member 210 disposed between the first color conversion pattern 410 and the second color conversion pattern 420, thereby preventing or reducing the light leakage defect.

Likewise. Light $L_{b0}$ provided by the light source unit 50 and incident on the second pixel PXb of the display panel 31 may be converted or shifted by the second wavelength shift material 420p to the peak wavelength of the second color, thereby contributing to the display of the second color by the second pixel PXb.

Light $L_{c0}$ provided by the light source unit 50 and incident on the third pixel PXc of the display panel 31 may transmit through the fourth wavelength band filter 610 and then transmit through the light transmission pattern 510 without wavelength conversion, thereby contributing to the display of the third color by the third pixel PXc.

Hereinafter, other embodiments will be described. For simplicity, a description of elements substantially identical to those of the display device 1 according to the above-described embodiment will be omitted, and the substantially identical elements will be understood by those skilled in the art from the attached drawings. The same reference numerals will be used for the same elements in the drawings.

Figure 9A:
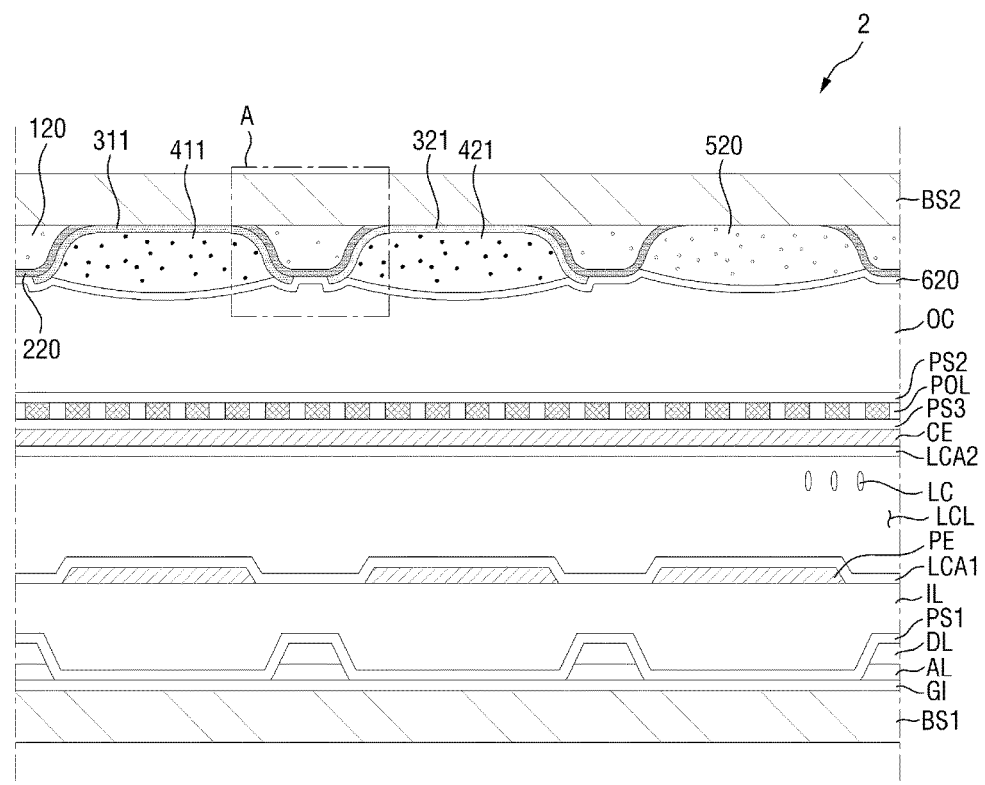
FIGS. 9A and 9B illustrate a display device according to an exemplary embodiment.
Figure 9B:
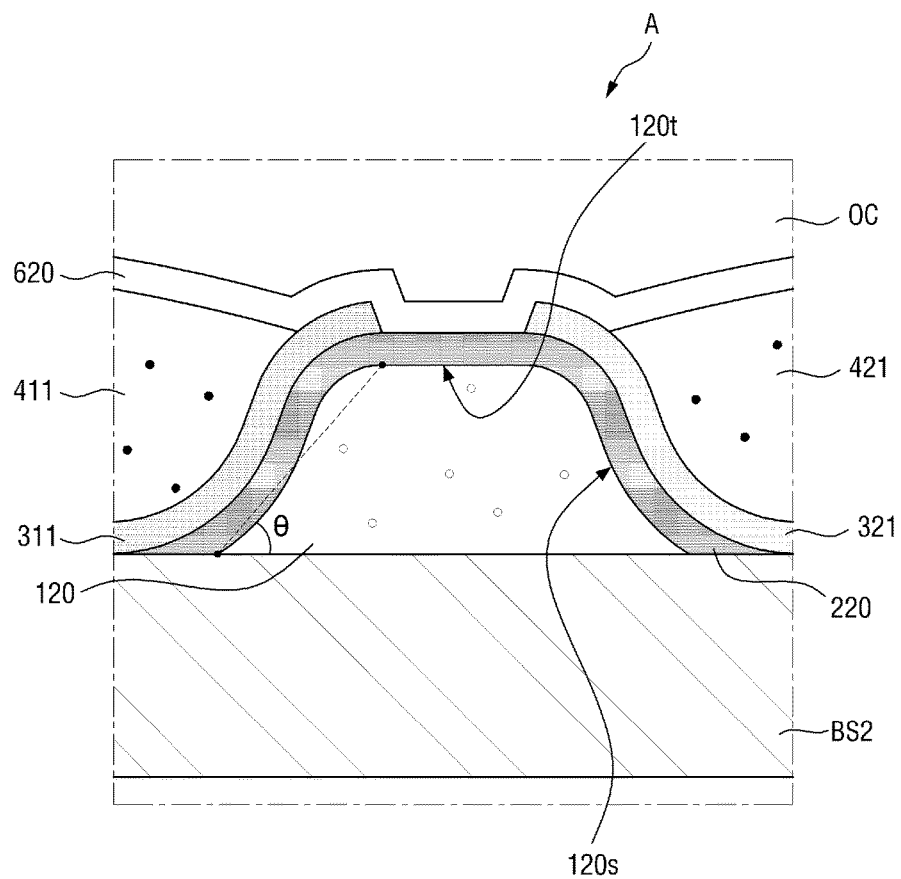

FIGS. 9A and 9B illustrate a display device 2 according to an exemplary embodiment. FIG. 9A is a cross-section view corresponding to FIG. 4, and FIG. 9B is an enlarged view of an area 'A' of FIG. 9A.

Referring to FIGS. 9A and 9B, the display device 2 according to the exemplary embodiment is different from the display device 1 according to the embodiment of FIG. 1 in that side surfaces 120s of a partition wall 120 are curved.

Specifically, the partition wall 120 may have a top surface 120t which forms a flat surface and the side surfaces 120s which are inclined downward from the top surface 120t. In an exemplary embodiment, the side surfaces 120s may be gently inclined from the top surface 120t, gradually become more sharply inclined, and then become gently inclined again from an inflection point to reach a second substrate BS2. In this case, the upper limit of an average inclination angle θ of the side surfaces 120s of the partition wall 120 with respect to a surface of the second substrate BS2 may be about 85 degrees, about 80 degrees, about 70 degrees, about 60 degrees, or about 50 degrees. When the side surface 120s are curved surfaces, the 'average inclination angle' may be an inclination angle obtained by calculating the average of different inclinations in an arbitrary section. The average inclination angle can be represented by a ratio of a difference of elevation to a horizontal distance between lowest ends of the side surfaces 120s of the partition wall 120 and the top surface 120t of the partition wall 120 where there is no slope.

A light-shielding member 220 may be disposed on the partition wall 120 along the curved side surfaces 120s of the partition wall 120. In addition, a first wavelength band filter 311 and a second wavelength band filter 321 may be disposed on the light-shielding member 220 also along the curved side surfaces 120s of the partition wall 120.

Figure 10A:
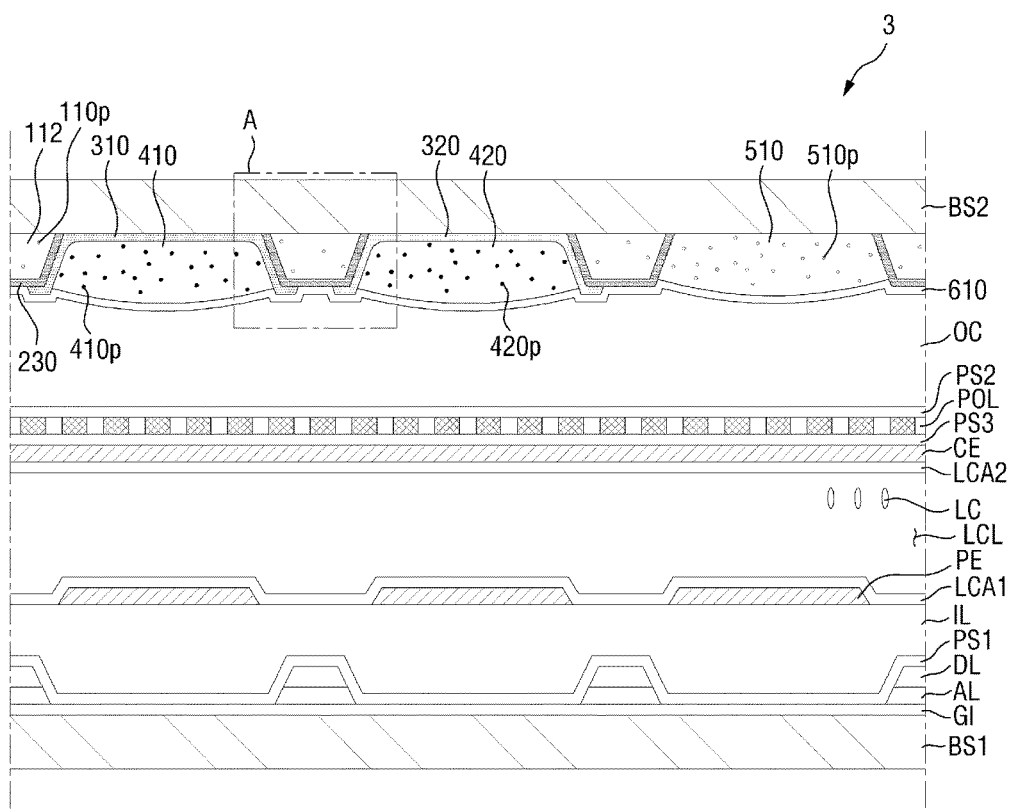
FIGS. 10A, 10B, 11, 12A, 12B, 13A, 13B, 14A, 14B, 15A, 15B, 16A, 16B, 17A, 17B, 18A, 18B, 19A, 19B, 20A, 20B, 21A, 21B, 21C, 22A, 22B, 23A, 23B, 24A, 24B, 25A, and 25B illustrate display devices according to embodiments.
Figure 10B:
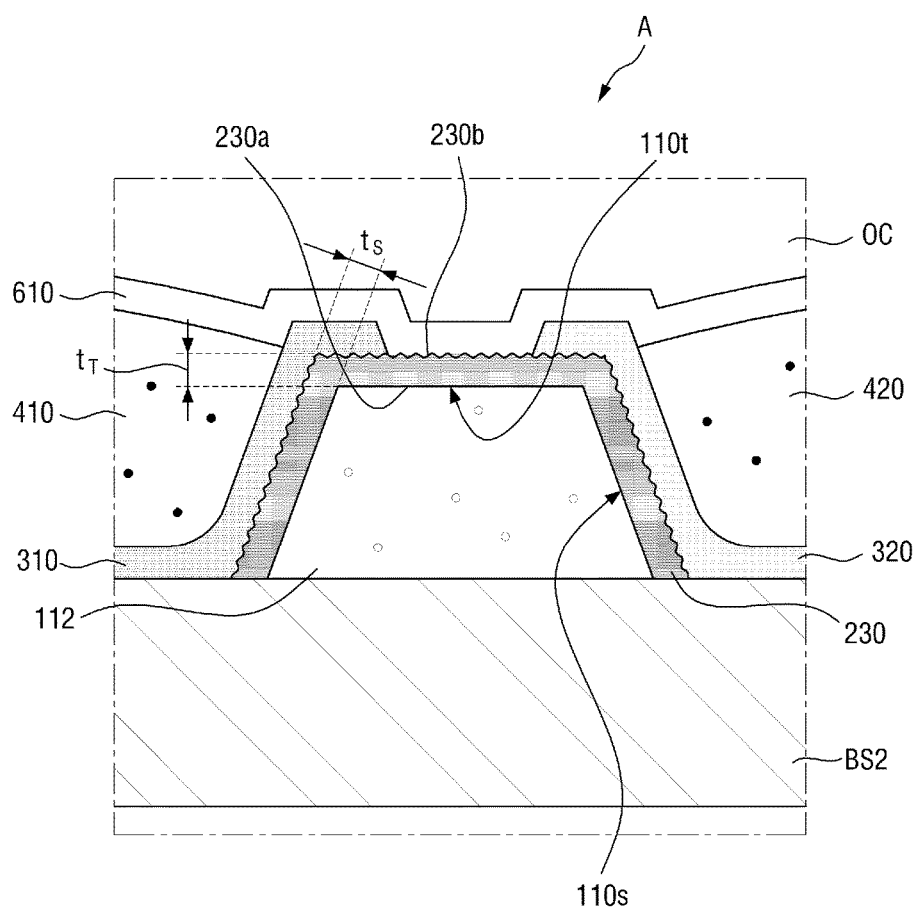

FIGS. 10A and 10B illustrate a display device 3 according to an exemplary embodiment. FIG. 10A is a cross-section view corresponding to FIG. 4, and FIG. 10B is an enlarged view of an area 'A' of FIG. 10A.

Referring to FIGS. 10A and 10B, the display device 3 according to the exemplary embodiment is different from the display device 1 according to the embodiment of FIG. 1 in that a surface of a light-shielding member 230 has a certain roughness.

In an exemplary embodiment, the light-shielding member 230 may be disposed directly on a partition wall 112. Here, the roughness of a first surface 230a of the light-shielding member 230, which contacts the partition wall 112, may be smaller than the roughness of a second surface 230b which is opposite to the first surface 230a. The second surface 230b of the light-shielding member 230 may be a surface in contact with a first wavelength band filter 310, a second wavelength band filter 320, a light transmission pattern 510, and/or a fourth wavelength band filter 610.

Although the exemplary embodiments are not limited to the following example, when the light-shielding member 230 is formed by a back exposure process in which light is radiated from the side of a second substrate BS2, the first surface 230a of the light-shielding member 230 may be cured before the second surface 230b. That is, the first surface 230a of the light-shielding member 230 which contacts the partition wall 112 may first be exposed to light and cured, and the light may be gradually absorbed by the light-shielding member 230 as it passes through the light-shielding member 230. In other words, the amount of light passing through the light-shielding member 230 may gradually decrease due to the light-absorbing characteristics of the light-shielding member 230. Therefore, the second surface 230b of the light-shielding member 230 may be exposed to a smaller amount of light than the first surface 230a. The second surface 230b, which is cured relatively less and does not show a constant depth, may have a greater roughness than the first surface 230a in the process of developing the shielding member 230 cured in the curing process through light exposure.

The roughness of the second surface 230b of the light-shielding member 230 can be adjusted by the intensity and/or radiation time of light irradiated to cure the light-shielding member 230. When any one surface of the light-shielding member 230 has a certain roughness, a thickness $t_T$ or $t_S$ of the light-shielding member 230 may be expressed as a distance from the first surface 230a to protruding portions of the second surface 230b.

Figure 11:
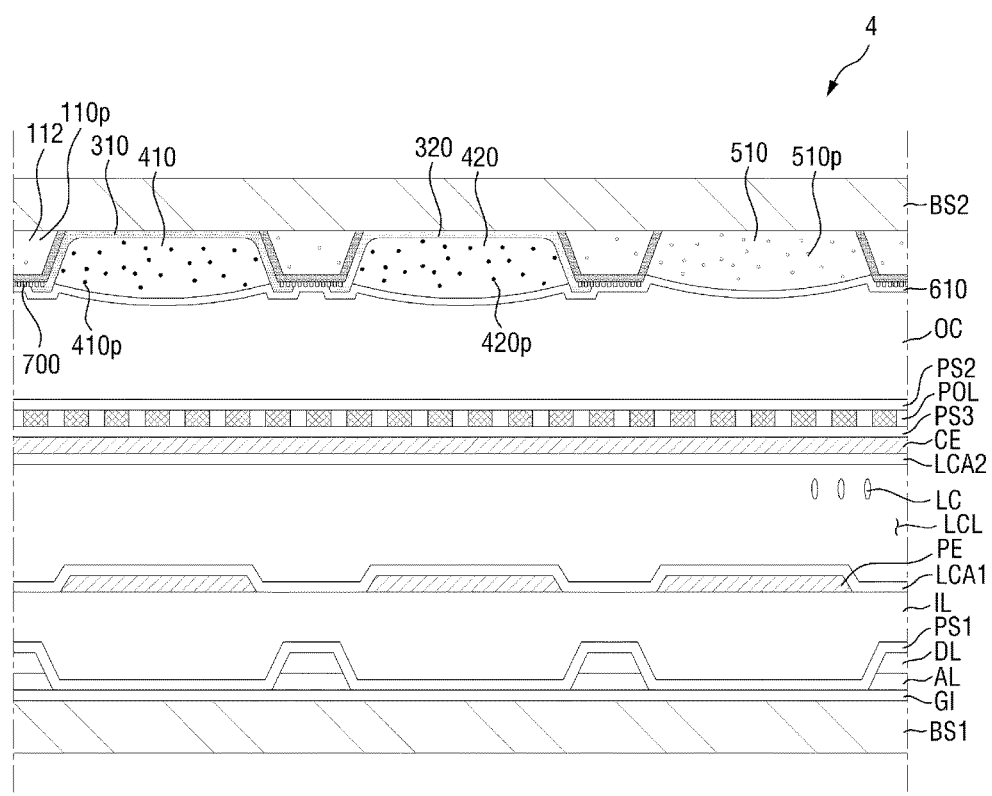

FIG. 11 is a cross-section view of a display device 4 according to an exemplary embodiment, which corresponds to FIG. 4.

Referring to FIG. 11, the display device 4 according to the exemplary embodiment is different from the display device 3 according to the embodiment of FIG. 10 in that it further includes recessed and protruding patterns 700 disposed on a light-shielding member 230.

In an exemplary embodiment, the recessed and protruding patterns 700 may be disposed on the light-shielding member 230 disposed on a top surface of a partition wall 112. The recessed and protruding patterns 700 may be a plurality of linear patterns arranged parallel to each other to be separated from each other in plan view or may be substantially quadrangular island patterns arranged in a matrix form or randomly in plan view.

The recessed and protruding patterns 700 may give certain hydrophobicity to a surface of the light-shielding member 230. For example, the surface of the light-shielding member 230 disposed on the top surface of the partition wall 112 may have greater hydrophobicity than that of the surface of the light-shielding member 230 disposed on side surfaces of the partition wall 112.

Although the exemplary embodiments are not limited to the following example, when color conversion patterns 410 and 420 are formed by an inkjet process, the recessed and protruding patterns 700 disposed on the top surface of the partition wall 112 may reduce a surface area that an ink composition can contact, thereby reducing surface energy. Accordingly, this can make it easy to form the color conversion patterns 410 and 420.

Figure 12A:
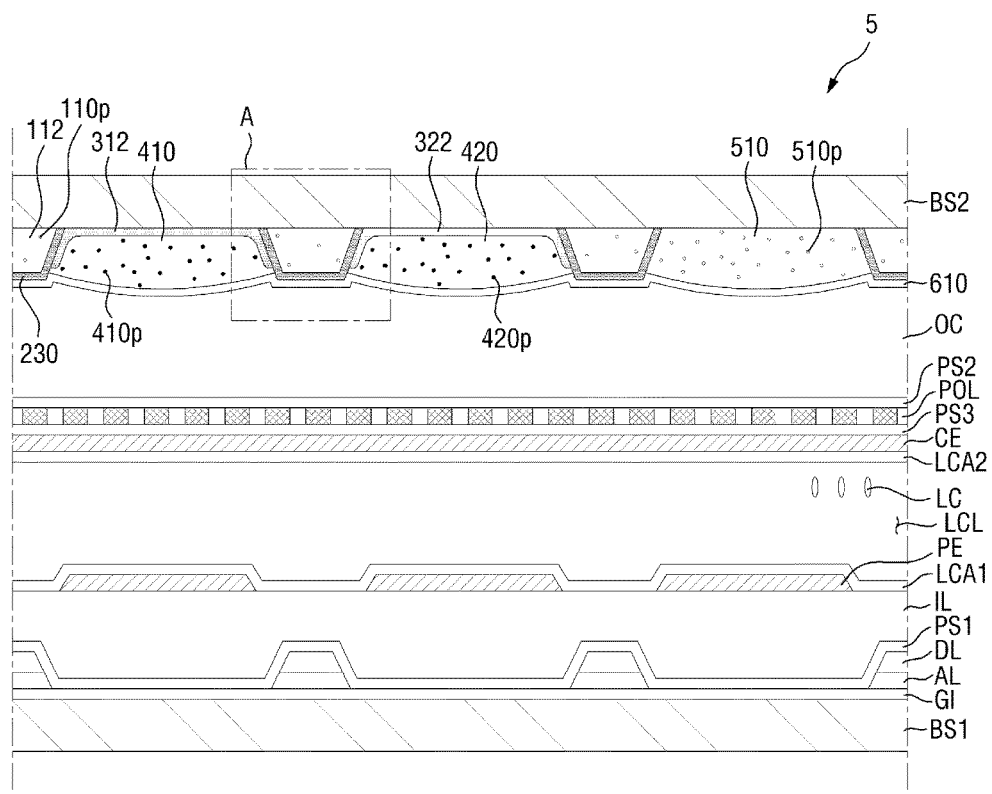
Figure 12B:
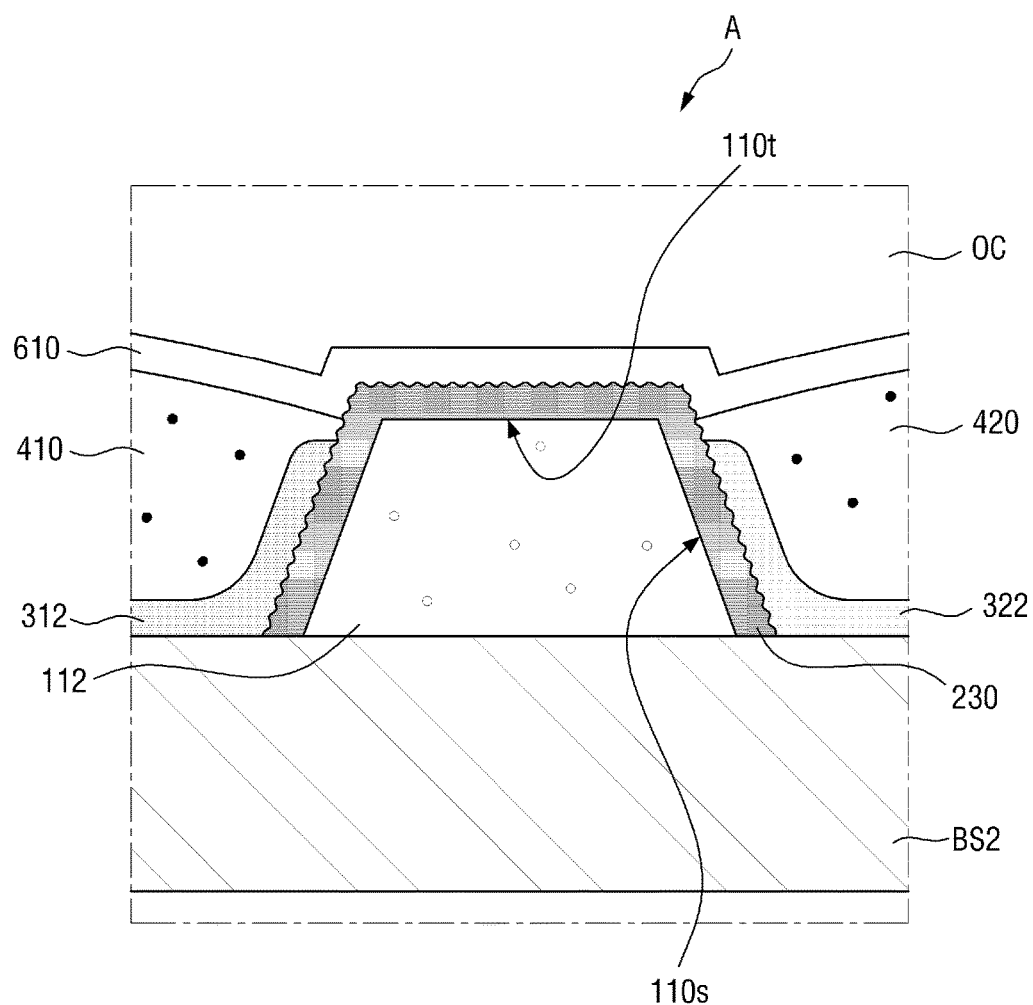

FIGS. 12A and 12B illustrate a display device 5 according to an exemplary embodiment. FIG. 12A is a cross-section view corresponding to FIG. 4, and FIG. 12B is an enlarged view of an area 'A' of FIG. 12A.

Referring to FIGS. 12A and 12B, the display device 5 according to the exemplary embodiment is different from the display device 3 according to the embodiment of FIG. 10 in that a first wavelength band filter 312 and a second wavelength band filter 322 do not overlap a top surface 110t of a partition wall 112.

In an exemplary embodiment, a highest point of each of the first wavelength band filter 312 and the second wavelength band filter 322 from a surface of a second substrate BS2 may be lower than a height of the partition wall 112, that is, the top surface 110t of the partition wall 112. Accordingly, a first color conversion pattern 410 and a second color conversion pattern 420 may be in contact with a light-shielding member 230.

When different portions of a surface of the light-shielding member 230 have different degrees of hydrophobicity, for example, when the surface of the light-shielding member 230 disposed on the top surface 110t of the partition wall 112 has greater hydrophobicity than that of the surface of the light-shielding member 230 disposed on side surfaces 110s of the partition wall 112, the surface of the light-shielding member 230 not covered by the first wavelength band filter 312 and the second wavelength band filter 322 may have a pinning point formed by the degree of hydrophobicity. This can make it easy to form color conversion patterns 410 and 420.

Figure 13A:
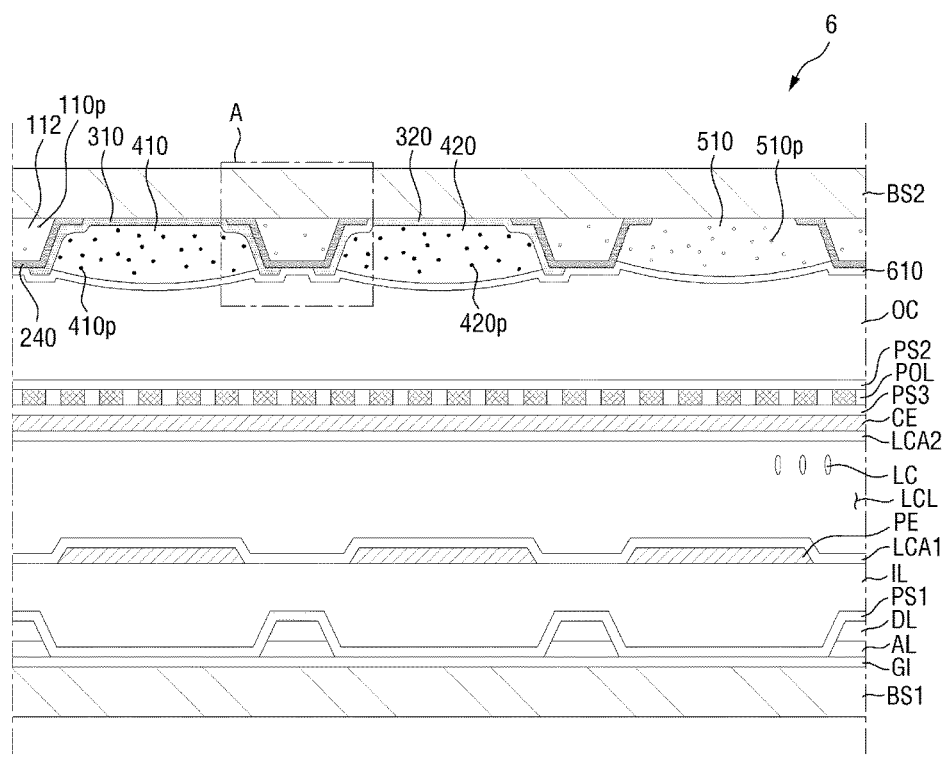
Figure 13B:
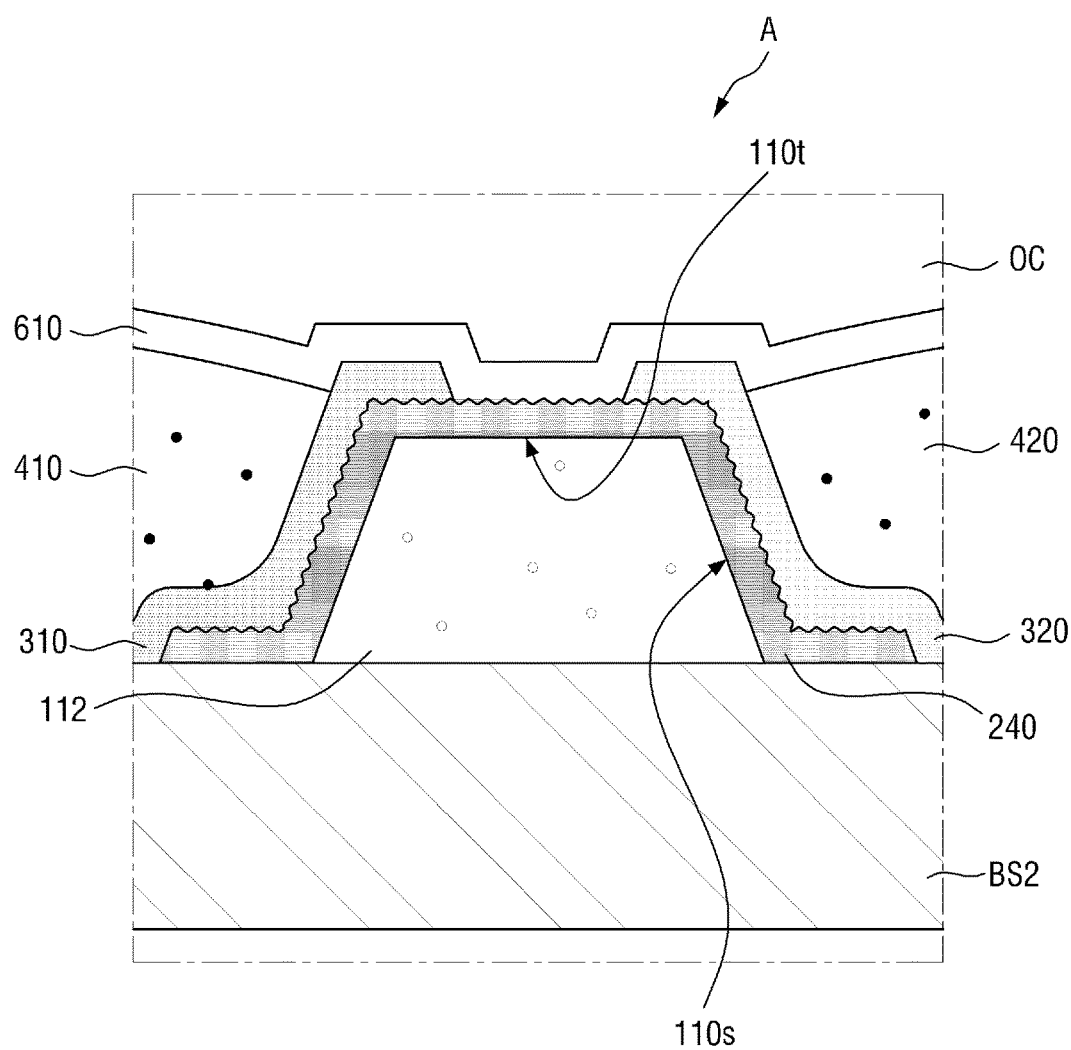

FIGS. 13A and 13B illustrate a display device 6 according to an exemplary embodiment. FIG. 13A is a cross-section view corresponding to FIG. 4, and FIG. 13B is an enlarged view of an area 'A' of FIG. 13A.

Referring to FIGS. 13A and 13B, the display device 6 according to the exemplary embodiment is different from the display device 3 according to the embodiment of FIG. 10 in that at least a part of a light-shielding member 240 is disposed between a second substrate BS2 and color conversion patterns 410 and 420 and that a surface of the light-shielding member 240 disposed between the second substrate BS2 and the color conversion patterns 410 and 420 is substantially parallel to a surface of the second substrate BS2.

Specifically, at least a portion of the light-shielding member 240 may be disposed between the second substrate BS2 and a first wavelength band filter 310 and may be in contact with the second substrate BS2 and the first wavelength band filter 310. In this case, the surface of the light-shielding member 240 disposed between the second substrate BS2 and the first wavelength band filter 310 may be substantially parallel to the surface of the second substrate BS2.

Likewise, at least a portion of the light-shielding member 240 may be disposed between the second substrate BS2 and a second wavelength band filter 320 and may be in contact with the second substrate BS2 and the second wavelength band filter 320. In this case, the surface of the light-shielding member 240 disposed between the second substrate BS2 and the second wavelength band filter 320 may be substantially parallel to the surface of the second substrate BS2.

In addition, at least a portion of the light-shielding member 240 may be disposed between the second substrate BS2 and a light transmission pattern 510 and may be in contact with the second substrate BS2 and the light transmission pattern 510. In this case, the surface of the light-shielding member 240 disposed between the second substrate BS2 and the light transmission pattern 510 may be substantially parallel to the surface of the second substrate BS2.

In the display device 6 according to the exemplary embodiment, a maximum width of the light-shielding member 240 which contacts the second substrate BS2 can be made relatively large. Accordingly, this can minimize or reduce the color mixture defect of the display device 6.

Figure 14A:
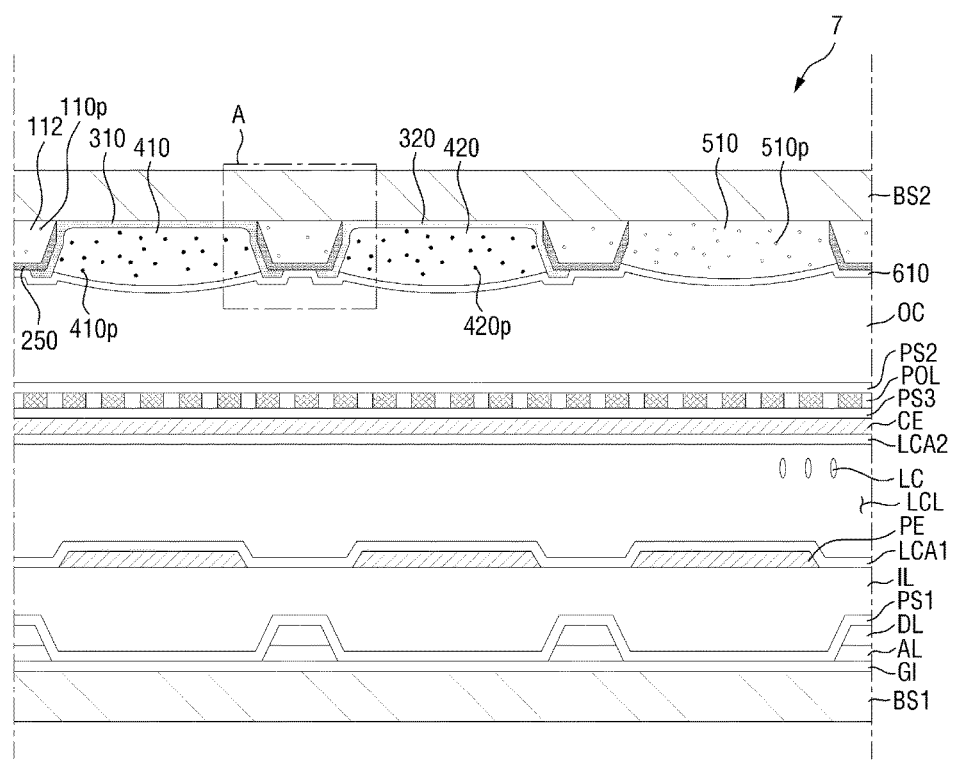
Figure 14B:
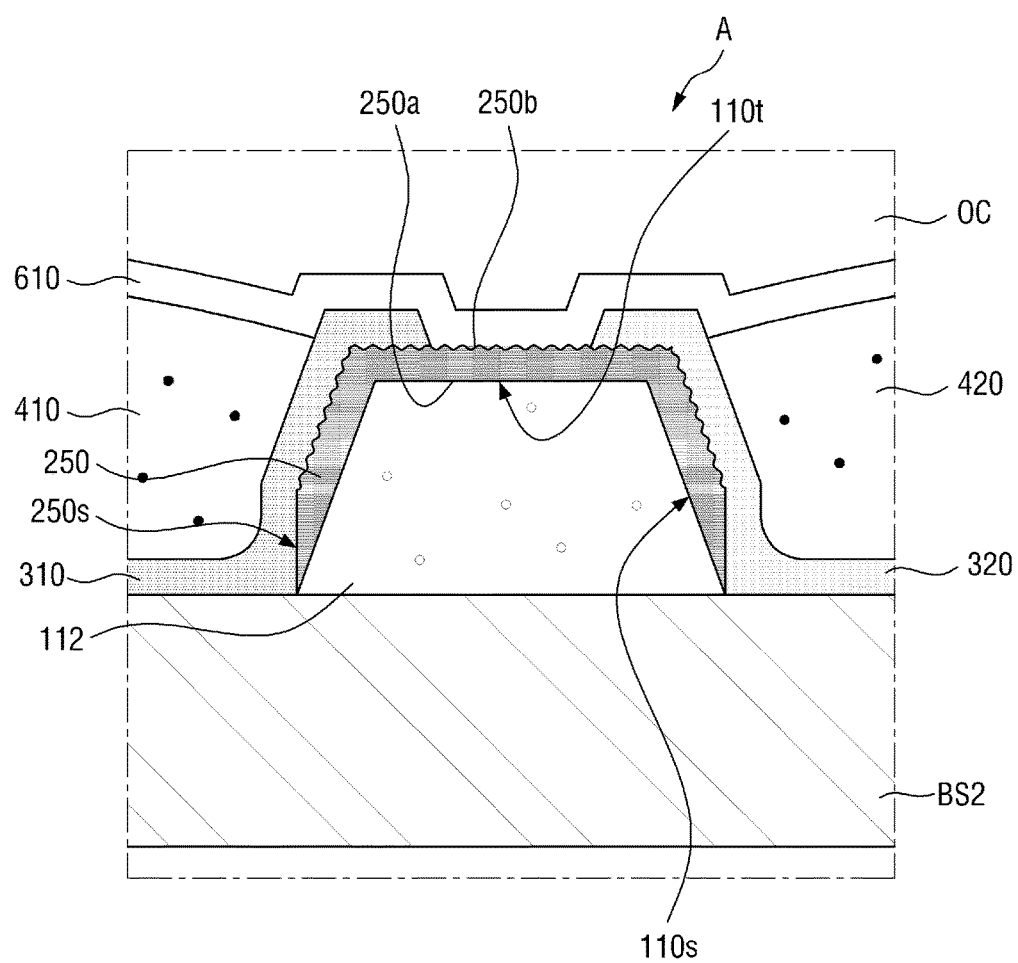

FIGS. 14A and 14B illustrate a display device 7 according to an exemplary embodiment. FIG. 14A is a cross-section view corresponding to FIG. 4, and FIG. 14B is an enlarged view of an area 'A' of FIG. 14A.

Referring to FIGS. 14A and 14B, the display device 7 according to the exemplary embodiment is different from the display device 3 according to the embodiment of FIG. 10 in that a light-shielding member 250 further includes a third surface 250s perpendicular to a surface of a second substrate BS2.

The light-shielding member 250 is disposed directly on a partition wall 112 and has a first surface 250a which contacts the partition wall 112 and a second surface 250b which is opposite to the first surface 250a. The light-shielding member 250 further has the third surface 250s which connects the first surface 250a and the second surface 250b and is substantially perpendicular to the surface of the second substrate BS2.

In an exemplary embodiment, the roughness of the third surface 250s of the light-shielding member 250 may be smaller than the roughness of the second surface 250b. The second surface 250b and the third surface 250s of the light-shielding member 250 may all be in contact with a first wavelength band filter 310, a second wavelength band filter 320, or a light transmission pattern 510.

In the display device 7 according to the exemplary embodiment, the light-shielding member 250 has a height component in the third direction Z. Therefore, the light-shielding member 250 can suppress or reduce a defect in which light travels between neighboring pixels while maximizing or increasing the width of each opening from which light for color display is emitted. Accordingly, light utilization efficiency can be increased.

Figure 15A:
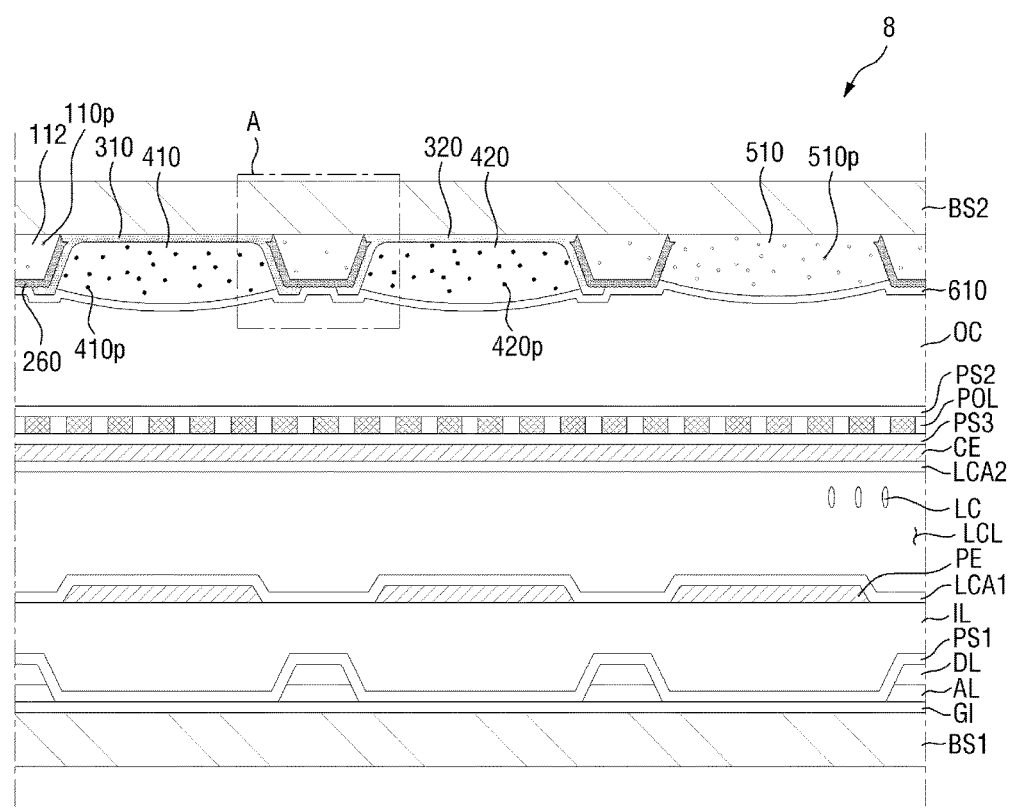
Figure 15B:
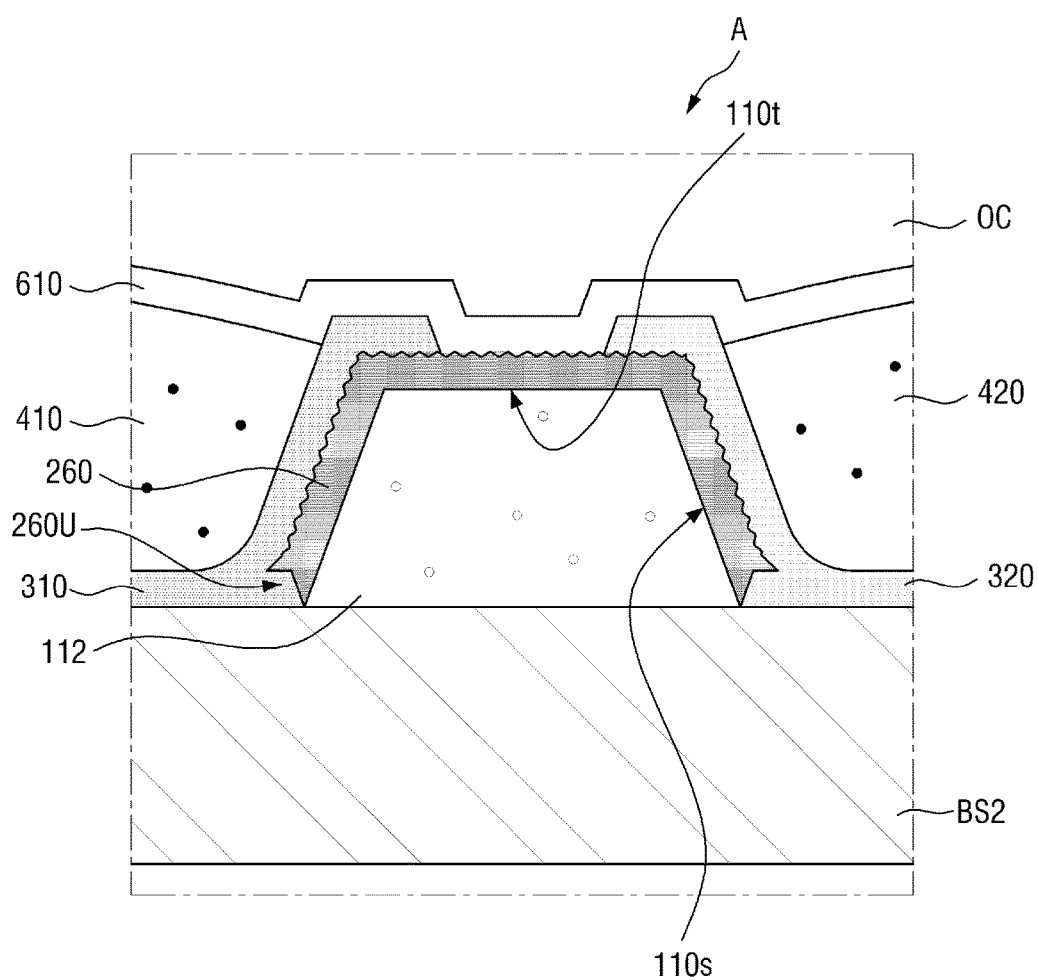

FIGS. 15A and 15B illustrate a display device 8 according to an exemplary embodiment. FIG. 15A is a cross-section view corresponding to FIG. 4, and FIG. 15B is an enlarged view of an area 'A' of FIG. 15A.

Referring to FIGS. 15A and 15B, the display device 8 according to the exemplary embodiment is different from the display device 3 according to the embodiment of FIG. 10 in that a light-shielding member 260 has an undercut 260U at its lower end. As used herein, the term 'undercut' denotes that a lower end of an element is recessed inwardly to form a substantially mushroom-shaped cross-section in plan view.

In an exemplary embodiment, at least a part of a first wavelength band filter 310 may be interposed between the light-shielding member 260 and a second substrate BS2. In exemplary embodiments, the first wavelength band filter 310 may not completely fill a space between the light-shielding member 260 and the second substrate BS2, leaving an air layer in the space. In addition, part of the light-shielding member 260 may contact the second substrate BS2.

Likewise, at least a part of a second wavelength band filter 320 may be interposed between the light-shielding member 260 and the second substrate BS2. In addition, at least a part of a light transmission pattern 510 may be interposed between the light-shielding member 260 and the second substrate BS2.

In FIGS. 15A and 15B, a surface of the light-shielding member 260 at the undercut 260U of the light-shielding member 260 is inclined in a direction opposite to a direction in which side surfaces 110s of a partition wall 112 are inclined. However, in an exemplary embodiment, the surface of the light-shielding member 260 at the undercut 260U may be substantially perpendicular to a surface of the second substrate BS2 or may be inclined in the same direction as the side surfaces 110s of the partition wall 112.

In the display device 8 according to the exemplary embodiment, the light-shielding member 260 has a height component in the third direction Z. Therefore, the light-shielding member 260 can suppress or reduce a defect in which light travels between neighboring pixels while maximizing or increasing the width of each opening from which light for color display is emitted. Accordingly, light utilization efficiency can be increased.

Figure 16A:
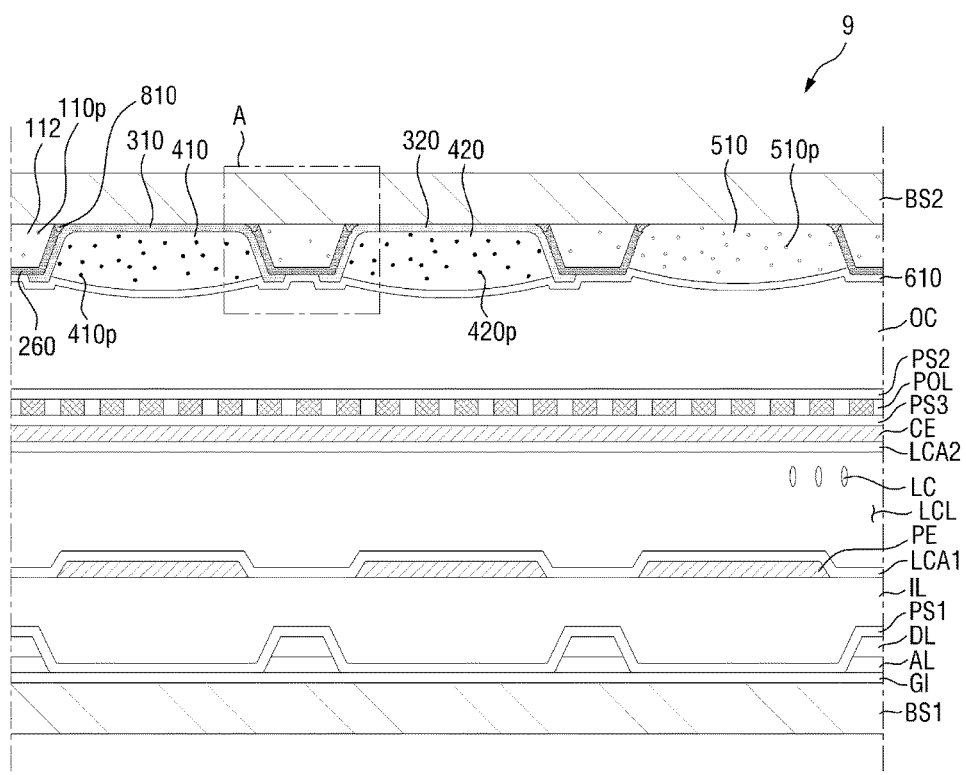
Figure 16B:
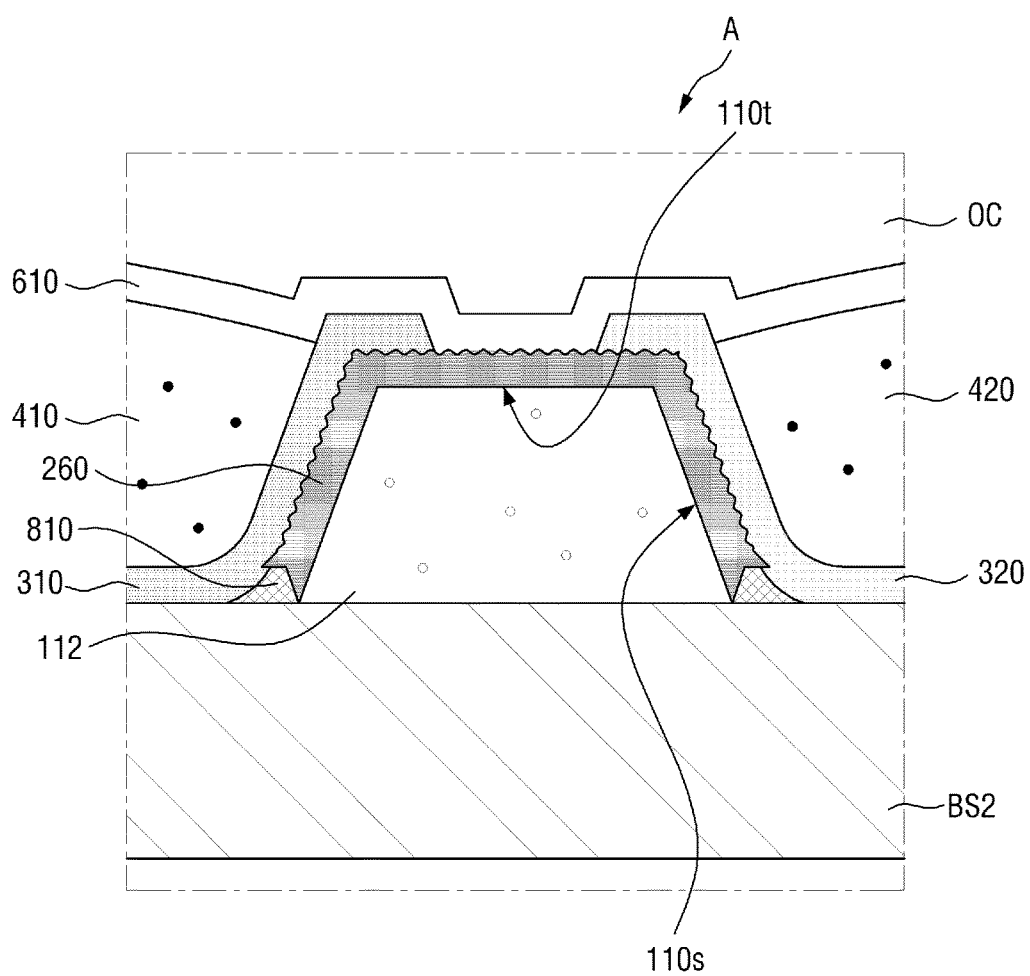

FIGS. 16A and 16B illustrate a display device 9 according to an exemplary embodiment. FIG. 16A is a cross-section view corresponding to FIG. 4, and FIG. 16B is an enlarged view of an area 'A' of FIG. 16A.

Referring to FIGS. 16A and 16B, the display device 9 according to the exemplary embodiment is different from the display device 8 according to the embodiment of FIG. 15 in that it further includes an opaque material pattern 810 disposed on an undercut portion of a light-shielding member 260.

The opaque material pattern 810 may be interposed between the light-shielding to member 260 and a second substrate BS2. In FIGS. 16A and 16B, the opaque material pattern 810 is in contact with the light-shielding member 260, the second substrate BS2 and a first wavelength band filter 310. However, the exemplary embodiments are not limited thereto.

The opaque material pattern 810 may include a different material from the light-shielding member 260. The opaque material pattern 810 is not particularly limited as long as it is can at least partially block the transmission of light. For example, the opaque material pattern 810 may include a reflective metal material such as aluminum, copper, silver, gold, titanium, molybdenum, nickel, or an alloy of these materials.

The opaque material pattern 810 may be disposed between a first color conversion pattern 410 and a second color conversion pattern 420 and between the second color conversion pattern 420 and a light transmission pattern 510. The opaque material pattern 810 can suppress or reduce the leakage of light between adjacent pixels. In addition, when the opaque material pattern 810 included in the display device 9 according to the exemplary embodiment is made of a reflective metal material, the opaque material pattern 810 disposed between adjacent pixels may reflect at least a part of light traveling toward a neighboring pixel, thereby improving light utilization efficiency.

Figure 17A:
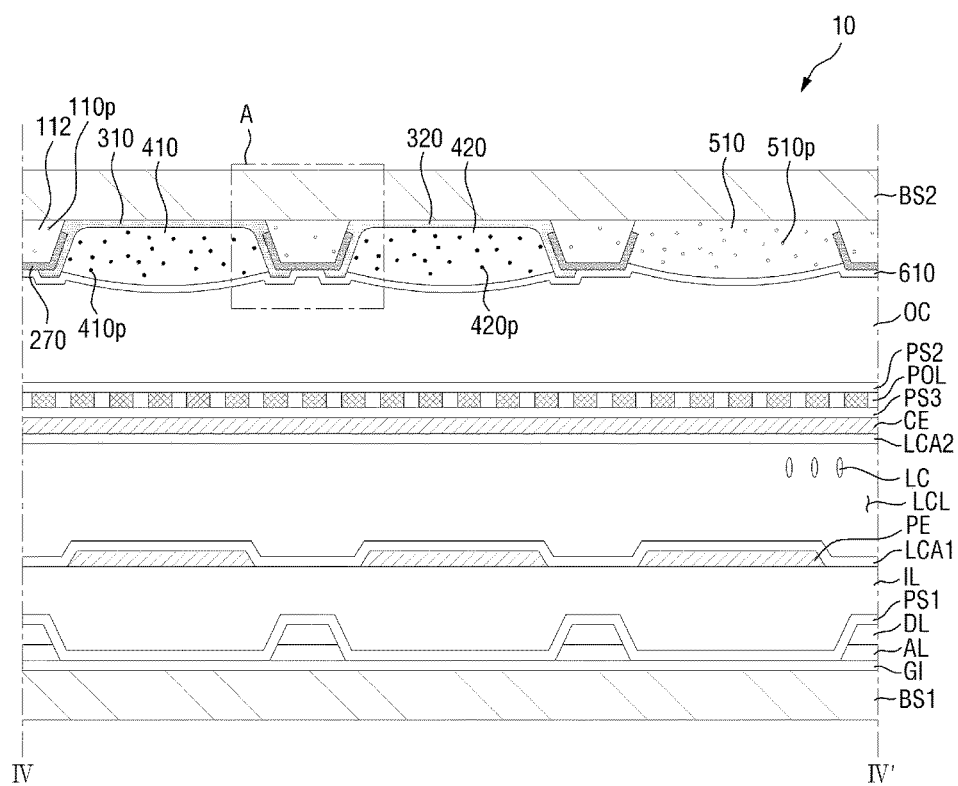
Figure 17B:
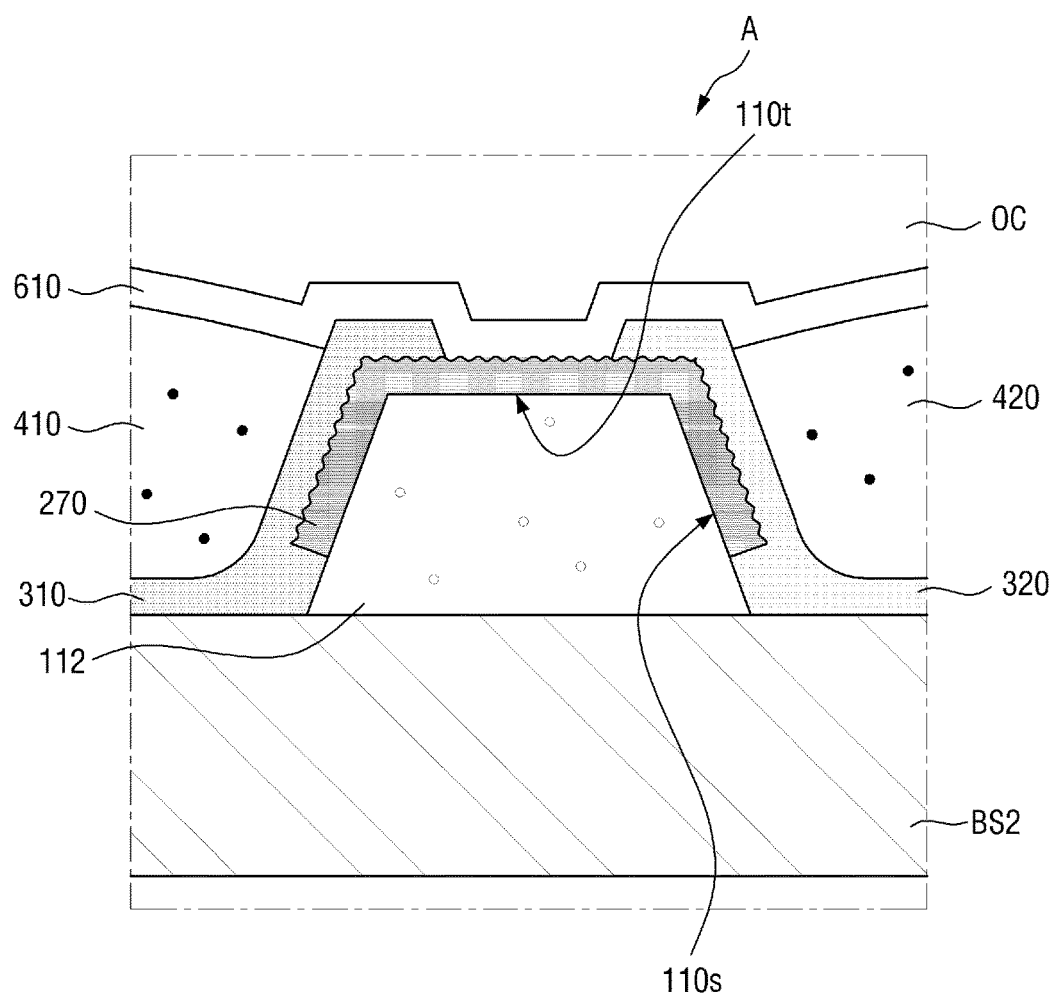

FIGS. 17A and 17B illustrate a display device 10 according to an exemplary embodiment. FIG. 17A is a cross-section view corresponding to FIG. 4, and FIG. 17B is an enlarged view of an area 'A' of FIG. 17A.

Referring to FIGS. 17A and 17B, the display device 10 according to the exemplary embodiment is different from the display device 8 according to the embodiment of FIG. 15 in that a light-shielding member 270 is disposed on a top surface 110t of a partition wall 112 and side surfaces 110s of the partition wall 112 but is separated from a second substrate BS2.

In an exemplary embodiment, the light-shielding member 270 may at least partially surround the partition wall 112 and at least partially expose the side surfaces 110s of the partition wall 112 without completely covering the side surfaces 110s of the partition wall 112.

For example, at least a part of a first wavelength band filter 310 may be interposed between the light-shielding member 270 and the second substrate BS2. In addition, the first wavelength band filter 310 may be in contact with the second substrate BS2, the light-shielding member 270, and the side surfaces 110s of the partition wall 112.

Likewise, at least a part of a second wavelength band filter 320 may be interposed between the light-shielding member 270 and the second substrate BS2. The second wavelength band filter 320 may be in contact with the second substrate BS2, the light-shielding member 270 and the side surfaces 110s of the partition walls 112.

In addition, at least a part of a light transmission pattern 510 may be interposed between the light-shielding member 270 and the second substrate BS2. The light transmission pattern 510 may be in contact with the second substrate BS2, the light-shielding member 270 and the side surfaces 110s of the partition wall 112.

Figure 18A:
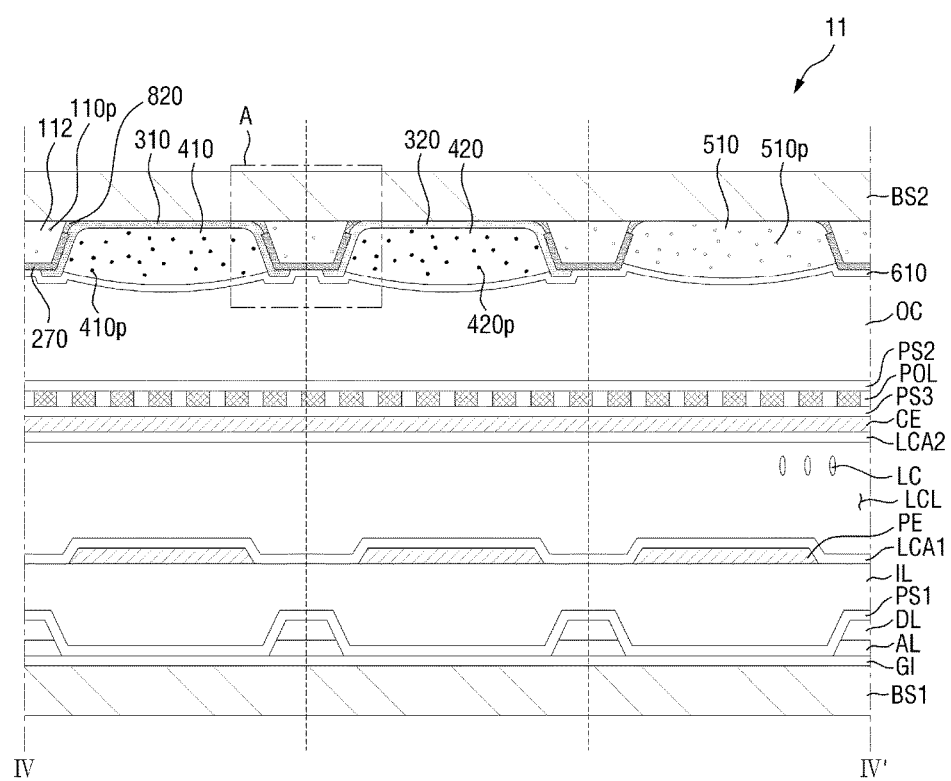
Figure 18B:
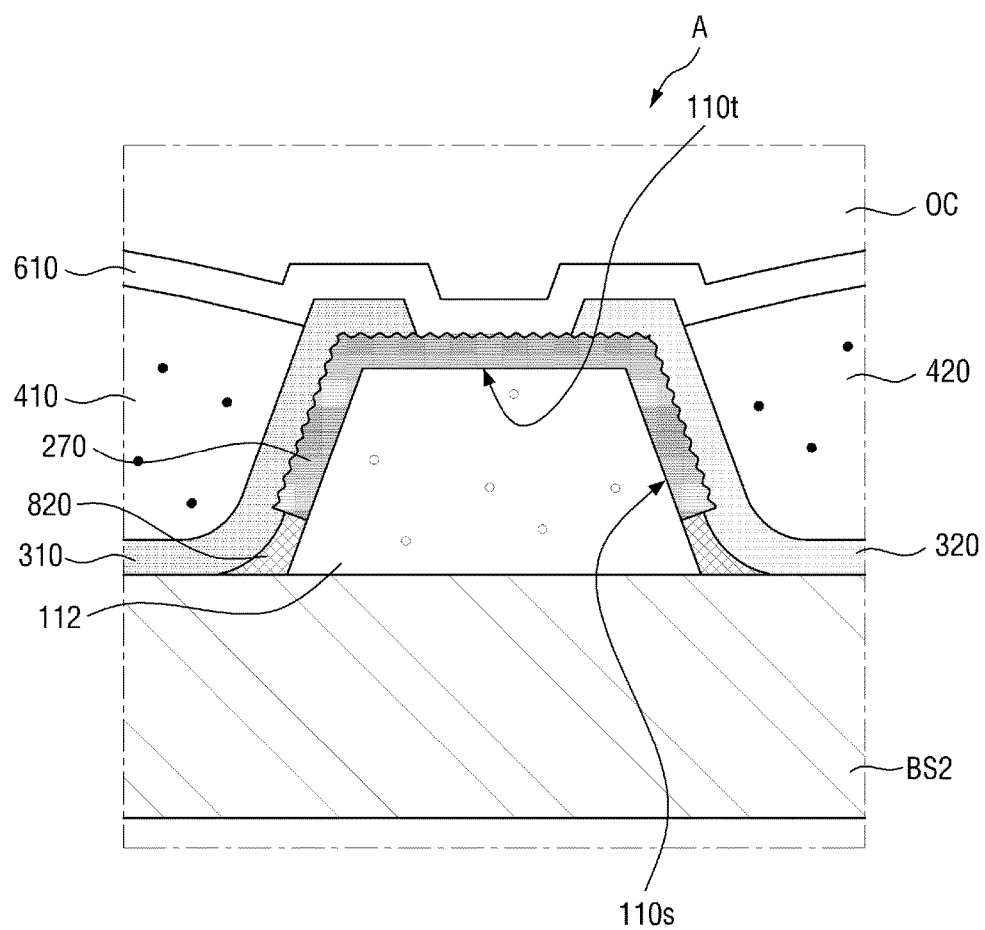

FIGS. 18A and 18B illustrate a display device 11 according to an exemplary embodiment. FIG. 18A is a cross-section view corresponding to FIG. 4, and FIG. 18B is an enlarged view of an area 'A' of FIG. 18A.

Referring to FIGS. 18A and 18B, the display device 11 according to the exemplary embodiment is different from the display device 10 according to the embodiment of FIG. 17 in that it further includes an opaque material pattern 820 disposed on side surfaces 110s of a partition wall 112.

The opaque material pattern 820 may be disposed directly on the side surfaces 110s of the partition wall 112. For example, the opaque material pattern 820 may be interposed between a light-shielding member 270 and a second substrate BS2. In FIG. 18, the opaque material pattern 820 is in contact with the light-shielding member 270, the second substrate BS2, the partition wall 112 and a first wavelength band filter 310. However, the exemplary embodiments are not limited thereto.

The opaque material pattern 820 may include a different material from the light-shielding member 270. The opaque material pattern 820 is not particularly limited as long as it can at least partially block the transmission of light. For example, the opaque material pattern 820 may include a reflective metal material such as aluminum, copper, silver, gold, titanium, molybdenum, nickel, or an alloy of these materials.

The opaque material pattern 820 may be disposed between a first color conversion pattern 410 and a second color conversion pattern 420 and between the second color conversion pattern 420 and a light transmission pattern 510.

The opaque material pattern 820 can suppress or reduce the leakage of light between adjacent pixels. In addition, when the opaque material pattern 820 included in the display device 11 according to the exemplary embodiment is made of a reflective metal material, the opaque material pattern 820 disposed between adjacent pixels may reflect at least a part of light traveling toward a neighboring pixel, thereby improving light utilization efficiency.

Figure 19A:
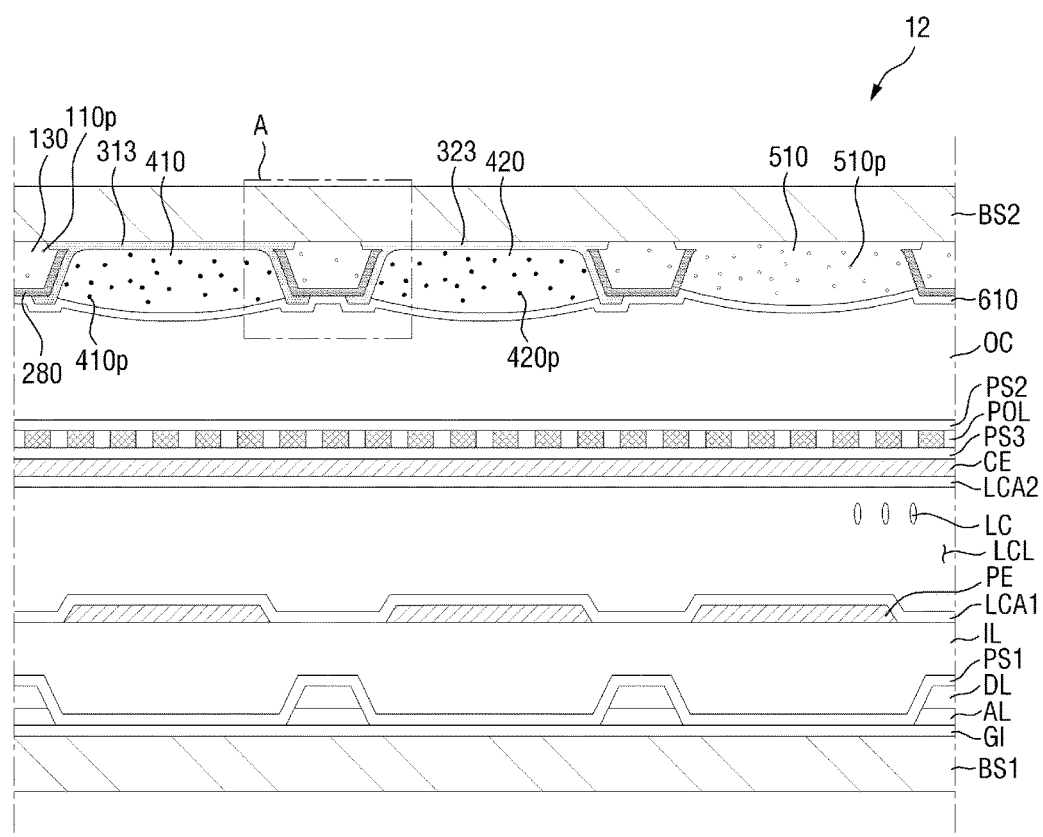
Figure 19B:
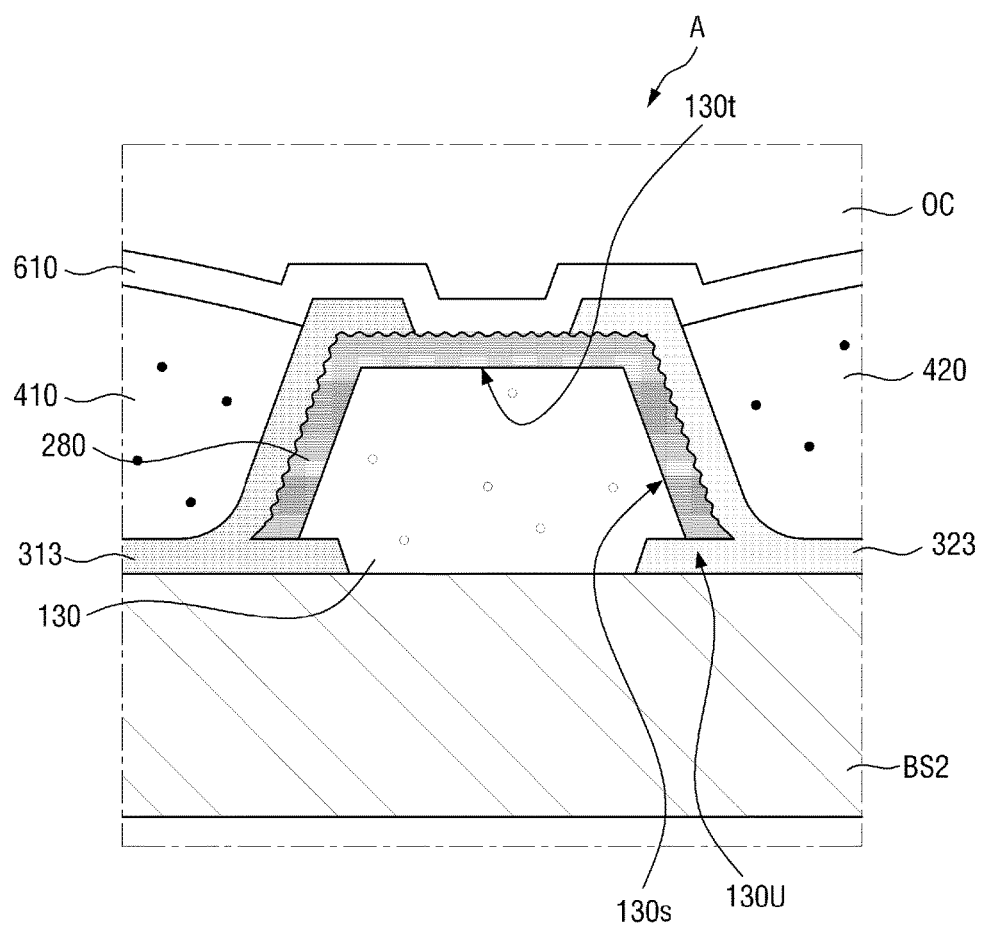

FIGS. 19A and 19B illustrate a display device 12 according to an exemplary embodiment. FIG. 19A is a cross-section view corresponding to FIG. 4, and FIG. 19B is an enlarged view of an area 'A' of FIG. 19A.

Referring to FIGS. 19A and 19B, the display device 12 according to the exemplary embodiment is different from the display device 8 according to the embodiment of FIG. 15 in that a partition wall 130 has an undercut 130U formed at its lower end.

In an exemplary embodiment, the lower end of the partition wall 130 may be recessed into the partition wall 130. That is, a width of the partition wall 130 at a portion where the partition wall 130 contacts a second substrate BS2 may be smaller than a maximum width of the partition wall 130.

In addition, at least a part of a first wavelength band filter 313 may be interposed between the partition wall 130 and the second substrate BS2 and between a light-shielding member 280 and the second substrate BS2. In exemplary embodiments, the first wavelength band filter 313 may not completely fill a space between the partition wall 130 and the second substrate BS2, leaving an air layer in the space. The light-shielding member 280 may be separated from the second substrate BS2.

For example, the first wavelength band filter 313 may be in contact with the second substrate BS2, the light-shielding member 280, and the partition wall 130.

Likewise, at least a part of a second wavelength band filter 323 may be interposed between the partition wall 130 and the second substrate BS2 and between the light-shielding member 280 and the second substrate BS2. The second wavelength band filter 323 may be in contact with the second substrate BS2, the light-shielding member 280, and the partition wall 130.

In addition, at least a part of a light-transmitting pattern 510 may be interposed between the partition wall 130 and the second substrate BS2 and between the light-shielding member 280 and the second substrate BS2. The light transmission pattern 510 may be in contact with the second substrate BS2, the light-shielding member 280, and the partition wall 130.

In the display device 12 according to the exemplary embodiment, a portion where the first wavelength band filter 313 contacts the second substrate BS2, a portion where the second wavelength band filter 323 contacts the second substrate BS2, and a portion where the light transmission pattern 510 contacts the second substrate BS2 may be wider than each opening formed by the partition wall 130. Therefore, light utilization efficiency can be improved without leakage of light between neighboring pixels.

Figure 20A:
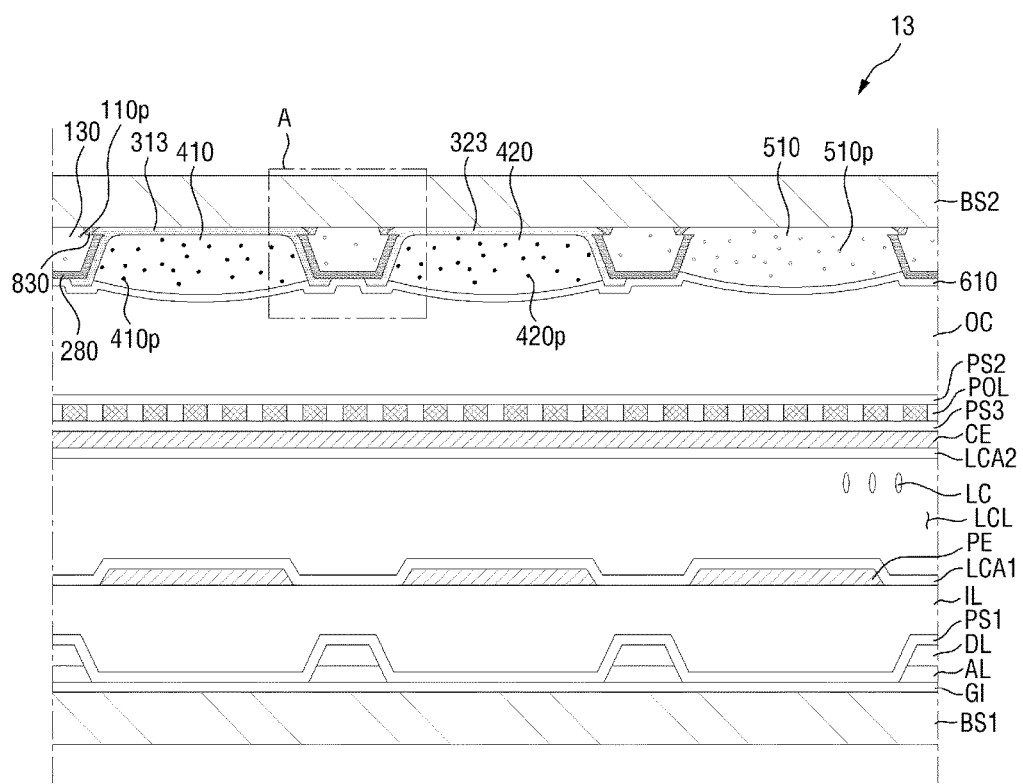
Figure 20B:
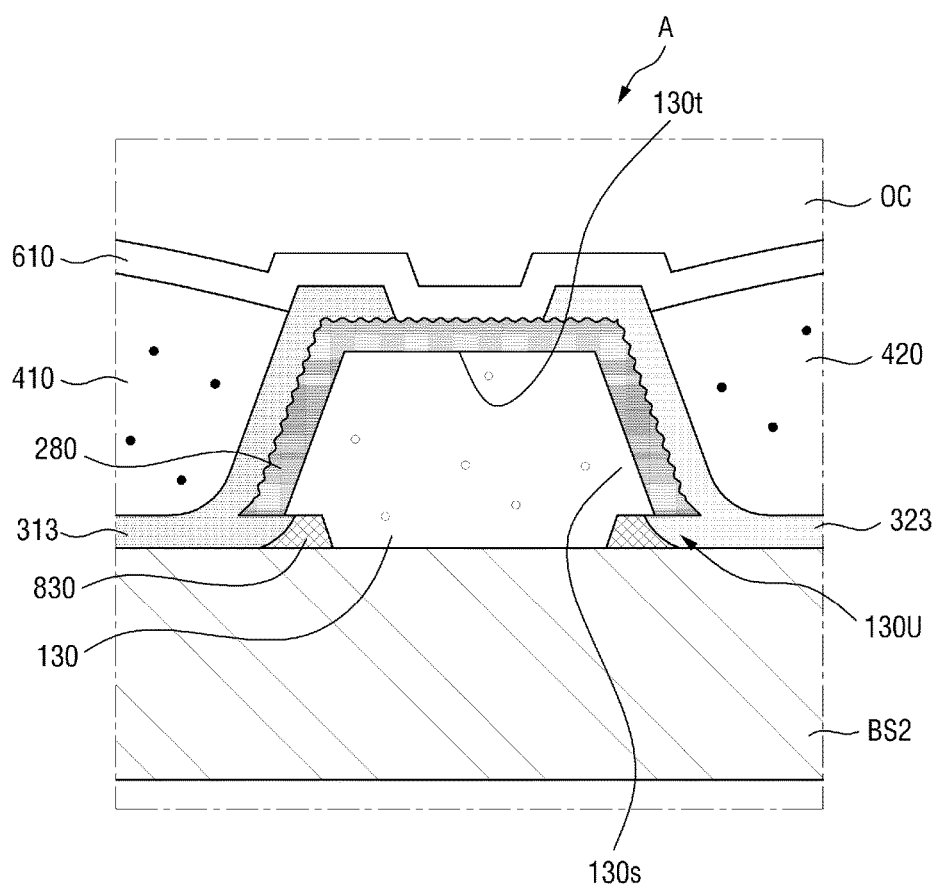

FIGS. 20A and 20B illustrate a display device 13 according to an exemplary embodiment. FIG. 20A is a cross-section view corresponding to FIG. 4, and FIG. 20B is an enlarged view of an area 'A' of FIG. 20A.

Referring to FIGS. 20A and 20B, the display device 13 according to the exemplary embodiment is different from the display device 12 according to the embodiment of FIG. 19 in that it further includes an opaque material layer 830 disposed on an undercut 130U of a partition wall 130.

The opaque material layer 830 may be interposed between the partition wall 130 and a second substrate BS2. In FIGS. 20A and 20B, the opaque material layer 830 is in contact with the second substrate BS2, the partition wall 130 and a first wavelength band filter 313. However, the exemplary embodiments are not limited thereto. In exemplary embodiments, the opaque material layer 830 may be located between a light-shielding member 280 and the second substrate BS2.

The opaque material layer 830 may include a different material from the light-shielding member 280. The opaque material layer 830 is not particularly limited as long as it can at least partially block the transmission of light. For example, the opaque material layer 830 may include a reflective metal material such as aluminum, copper, silver, gold, titanium, molybdenum, nickel, or an alloy of these materials.

The opaque material layer 830 may be disposed between a first color conversion pattern 410 and a second color conversion pattern 420 and between the second color conversion pattern 420 and a light transmission pattern 510. The opaque material layer 830 can suppress or reduce the leakage of light between adjacent pixels. In addition, when the opaque material layer 830 included in the display device 13 according to the exemplary embodiment is made of a reflective metal material, the opaque material layer 830 disposed between adjacent pixels may reflect at least a part of light traveling toward a neighboring pixel, thereby improving light utilization efficiency.

Figure 21A:
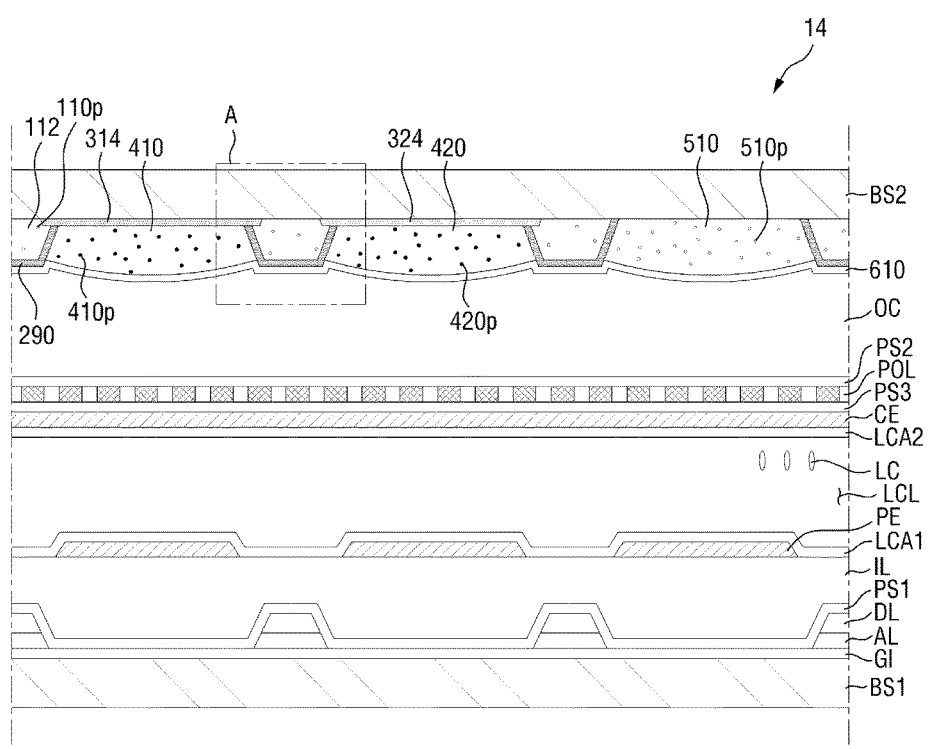
Figure 21B:
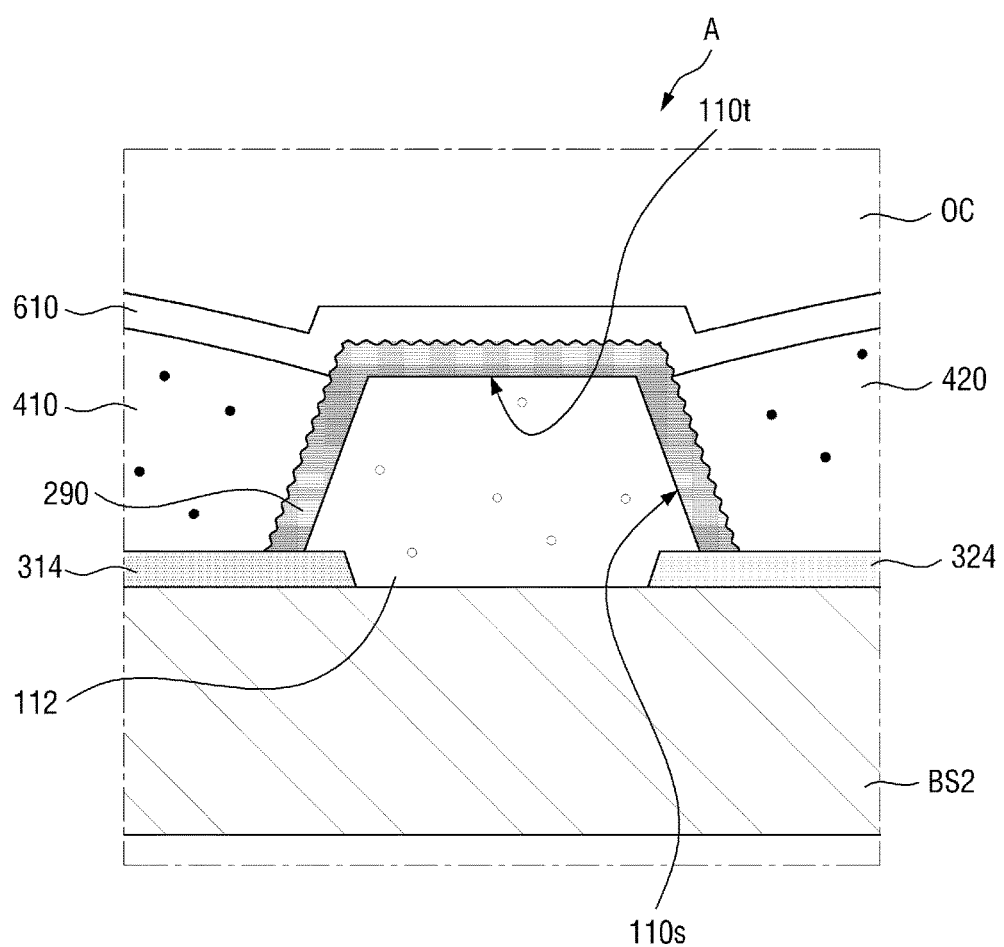
Figure 21C:
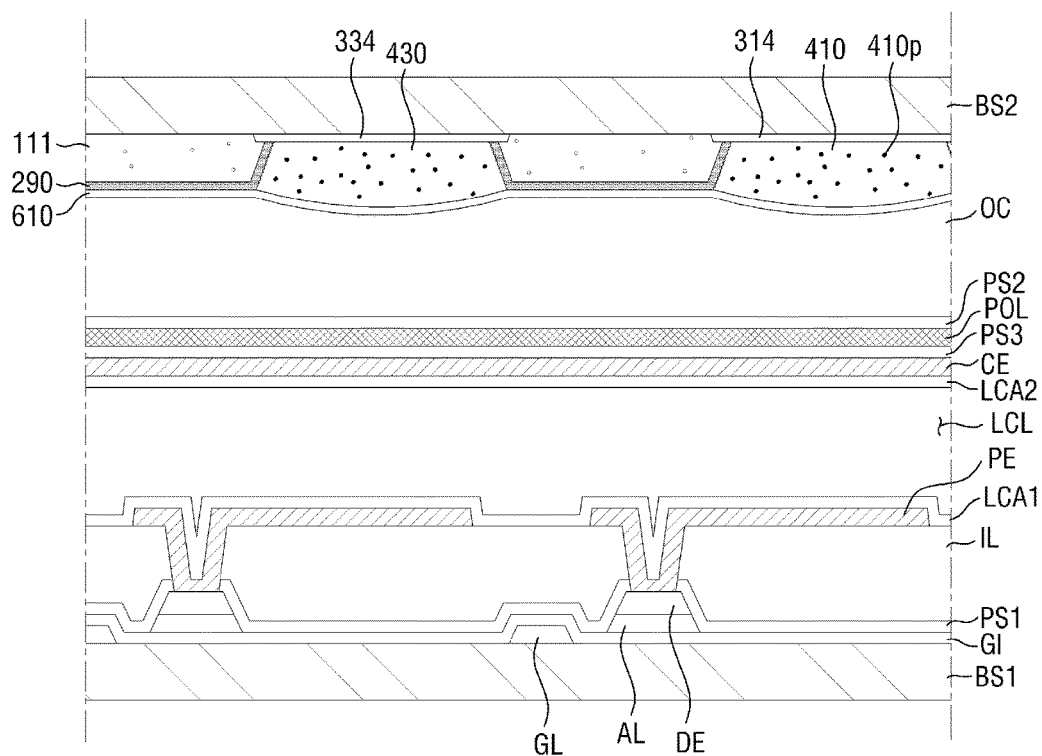

FIGS. 21A, 21B, and 21C illustrate a display device 14 according to an exemplary embodiment. FIG. 21A is a cross-section view corresponding to FIG. 4A, FIG. 21B is an enlarged view of an area 'A' of FIG. 21A, and FIG. 21C is a cross-section view corresponding to FIG. 6.

Referring to FIGS. 21A, 21B, and 21C, the display device 14 according to the exemplary embodiment is different from the display device 3 according to the embodiment of FIG. 10 in that a first wavelength band filter 314 and a second wavelength band filter 324 are disposed between a second substrate BS2 and a partition wall 112.

The first wavelength band filter 314 may be disposed in a first pixel and located lower (higher in FIG. 21A) than the partition wall 112. For example, at least a part of the first wavelength band filter 314 may be interposed between the partition wall 112 and the second substrate BS2 and may be in contact with the partition wall 112 and the second substrate BS2.

In addition, the second wavelength band filter 324 may be disposed in a second pixel and may be located lower (higher in FIG. 21A) than the partition wall 112. For example, at least a part of the second wavelength band filter 324 may be interposed between the partition wall 112 and the second substrate BS2 and may be in contact with the partition wall 112 and the second substrate BS2.

A third wavelength band filter 334 may be disposed in a fourth pixel and may be located lower (higher in FIG. 21C) than the partition wall 112.

In the display device 14 according to the exemplary embodiment, each of the first wavelength band filter 314 and the second wavelength band filter 324 is located lower than the partition wall 112. Therefore, an exposed surface area of a light-shielding member 290 can be increased. Although the exemplary embodiments are not limited to the following example, when color conversion patterns 410 and 420 are formed by an inkjet process, the repellency and lyophilicity of the exposed surface of the light-shielding member 290 may be used to facilitate the formation of the color conversion patterns 410 and 420.

Figure 22A:
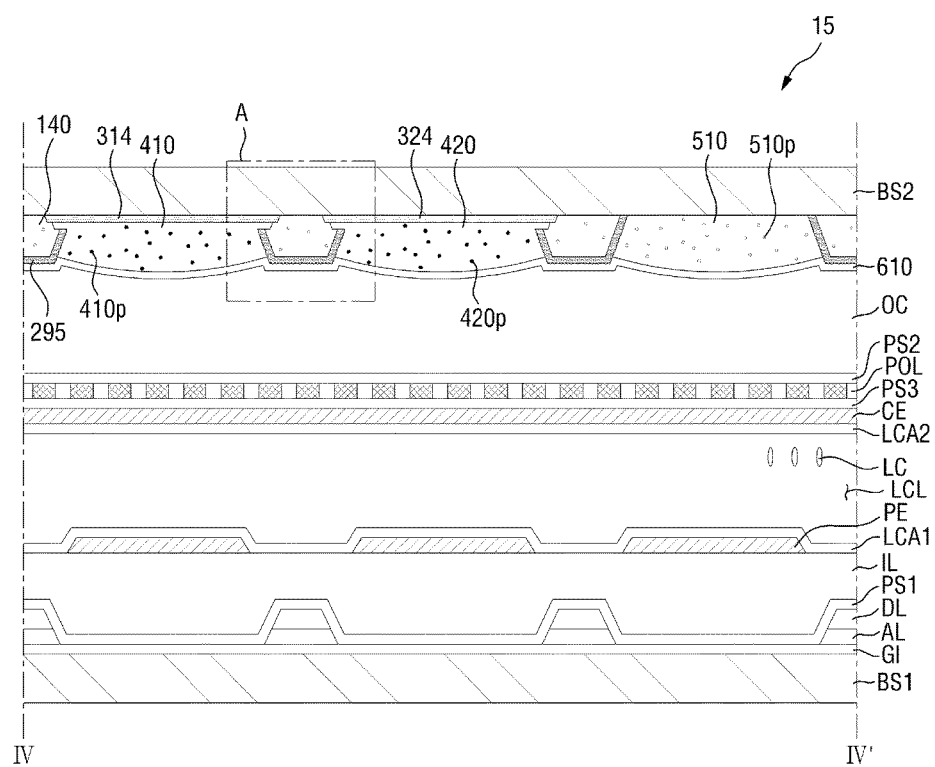
Figure 22B:
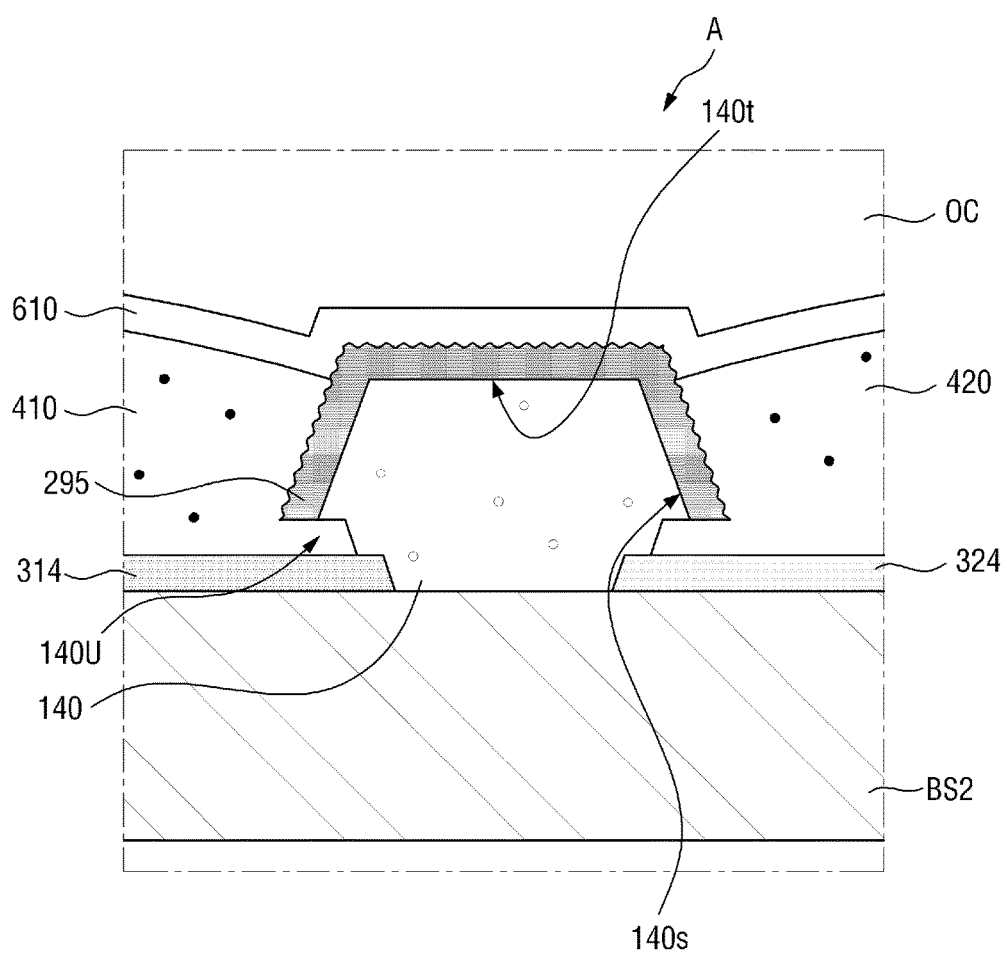

FIGS. 22A and 22B illustrate a display device 15 according to an exemplary embodiment. FIG. 22A is a cross-section view corresponding to FIG. 4, and FIG. 22B is an enlarged view of an area 'A' of FIG. 22A.

Referring to FIGS. 22A and 22B, the display device 15 according to the exemplary embodiment is different from the display device 14 according to the embodiment of FIG. 21 in that a partition wall 140 and a light-shielding member 295 have an undercut 140U at their lower ends.

In an exemplary embodiment, the lower end of the partition wall 140 may be recessed into the partition wall 140. In addition, at least a part of a first color conversion pattern 410 may be interposed between the partition wall 140 and a first wavelength band filter 314 in the undercut 140U and between the light-shielding member 295 and the first wavelength band filter 314. In exemplary embodiments, the first color conversion pattern 410 may not completely fill a space between the partition wall 140 and the first wavelength band filter 314, leaving an air layer in the space. The light-shielding member 295 may be separated from the first wavelength band filter 314. For example, the first color conversion pattern 410 may be in contact with the first wavelength band filter 314, the light-shielding member 295, and the partition wall 140.

Likewise, at least a part of a second color conversion pattern 420 may be interposed between the partition wall 140 and a second wavelength band filter 324 in the undercut 140U and between the light-shielding member 295 and the second wavelength band filter 324. The second color conversion pattern 420 may be in contact with the second wavelength band filter 324, the light-shielding member 295, and the partition wall 140.

In addition, at least a part of a light transmission pattern 510 may be interposed between the partition wall 140 and a second substrate BS2 and between the light-shielding member 295 and the second substrate BS2. The light transmission pattern 510 may be in contact with the second substrate BS2, the light-shielding member 295, and the partition wall 140.

In the display device 15 according to the exemplary embodiment, a portion where the first color conversion pattern 410 contacts the first wavelength band filter 314, a portion where the second color conversion pattern 420 contacts the second wavelength band filter 324, and a portion where the light transmission pattern 510 contacts the second substrate BS2 may be wider than each opening formed by the partition wall 140. Therefore, light utilization efficiency can be improved without leakage of light between neighboring pixels.

Figure 23A:
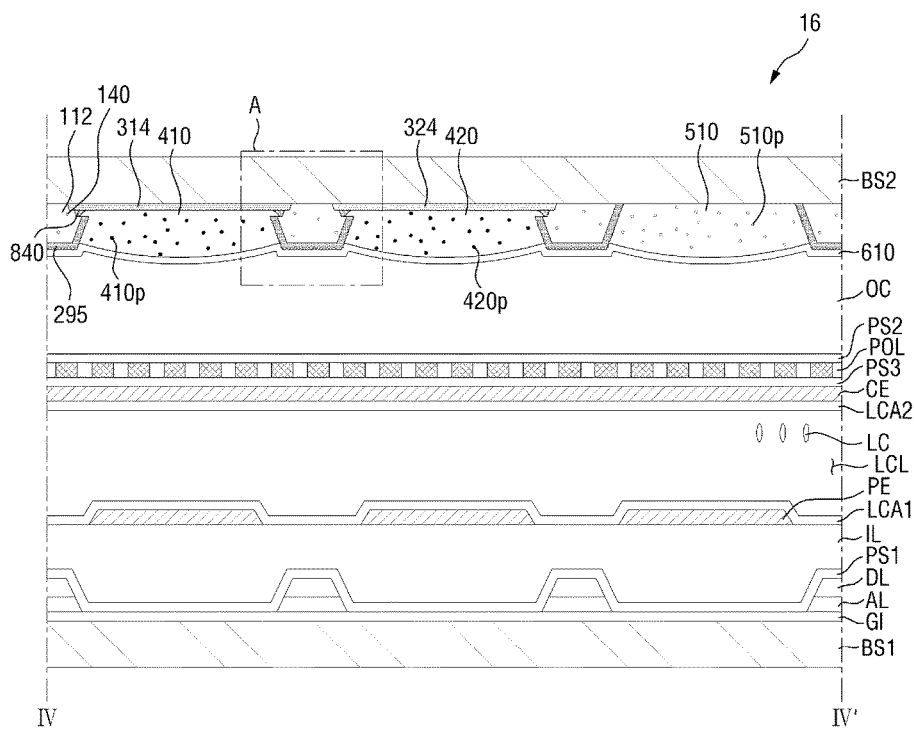
Figure 23B:
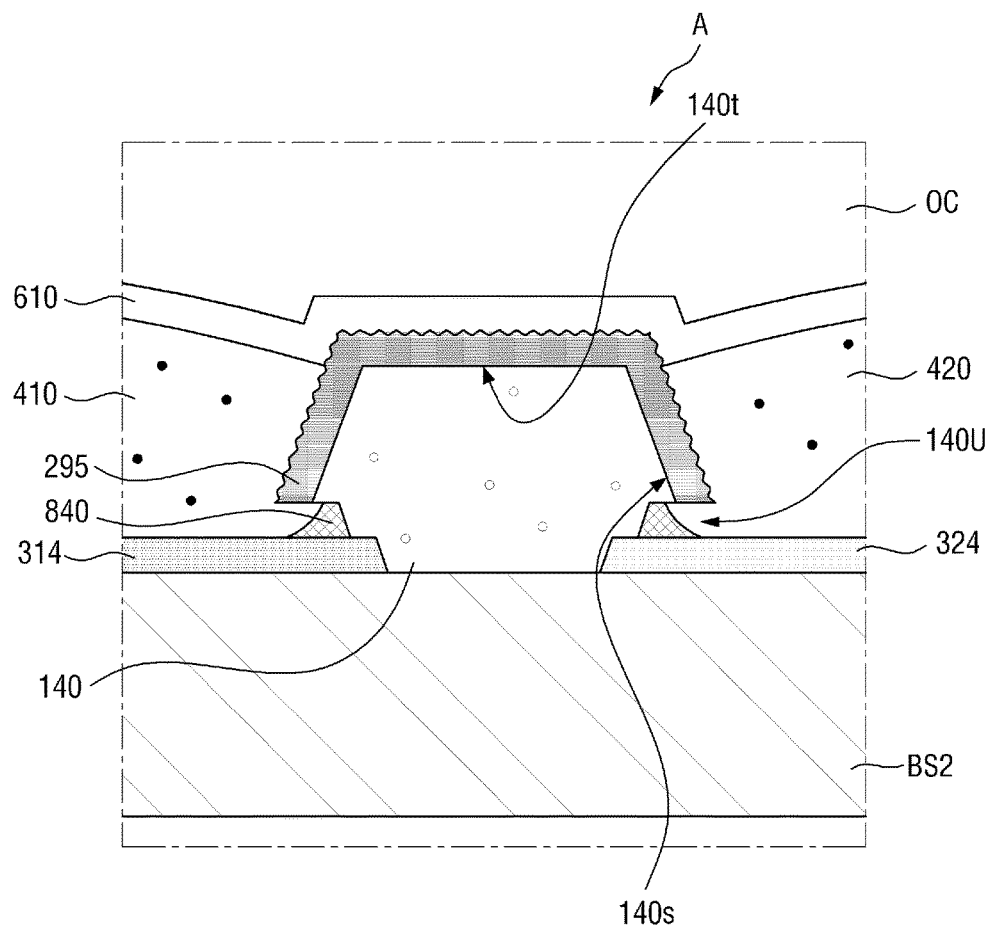

FIGS. 23A and 23B illustrate a display device 16 according to an exemplary embodiment. FIG. 23A is a cross-section view corresponding to FIG. 4, and FIG. 23B is an enlarged view of an area 'A' of FIG. 23A.

Referring to FIGS. 23A and 23B, the display device 16 according to the exemplary embodiment is different from the display device 15 according to the embodiment of FIG. 22 in that it further includes an opaque material layer 840 disposed on an undercut 140U of a partition wall 140.

The opaque material layer 840 may be interposed between the partition wall 140 and a first wavelength band filter 314 and between the partition wall 140 and a second wavelength band filter 324. In FIGS. 23A and 23B, the opaque material layer 840 is in contact with the first wavelength band filter 314, the partition wall 140 and a first color conversion pattern 410. However, the exemplary embodiments are not limited thereto. In exemplary embodiments, the opaque material layer 840 may be positioned between a light-shielding member 295 and the first wavelength band filter 314.

The opaque material layer 840 may include a different material from the light-shielding member 295. The opaque material layer 840 is not particularly limited as long as it can at least partially block the transmission of light. However, the opaque material layer 840 may include a reflective metal material such as aluminum, copper, silver, gold, titanium, molybdenum, nickel, or an alloy of these materials.

The opaque material layer 840 may be disposed between the first color conversion pattern 410 and a second color conversion pattern 420 and between the second color conversion pattern 420 and a light transmission pattern 510. The opaque material layer 840 can suppress or reduce the leakage of light between adjacent pixels. In addition, when the opaque material layer 840 included in the display device 14 according to the exemplary embodiment is made of a reflective metal material, the opaque material layer 840 disposed between adjacent pixels may reflect at least a part of light traveling toward a neighboring pixel, thereby improving light utilization efficiency.

Figure 24A:
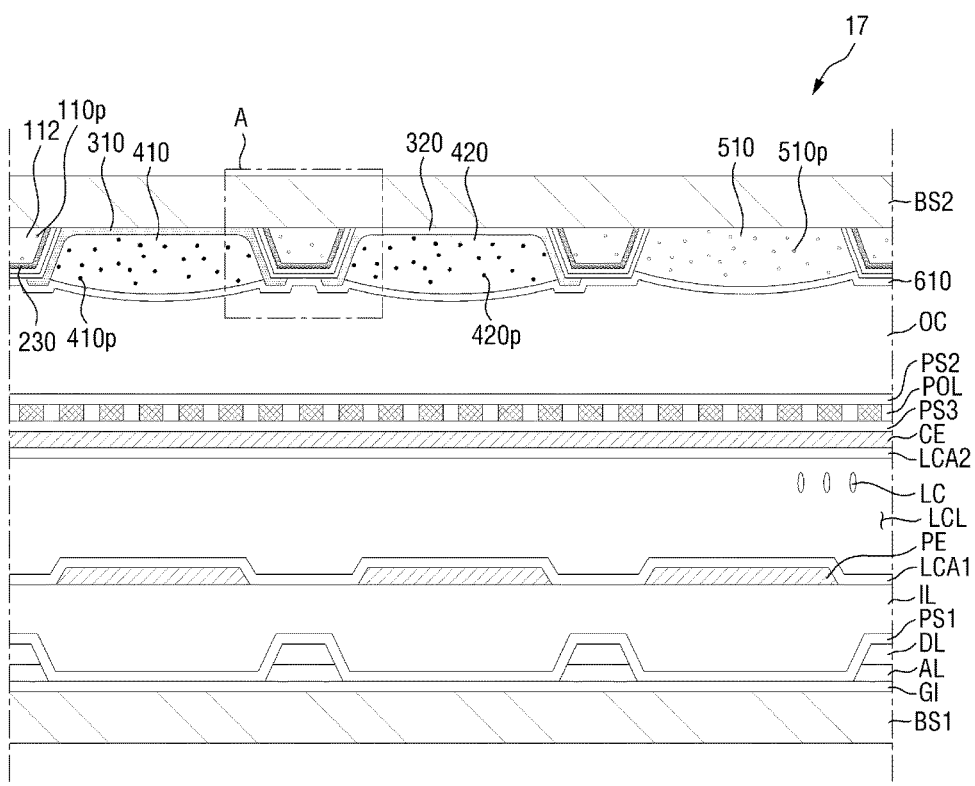
Figure 24B:
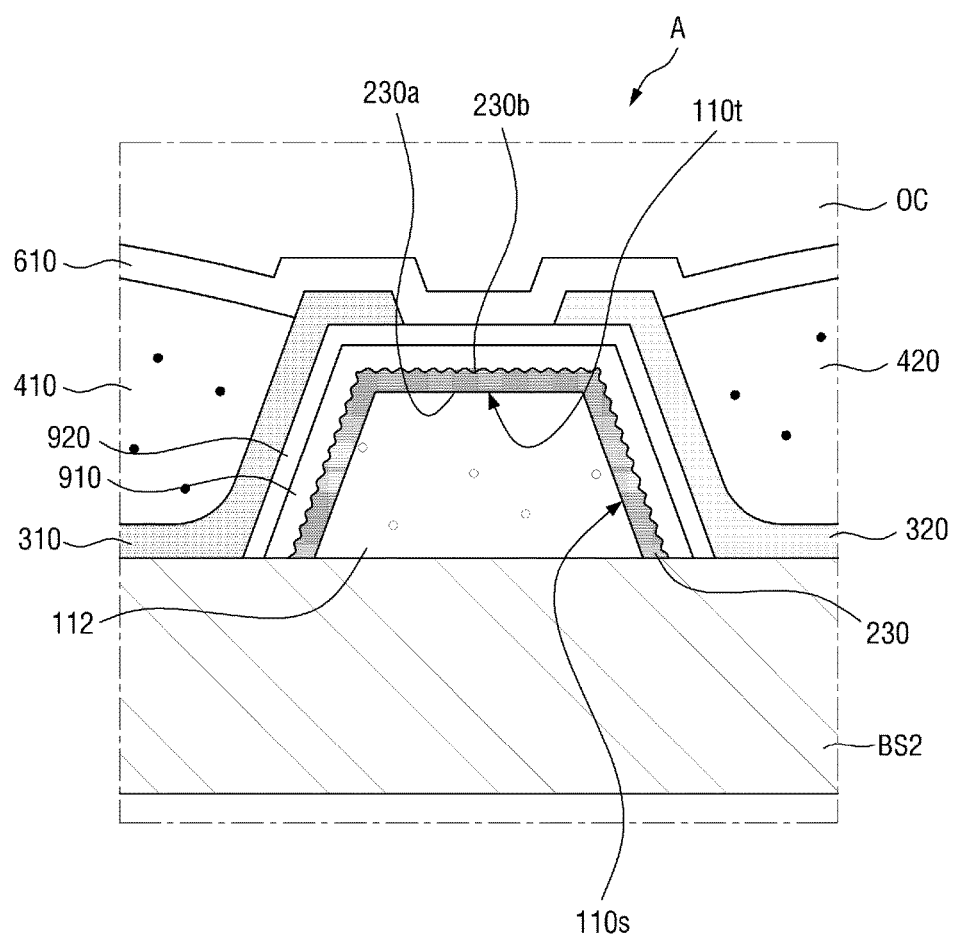

FIGS. 24A and 24B illustrate a display device 17 according to an exemplary embodiment. FIG. 24A is a cross-section view corresponding to FIG. 4, and FIG. 24B is an enlarged view of an area 'A' of FIG. 24A.

Referring to FIGS. 24A and 24B, the display device 17 according to the exemplary embodiment is different from the display device 3 according to the embodiment of FIG. 10 in that it further includes a first light-transmitting layer 910 disposed on a light-shielding member 230 and a second light-transmitting layer 920 disposed on the first light-transmitting layer 910.

In an exemplary embodiment, the first light-transmitting layer 910 may be disposed directly on the light-shielding member 230 and may surround at least a part of the light-shielding member 230. For example, the first light-transmitting layer 910 may be disposed on a top surface 110$t$ of a partition wall 112 and on side surfaces 110$s$ of the partition wall 112. The light transmittance of the first light-transmitting layer 910 may be about 90% or more, about 95% or more, about 98% or more, or about 99% or more. The first light-transmitting layer 910 may be in contact with a second substrate BS2.

In addition, the second light-transmitting layer 920 may be disposed directly on the first light-transmitting layer 910 and may surround at least a part of the first light-transmitting layer 910. For example, the second light-transmitting layer 920 may be disposed on the top surface 110$t$ of the partition wall 112 and on the side surfaces 110$s$ of the partition wall 112. The light transmittance of the second light-transmitting layer 920 may be about 90% or more, about 95% or more, about 98% or more, or about 99% or more. The second light-transmitting layer 920 may be in contact with the second substrate BS2.

In exemplary embodiments, a refractive index of the second light-transmitting layer 920 may be greater than a refractive index of the first light-transmitting layer 910. Thus, a certain optical function may be given to the first light-transmitting layer 910 and the second light-transmitting layer 920.

For example, when a first color conversion pattern 410 includes a wavelength shift material, at least a portion of light proceeding toward a second color conversion pattern 420 among light emitted from the wavelength shift material may be reflected at an interface between the first light-transmitting layer 910 and the second light-transmitting layer 920. This not only suppresses or reduces the light leakage defect but also improves light utilization efficiency. In addition, light that passes through the interface between the first light-transmitting layer 910 and the second light-transmitting layer 920 is absorbed by the light-shielding member 230. Therefore, the light leakage defect can be suppressed or reduced.

In FIGS. 24A and 24B, two light-transmitting layers (i.e., the first light-transmitting layer 910 and the second light-transmitting layer 920) are disposed between the light-shielding member 230 and a first wavelength band filter 310, between the light-shielding member 230 and a second wavelength band filter 320, and between the light-shielding member 230 and a light transmission pattern 510. However, in an exemplary embodiment, three or more light-transmitting layers may be formed to provide a near total reflection function at each interface.

Figure 25A:
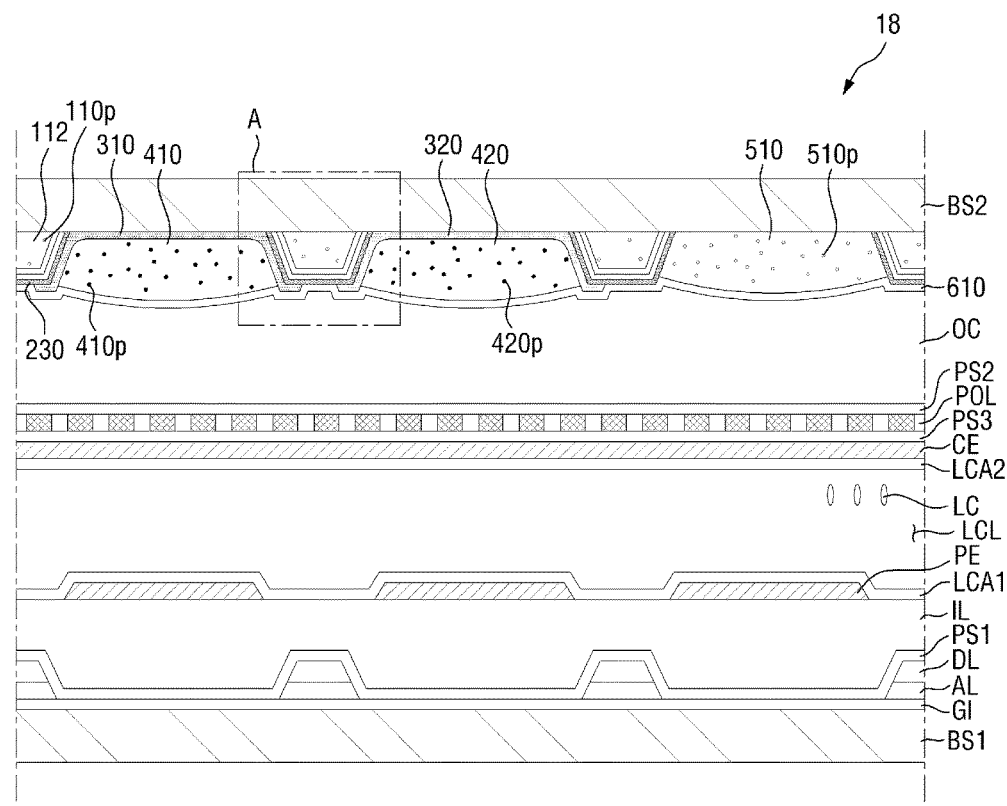
Figure 25B:
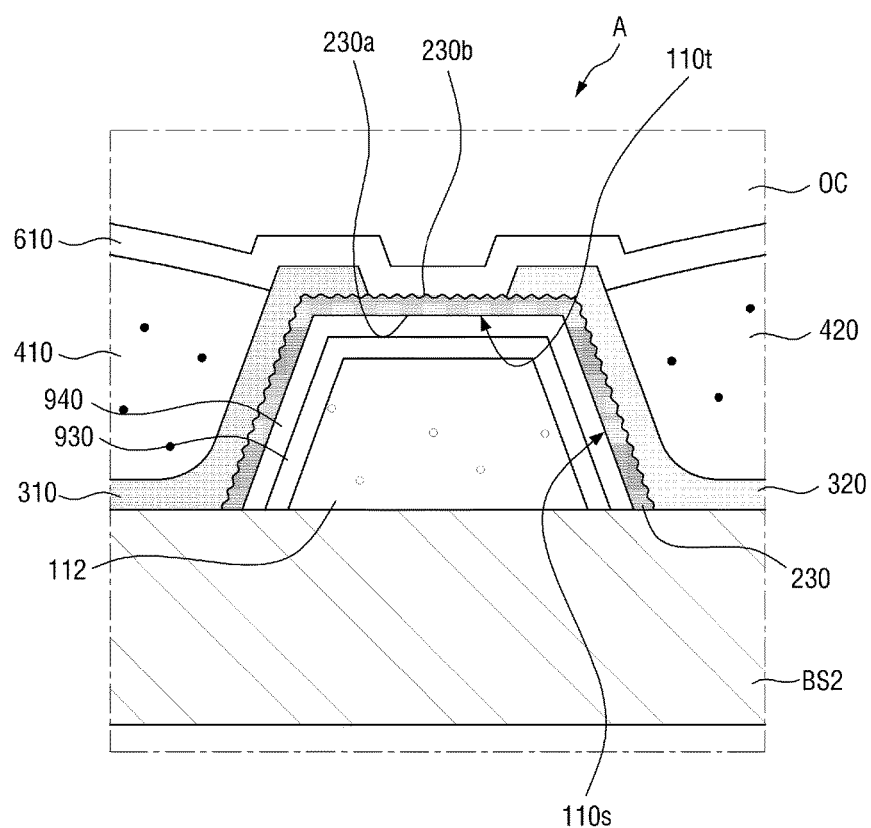

FIGS. 25A and 25B illustrate a display device 18 according to an exemplary embodiment. FIG. 25A is a cross-section view corresponding to FIG. 4, and FIG. 25B is an enlarged view of an area 'A' of FIG. 25A.

Referring to FIGS. 25A and 25B, the display device 18 according to the exemplary embodiment is different from the display device 3 according to the embodiment of FIG. 10 in that it further includes a first light-transmitting layer 930 and a second light-transmitting layer 940 disposed between a light-shielding member 230 and a partition wall 112.

In an exemplary embodiment, the first light-transmitting layer 930 may be disposed directly on the partition wall 112 and may surround at least a part of the partition wall 112. For example, the first light-transmitting layer 930 may be disposed on a top surface 110t of the partition wall 112 and on side surfaces 110s of the partition wall 112. The light transmittance of the first light-transmitting layer 930 may be about 90% or more, about 95% or more, about 98% or more, or about 99% or more. The first light-transmitting layer 930 may be in contact with a second substrate BS2.

In addition, the second light-transmitting layer 940 may be disposed directly on the first light-transmitting layer 930 and may surround at least a part of the first light-transmitting layer 930. For example, the second light-transmitting layer 940 may be disposed on the top surface 110t of the partition wall 112 and on the side surfaces 110s of the partition wall 112. The light transmittance of the second light-transmitting layer 940 may be about 90% or more, about 95% or more, about 98% or more, or about 99% or more. The second light-transmitting layer 940 may be in contact with the second substrate BS2.

In exemplary embodiments, a refractive index of the second light-transmitting layer 940 may be greater than a refractive index of the first light-transmitting layer 930. Thus, a certain optical function may be given to the first light-transmitting layer 930 and the second light-transmitting layer 940.

For example, when a first color conversion pattern 410 includes a wavelength shift material, light proceeding toward a second color conversion pattern 420 among light emitted from the wavelength shift material may be absorbed by the light-shielding member 230, thereby suppressing or reducing the light leakage defect. In addition, light that passes through the light-shielding member 230 without being completely blocked or minimized by the light-shielding member 230 may be reflected at an interface between the first light-transmitting layer 930 and the second light-transmitting layer 940, thereby suppressing or reducing the light leakage defect and improving light utilization efficiency.

In FIGS. 25A and 25B, two light-transmitting layers (i.e., the first light-transmitting layer 930 and the second light-transmitting layer 940) are disposed between the light-shielding member 230 and the partition wall 112. However, in an exemplary embodiment, three or more light-transmitting layers may be formed to provide a near total reflection function at each interface.

Hereinafter, methods of manufacturing a display device according to embodiments will be described.

A method of manufacturing a display device according to an exemplary embodiment includes forming or disposing a partition wall pattern having translucency and an opaque material pattern on a first surface of a substrate, applying a light-shielding member forming or disposing composition onto the partition wall pattern and the opaque material pattern, and radiating light from a second surface of the substrate to form a light-shielding member on a top surface and side surfaces of the partition wall pattern by using the opaque material pattern as a light-shielding mask. The method of manufacturing a display device may further include at least partially exposing the first surface of the substrate by removing the opaque material pattern, ejecting an ink composition, which contains a wavelength shift material, onto the exposed first surface of the substrate, and forming a color conversion pattern by curing the ink composition.

FIGS. 26A, 26B, 26C, 26D, 26E, 26F, 26G, 26H, 26I, 26J, 26K, 26L, 26M, 26N, and 26O are cross-section views illustrating a method of manufacturing a display device according to an exemplary embodiment.

Figure 26A:
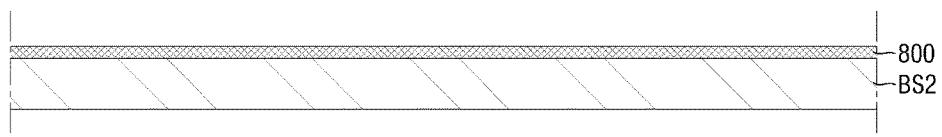
FIGS. 26A, 26B, 26C, 26D, 26E, 26F, 26G, 26H, 26I, 26J, 26K, 26L, 26M, 26N, and 26O are cross-section views illustrating a method of manufacturing a display device according to an exemplary embodiment.

Referring to FIG. 26A, an opaque material layer 800 is formed on a surface (a top surface in FIG. 26A) of a substrate BS2. The opaque material layer 800 may include a reflective is metal material such as aluminum, copper, silver, gold, titanium, molybdenum, nickel or an alloy of these materials or may include an opaque organic material. A method of forming the opaque material layer 800 is not particularly limited. For example, a deposition method such as sputtering can be used.

Figure 26B:
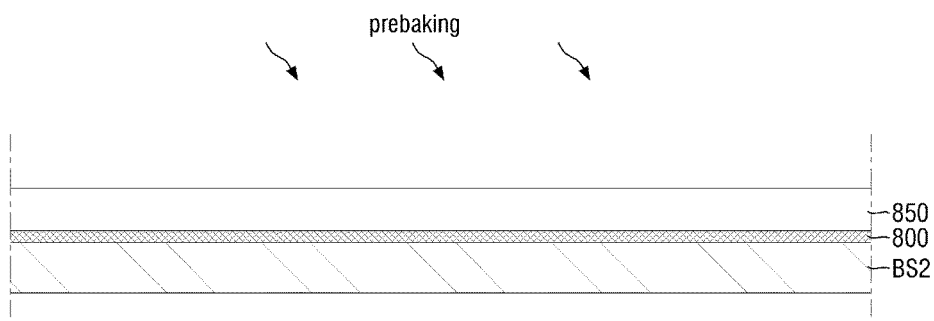

Next, referring to FIG. 26B, a photosensitive layer 850 is formed on the opaque material layer 800. The forming of the photosensitive layer 850 may include applying a photosensitive composition and prebaking the photosensitive composition. In an exemplary embodiment, the photosensitive composition and photosensitive layer 850 may include a positive photosensitive material.

Figure 26C:
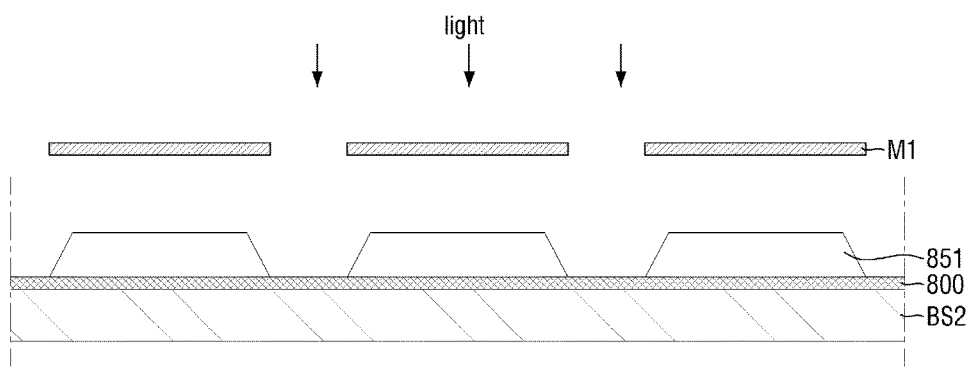

Next, referring to FIG. 26C, a photosensitive pattern layer 851 is formed by positioning a mask M1 having openings and radiating light. The forming of the photosensitive pattern layer 851 includes radiating light to the photosensitive layer 850 by using the mask M1 as an exposure mask and developing the photosensitive pattern layer 851 by applying a developer. In an exemplary embodiment in which the photosensitive layer 850 includes a positive photosensitive material, a bond between polymers may be at least partially broken at portions exposed to light through the openings of the mask M1, and the exposed portions may be removed by the developer.

Figure 26D:
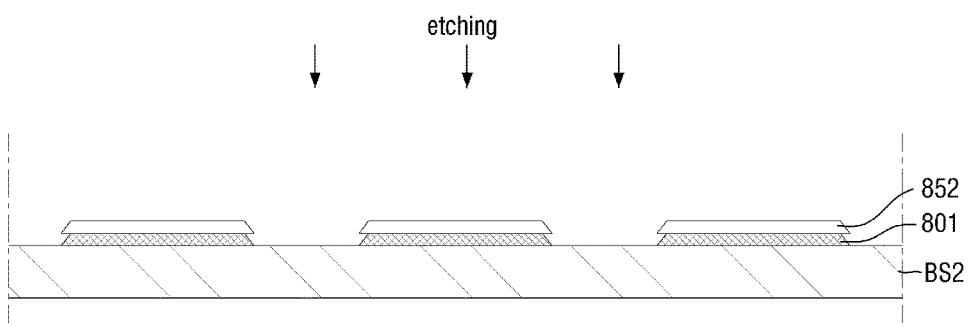

Next, referring to FIG. 26D, an opaque material pattern 801 is formed using the photosensitive pattern layer 852 as an etch mask. The forming of the opaque material pattern 801 may include patterning the opaque material layer 800 using an etching process. The etching process may be a dry etching process or a wet etching process. As a result of the etching process, the opaque material pattern 801 that exposes at least a part of the surface of the substrate BS2 may be formed. The photosensitive pattern layer 852 used as the etch mask may be removed by an ashing process.

Figure 26E:
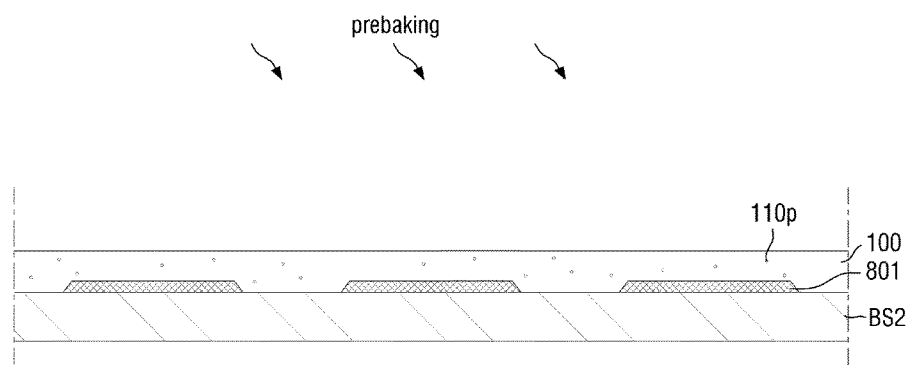

Next, referring to FIG. 26E, an organic layer 100 is formed on the opaque material pattern 801. The forming of the organic layer 100 may include applying an organic layer forming composition and prebaking the composition. In an exemplary embodiment, the organic layer forming composition and the organic layer 100 may include a negative photosensitive material.

For example, the organic layer forming composition may include a photopolymerizable compound, a photopolymerization initiator and a solvent, and may further include other additives. The photopolymerizable compound is a polymerizable monomer compound and may include monofunctional monomers, bifunctional monomers, and polyfunctional monomers. Examples of the monofunctional monomers include nonylphenylcarbitol acrylate, 2-hydroxy-3-phenoxypropyl acrylate, 2-ethylhexylcarbitol acrylate, 2-hydroxyethyl acrylate, and N-vinylpyrrolidone. In addition, examples of the bifunctional monomers include 1,6-hexanediol di(meth)acrylate, ethylene glycol di(meth)acrylate, neopentyl glycol di(meth)acrylate, triethylene glycol di(meth)acrylate, bis(acryloyloxyethyl) ether of bisphenol A, and 3-methylpentanediol di(meth)acrylate. In addition, examples of the polyfunctional monomers include trimethylolpropane tri(meth)acrylate, ethoxylated trimethylolpropane tri(meth)acrylate, propoxylated trimethylolpropane tri (meth)acrylate, pentaerythritol tri(meth)acrylate, pentaerythritol tetra(meth)acrylate, dipentaerythriol penta (meth)acrylate, ethoxylated dipentaerythritol hexa(meth) acrylate, propoxylated dipentaerythritol hexa(meth)acrylate, and dipentaerythritol hexa(meth)acrylate.

The photopolymerization initiator is not particularly limited. Examples of the photopolymerization initiator include a triazine-based initiator compound such as 2,4-bis(trichloromethyl)-6-(4-methoxyphenyl)-1,3,5-triazine, 2,4-bis (trichloromethyl)-6-(4-methoxynaphthyl)-1,3,5-triazine, 2,4-bis(trichloromethyl)-6-piperonyl-1,3,5-triazine, 2,4-bis (trichloromethyl)-6-(4-methoxystyryl)-1,3,5-triazine, 2,4-bis(trichloromethyl)-6-[2-(5-methylfuran-2-yl)ethenyl]-1,3, 5-triazine, 2,4-bis(trichloromethyl)-6-[2-(furan-2-yl) ethenyl]-1,3,5-triazine, 2,4-bis(trichloromethyl)-6-[2-(4-diethylamino-2-methylphenyl)ethenyl]-1,3,5-triazine or 2,4-bis(trichloromethyl)-6-[2-(3,4-dimethoxyphenyl)ethenyl]-1,3,5-triazine, an acetophenone-based initiator compound such as an oligomer of diethoxyacetophenone, 2-hydroxy-2-methyl-1-phenylpropane-1-one, benzyldimethylketal, 2-hydroxy-1-[4-(2-hydroxyethoxy) phenyl]-2-methylpropane-1-one, 1-hydroxycyclohexylphenylketone, 2-methyl-1-(4-methylthiophenyl)-2-morpholinopropane-1-one, 2-benzyl-2-dimethylamino-1-(4-morpholinophenyl)butan-1-one or 2-hydroxy-2-methyl-1-[4-(1-methylvinyl)phenyl] propane-1-one, a biimidazole-based initiator compound such as 2,2'-bis(2-chlorophenyl)-4,4',5,5'-tetraphenyl-biimidazole, 2,2'-bis(2,3-dichlorophenyl)-4,4', 5,5'-tetraphenylbiimidazole, 2,2'-bis (2-chlorophenyl)-4,4', 5,5'-tetra(alkoxyphenyl) biimidazole, 2,2'-bis(2-chlorophenyl)-4,4', 5,5'-tetra (trialkoxyphenyl) biimidazole or an imidazole compound in which a phenyl group at the 4,4', 5,5' position is substituted by a carboalkoxy group, and combinations of the above initiator compounds.

In addition, the organic layer 100 may have translucency. The light transmittance of the organic layer 100 may be about 90% or more, about 95% or more, about 98% or more, or about 99% or more. The material that forms the organic layer 100 is not particularly limited as long as it has an excellent light transmittance. For example, the material that forms the organic layer 100 may be an organic material such as epoxy resin, acrylic resin or imide resin.

In exemplary embodiments, the organic layer forming composition and the organic layer 100 may include particles 110*p* dispersed therein.

Figure 26F:
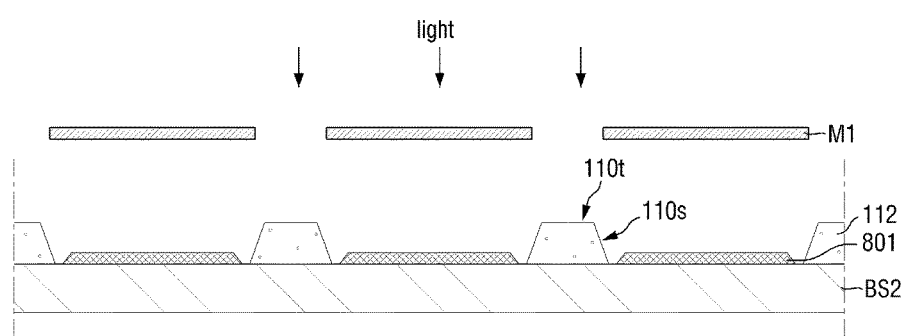

Referring to FIG. 26F, a partition wall 112 is formed on the substrate BS2. The forming of the partition wall 112 may include radiating light to the organic layer 100 by using a mask M1 as an exposure mask and forming the partition wall 112 by applying a developer. In an exemplary embodiment in which the organic layer forming composition and the organic layer 100 are made of a negative photosensitive material, the mask M1 may be the same as the mask M1 used to form the opaque material pattern 801. Portions of the organic layer 100 exposed to light through openings of the mask M1 may be cured, and the other portions may be removed by the developer. In the current operation, the partition wall 112 and the opaque material pattern 801 may be separated from each other, and at least a part of the surface of the substrate BS2 may be exposed without being covered by the partition wall 112 and the opaque material pattern 801. Therefore, the partition wall 112 can be formed on the exposed surface of the substrate BS2. According to the exemplary embodiment, the partition wall 112 and the opaque material pattern 801 can be formed using only one mask, M1. Therefore, manufacturing costs can be reduced.

The partition wall 112 may help to align an ink composition in an ink ejection process to be described later. That is, the partition wall 112 may serve as a guide for accurately ejecting and stably positioning the ink composition at a desired position. The lower limit of a height of the partition wall 112 may be about 5.0 μm, about 5.5 μm, about 6.0 μm, about 6.5 μm, about 7.0 μm, about 7.5 μm, about 8.0 μm, about 8.5 μm, about 9.0 μm, about 9.5 μm, about 10.0 μm, about 10.5 μm, about 11.0 μm, about 11.5 μm, about 12.0 μm, or about 15.0 μm. In addition, the partition wall 112 may include a top surface 110*t* which forms a flat surface and side surfaces 110*s* which are inclined downward from the top surface 110*t*. An average inclination angle of the side surfaces 110*s* of the partition wall 112 with respect to the surface of the substrate BS2 may be, but is not limited to, about 30 to 85 degrees.

In exemplary embodiments, the partition wall 112 may include first partition wall portions extending in a first direction and second partition wall portions extending in a second direction intersecting the first direction in plan view. Thus, the partition wall 112 may have a substantially lattice shape in plan view.

Since other features of the partition wall 112 have been described in detail in relation to the partition wall of FIGS. 1, 2, 3, 4, 5, 6, 7, and 8, a redundant description of those features will be omitted.

Figure 26G:
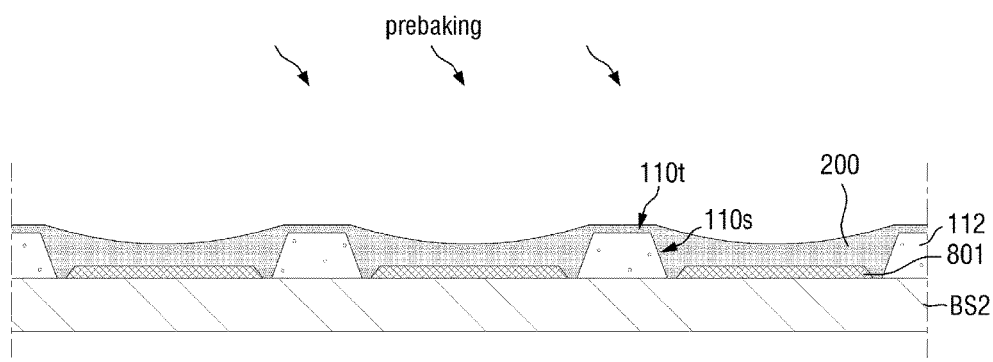

Next, referring to FIG. 26G, a light-shielding member forming composition 200 including a light-shielding material is applied onto the partition wall 112. In exemplary embodiments, prebaking the applied light-shielding member forming composition 200 may be further performed. The prebaking of the light-shielding member forming composition 200 may be performed at a temperature of about 50 to 120° C. for about 60 to 200 seconds.

The applying of the light-shielding member forming composition 200 onto the partition wall 112 may include applying the composition 200 to have a thickness greater than the height of the partition wall 112. That is, the light-shielding member forming composition 200 may be applied to cover the top surface 110*t* of the partition wall 112. In the current operation, the light-shielding member forming composition 200 may at least partially fill a space between the partition wall 112 and the opaque material pattern 801.

The light-shielding member forming composition 200 may include a coloring agent such as a black pigment or dye, a photopolymerizable compound, a photopolymerization initiator and a solvent, and may further include additives such as insulating particles.

Examples of the coloring agent such as the black pigment or dye include inorganic pigments such as carbon black, titanium black, lignin black, perylene black, cyanine black, a complex oxide pigment such as iron/manganese, and combinations of the above pigments.

The photopolymerizable compound is a polymerizable monomer compound and may include monofunctional monomers, bifunctional monomers, and polyfunctional monomers. Examples of the monofunctional monomers include nonylphenylcarbitol acrylate, 2-hydroxy-3-phenoxypropyl acrylate, 2-ethylhexylcarbitol acrylate, 2-hydroxyethyl acrylate, and N-vinylpyrrolidone. In addition, examples of the bifunctional monomers include 1,6-hexanediol di(meth)acrylate, ethylene glycol di(meth)acrylate, neopentyl glycol di(meth)acrylate, triethylene glycol di(meth) acrylate, bis(acryloyloxyethyl) ether of bisphenol A, and 3-methylpentanediol di(meth)acrylate. In addition, examples of the polyfunctional monomers include trimethylolpropane tri(meth)acrylate, ethoxylated trimethylolpropane tri(meth)acrylate, propoxylated trimethylolpropane tri(meth)acrylate, pentaerythritol tri(meth)acrylate, pentaerythritol tetra(meth)acrylate, dipentaerythriol penta(meth)acrylate, ethoxylated dipentaerythritol hexa(meth) acrylate, propoxylated dipentaerythritol hexa(meth)acrylate, and dipentaerythritol hexa(meth)acrylate.

The photopolymerization initiator is not particularly limited. Examples of the photopolymerization initiator include a triazine-based initiator compound such as 2,4-bis(trichloromethyl)-6-(4-methoxyphenyl)-1,3,5-triazine, 2,4-bis(trichloromethyl)-6-(4-methoxynaphthyl)-1,3,5-triazine, 2,4-bis(trichloromethyl)-6-piperonyl-1,3,5-triazine, 2,4-bis(trichloromethyl)-6-(4-methoxystyryl)-1,3,5-triazine, 2,4-bis(trichloromethyl)-6-[2-(5-methylfuran-2-yl)ethenyl]-1,3,5-triazine, 2,4-bis(trichloromethyl)-6-[2-(furan-2-yl) ethenyl]-1,3,5-triazine, 2,4-bis(trichloromethyl)-6-[2-(4-diethylamino-2-methylphenyl)ethenyl]-1,3,5-triazine or 2,4-bis(trichloromethyl)-6-[2-(3,4-dimethoxyphenyl)ethenyl]-1,3,5-triazine, an acetophenone-based initiator compound such as an oligomer of diethoxyacetophenone, 2-hydroxy-2-methyl-1-phenylpropane-1-one, benzyldimethylketal, 2-hydroxy-1-[4-(2-hydroxyethoxy) phenyl]-2-methylpropane-1-one, 1-hydroxycyclohexylphenylketone, 2-methyl-1-(4-methylthiophenyl)-2-morpholinopropane-1-one, 2-benzyl-2-dimethylamino-1-(4-morpholinophenyl)butan-1-one or 2-hydroxy-2-methyl-1-[4-(1-methylvinyl)phenyl] propane-1-one, a biimidazole-based initiator compound such as 2,2'-bis(2-chlorophenyl)-4,4',5,5'-tetraphenyl-biimidazole, 2,2'-bis(2,3-dichlorophenyl)-4,4', 5,5'-tetraphenylbiimidazole, 2,2'-bis(2-chlorophenyl)-4,4', 5,5'-tetra(alkoxyphenyl) biimidazole, 2,2'-bis(2-chlorophenyl)-4,4', 5,5'-tetra (trialkoxyphenyl) biimidazole or an imidazole compound in which a phenyl group at the 4,4', 5,5' position is substituted by a carboalkoxy group, and combinations of the above initiator compounds.

Figure 26H:
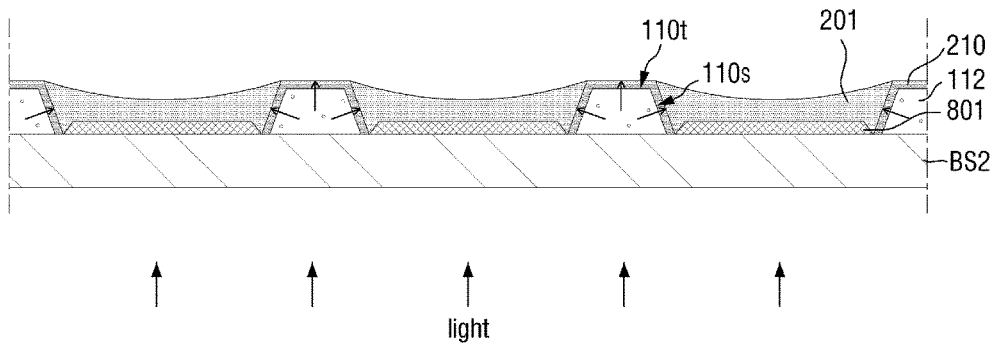

Next, referring to FIG. 26H, a light-shielding member 210 is formed by radiating light from the back (a bottom surface in FIG. 26H) of the substrate BS2. The forming of the light-shielding member 210 may include forming the light-shielding member 210 using the opaque material pattern 801 as a light-shielding mask.

In an exemplary embodiment, the forming of the light-shielding member 210 may include radiating light from the back of the substrate BS2, letting the light pass through the substrate BS2, letting the light enter the partition wall 112, letting the light pass through the top surface 110t of the partition wall 112, and letting the light pass through the side surfaces 110s of the partition wall 112.

Light incident on the opaque material pattern 801 may be shielded by the opaque material pattern 801 and thus may not cure the light-shielding member forming composition. On the other hand, light incident on the partition wall 112 having an excellent light transmittance may pass through the top surface 110t and the side surfaces 110s of the partition wall 112 to contribute to the curing of the light-shielding member forming composition. Light traveling toward the light-shielding member forming composition may cure the light-shielding member forming composition. Then, as the light further travels a certain distance, it may gradually diminish due to light-absorbing characteristics of the light-shielding member forming composition. Accordingly, the light-shielding member 210 may be formed on the top surface 110t and the side surfaces 110s of the partition wall 112, and portions of the light-shielding member forming composition located far from the partition wall 112 may remain in the state of the light-shielding member forming composition 200.

In exemplary embodiments, the thickness and surface roughness of the light-shielding member 210 may be controlled by the intensity of radiated light and the irradiation time.

The partition wall 112 according to the exemplary embodiment may have the inclined side surfaces 110s. Therefore, a sufficient amount of light can be transmitted through not only the top surface 110t but also the side surfaces 110s of the partition wall 112. In addition, when the partition wall 112 includes the particles 110p dispersed therein, light scattered/diffused by the particles 110p can be easily spread in various directions. In an exemplary embodiment, the light-shielding member 210 disposed on the top surface 110t of the partition wall 112 may be thicker than the light-shielding member 210 disposed on the side surfaces 110s of the partition wall 112.

Since the light-shielding member 210 has been described in detail with reference to FIGS. 1, 2, 3, 4, 5, 6, 7, and 8, a redundant description of the light-shielding member 210 will be omitted.

Figure 26I:
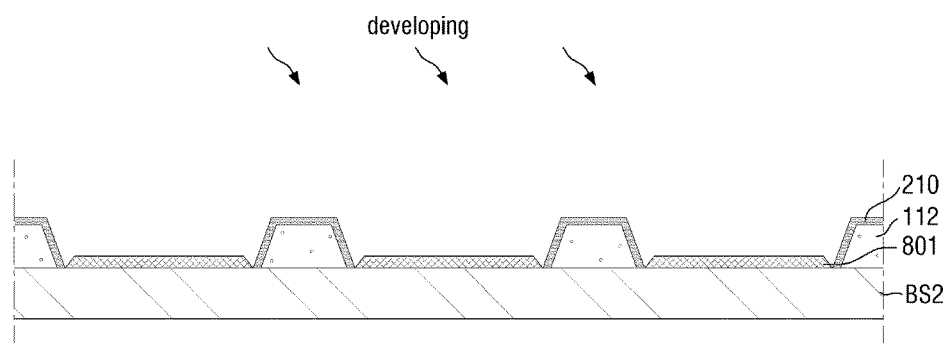

Next, referring to FIG. 26I, the remaining light-shielding member forming composition is removed. The removing of the composition may include removing the remaining composition by applying a developer. Accordingly, the substrate BS2, the partition wall 112 disposed on the substrate BS2, and the light-shielding member 210 and the opaque material pattern 801 disposed to surround the partition wall 112 can be formed.

In exemplary embodiments, hard-baking the light-shielding member 210 may be further performed after the removing of the remaining light-shielding member forming composition.

Figure 26J:
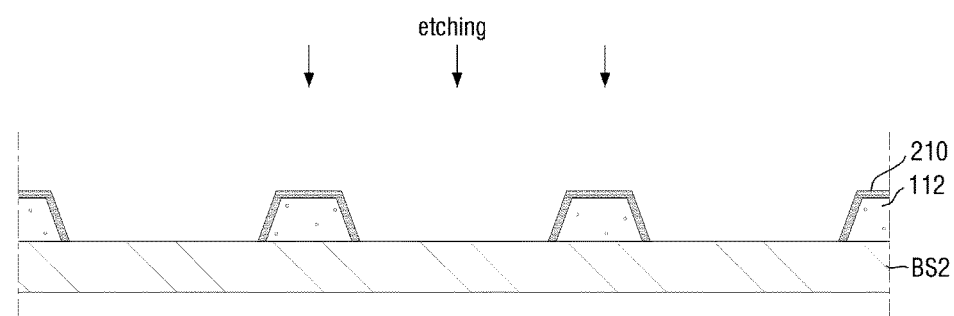

Next, referring to FIG. 26J, the opaque material pattern is removed. The removing of the opaque material pattern may include at least partially exposing the surface of the substrate BS2. The removing of the opaque material pattern may include removing the opaque material pattern using a wet etching process. This operation may leave only the substrate BS2, the partition wall 112 disposed on the substrate BS2, and the light-shielding member 210 disposed to surround the partition wall 112.

Figure 26K:
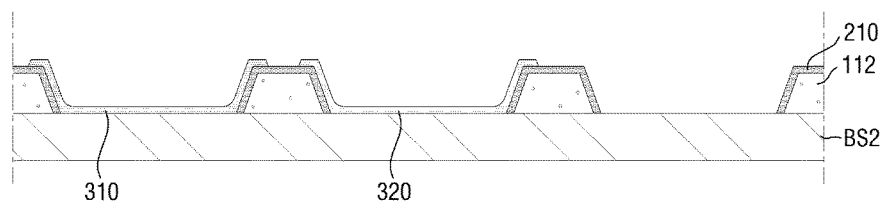

Next, referring to FIG. 26K, a first wavelength band filter 310 and a second wavelength band filter 320 are formed in at least some of the openings formed by the partition wall 112. The first wavelength band filter 310 and the second wavelength band filter 320 can be formed by patterning a photosensitive organic material using a photo process or disposing by an inkjet process. Since the first wavelength band filter 310 and the second wavelength band filter 320 have been described in detail with reference to FIGS. 1, 2, 3, 4, 5, 6, 7, and 8, a redundant description of the first wavelength band filter 310 and the second wavelength band filter 320 will be omitted.

Figure 26L:
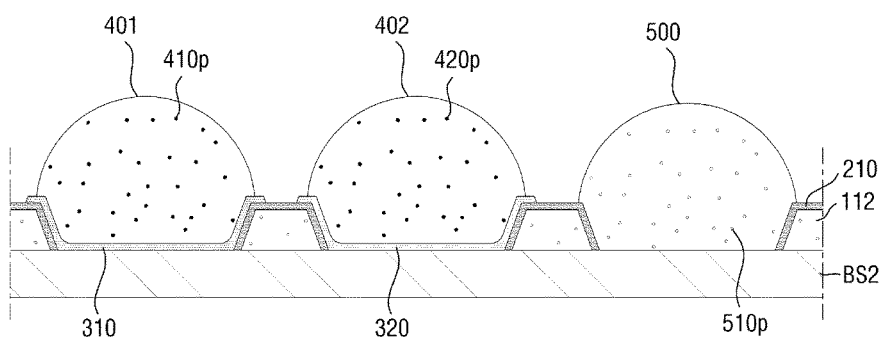

Referring to FIG. 26L, a first ink composition 401, a second ink composition 402, and a third ink composition 500 are disposed into the openings formed by the partition wall 112. The first ink composition 401, the second ink composition 402 and the third ink composition 500 may be disposed sequentially or simultaneously. In an exemplary embodiment, the first ink composition 401 may include a first wavelength shift material 410p that emits light having a peak wavelength of a first color, the second ink composition 402 may include a second wavelength shift material 420p that emits light having a peak wavelength of a second color, and the third ink composition 500 may include particles 510p.

Since the partition wall 112 has a sufficient height, the first ink composition 401, the second ink composition 402 and the third ink composition 500 can be accurately disposed at desired positions.

Figure 26M:
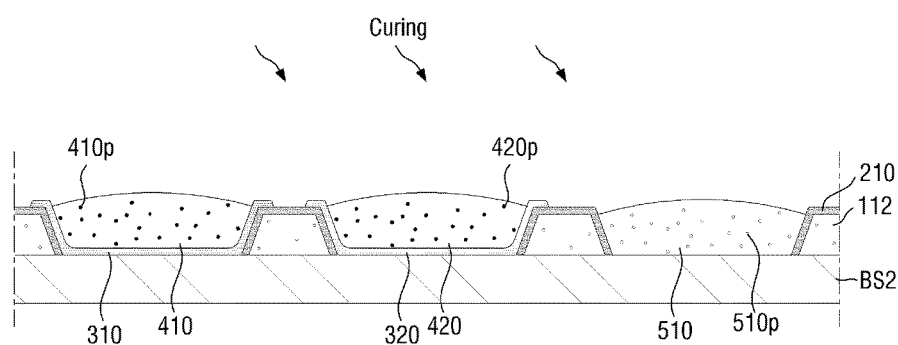

Next, referring to FIG. 26M, the above ink compositions are dried and cured to form a first color conversion pattern 410, a second color conversion pattern 420, and a light transmission pattern 510. Since the first color conversion pattern 410, the second color conversion pattern 420, and the light transmission pattern 510 have been described in detail with reference to FIGS. 1, 2, 3, 4, 5, 6, 7, and 8, a redundant description of the first color conversion pattern 410, the second color conversion pattern 420, and the light transmission pattern 510 will be omitted.

Figure 26N:
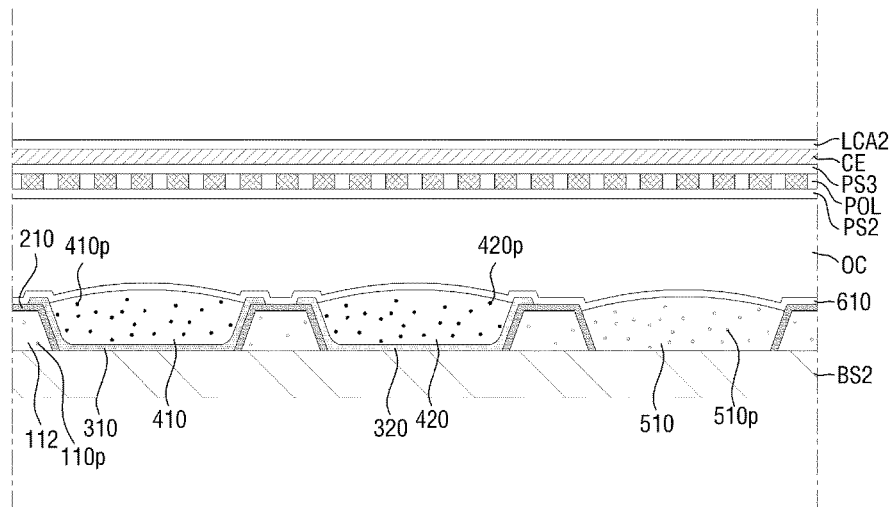

Referring to FIG. 26N, a fourth wavelength band filter 610, an overcoat layer OC, a polarizing layer POL, and a common electrode CE are formed sequentially on the first color conversion pattern 410, the second color conversion pattern 420, and the light transmission pattern 510, thereby preparing a second display panel SUB2. Since each element of the second display panel SUB2 has been described in detail with reference to FIGS. 1, 2, 3, 4, 5, 6, 7, and 8, a redundant description of each element of the second display panel SUB2 will be omitted.

Figure 26O:
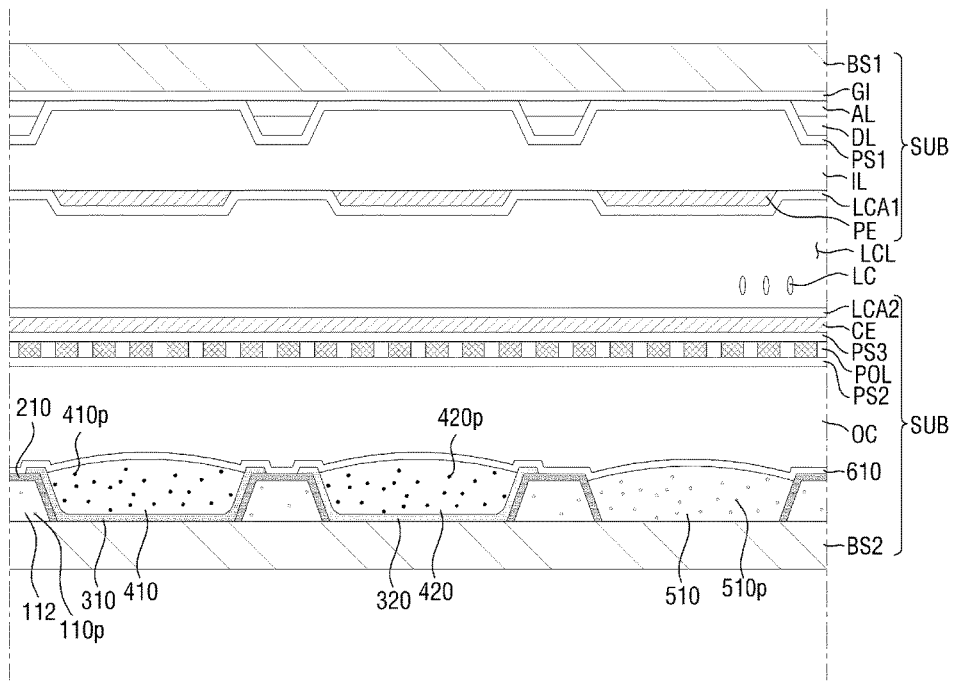

Referring to FIG. 26O, a first display panel SUB1 including switching elements Q and pixel electrodes PE is prepared, and a liquid crystal layer LCL is interposed between the first display panel SUB1 and the second display panel SUB2. As a result, a display panel is prepared. The first display panel SUB1 and the second display panel SUB2 may be bonded together by a sealing member.

The liquid crystal layer LCL may be interposed between the first display panel SUB1 and the second display panel SUB2 by dropping a liquid crystal composition including liquid crystals LC onto the first display panel SUB1 or the second display panel SUB2 and then bonding the first display panel SUB1 and the second display panel SUB2 together. Although not illustrated in the drawings, placing a light source unit on the first display panel SUB1 may be further performed.

Hereinafter, methods of manufacturing a display device according to exemplary embodiments will be described.

FIGS. 27A, 27B, 27C, 27D, 27E, and 27F are cross-section views illustrating a method of manufacturing a display device according to an exemplary embodiment.

Figure 27A:
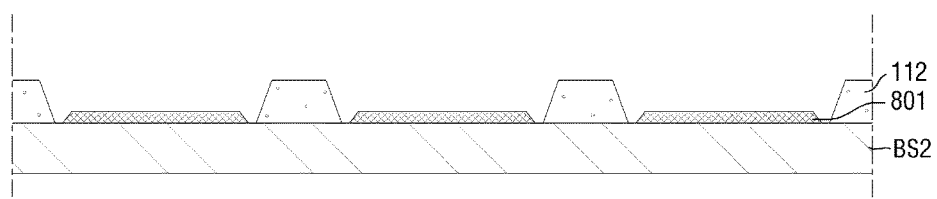
FIGS. 27A, 27B, 27C, 27D, 27E, and 27F are cross-section views illustrating a method of manufacturing a display device according to an exemplary embodiment.

Referring to FIG. 27A, a partition wall 112 having translucency and an opaque material pattern 801 are formed on a surface of a substrate BS2. Since the forming of the partition wall 112 and the opaque material pattern 801 has been described in detail with reference to FIGS. 26A, 26B, 26C, 26D, 26E, and 26F, a redundant description of this operation will be omitted.

Figure 27B:
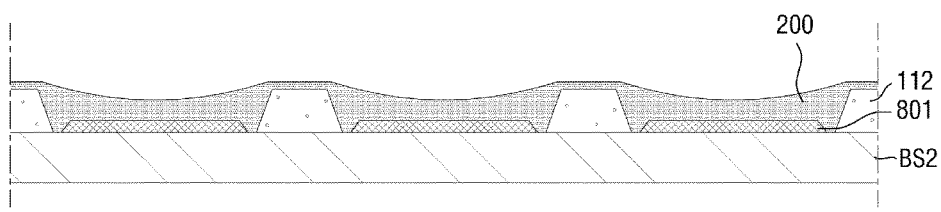

Next, referring to FIG. 27B, a light-shielding member forming composition 200 including a light-shielding material is applied onto the partition wall 112. In exemplary embodiments, prebaking the applied light-shielding member forming composition 200 may be further performed.

Figure 27C:
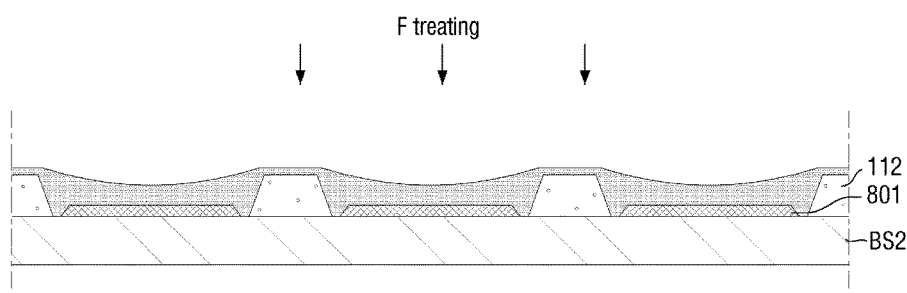

Next, referring to FIG. 27C, the entire surface of the applied light-shielding member forming composition 200 is treated with fluorine. The treating of the entire surface of the applied light-shielding member forming composition 200 with fluorine may be include spraying a carbon tetrafluoride ($CF_4$) gas. In the current operation, the overall fluorine content of the exposed surface (a top surface) of the applied light-shielding member forming composition 200 may increase.

Figure 27D:
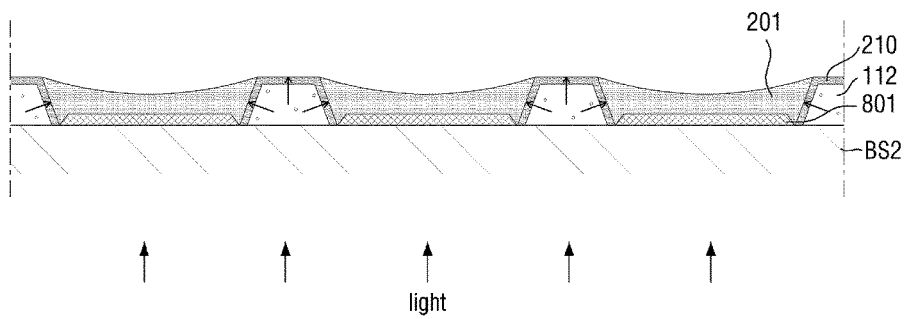

Next, referring to FIG. 27D, a light-shielding member 210 is formed by radiating light from the back of the substrate BS2. Since the forming of the light-shielding member 210 has been described in detail with reference to FIG. 26H, a redundant description of this operation will be omitted.

Figure 27E:
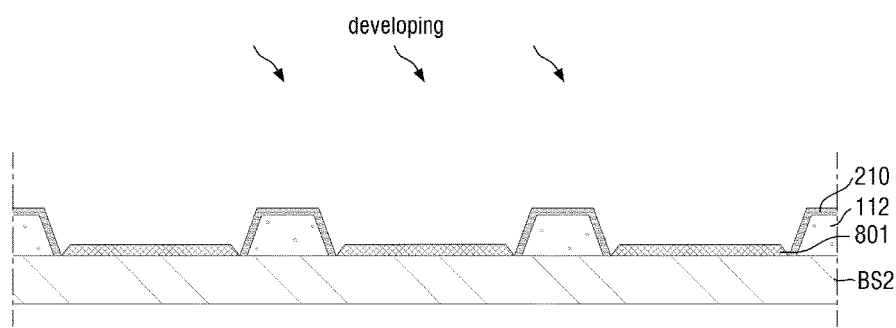

Next, referring to FIG. 27E, the remaining light-shielding member forming composition is removed. The removing of the composition may include removing the remaining composition by applying a developer.

The light-shielding member 210 exposed after the removal of the remaining light-shielding member forming composition may have different fluorine contents in its different areas. For example, fluorine content per unit area of a surface of the light-shielding member 210 disposed on a top surface of the partition wall 112 exposed to the fluorine treatment may be greater than fluorine content per unit area of the surface of the light-shielding member 210 disposed on side surfaces of the partition wall 112 not exposed to the fluorine treatment.

Figure 27F:
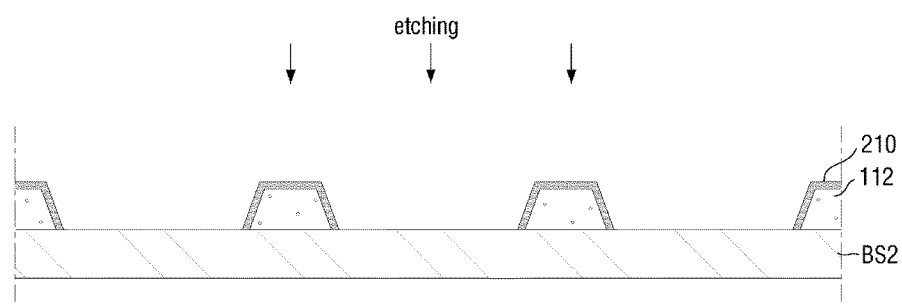

Next, referring to FIG. 27F, the opaque material pattern is removed to at least partially expose the surface of the substrate BS2.

Although not illustrated in the drawings, a display device can be manufactured by the same method as described above with reference to FIGS. 26K, 26L, 26M, 26N, and 26O.

FIGS. 28A, 28B, 28C, 28D, 28E, 28F, 28G, and 28H are cross-section views illustrating a method of manufacturing a display device according to an exemplary embodiment.

Figure 28A:
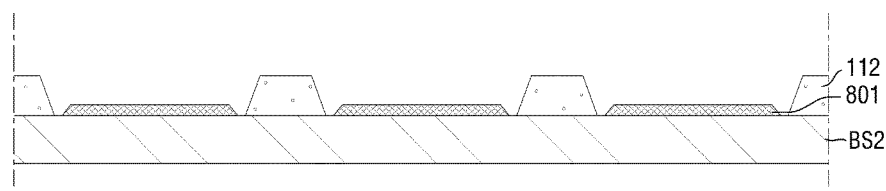
FIGS. 28A, 28B, 28C, 28D, 28E, 28F, 28G, 28H, 29A, 29B, 29C, 29D, 29E, 29F, 29G, 29H, 30A, 30B, 30C, 30D, 30E, 30F, 31A, 31B, 31C, 31D, 31E, 31F, 32A, 32B, 32C, 32D, 32E, 32F, 33A, 33B, 33C, 33D, 33E, 33F, 34A, 34B, 34C, 34D, 34E, 34F, 35A, 35B, 35C, 35D, 35E, 35F, 35G, 36A, 36B, 36C, 36D, 36E, 36F, 36G, 37A, 37B, 37C, 37D, 37E, 37F, 37G, and 37H are cross-section views illustrating methods of manufacturing a display device according to embodiments.

Referring to FIG. 28A, a partition wall 112 having translucency and an opaque material pattern 801 are formed on a surface of a substrate BS2. Since the forming of the partition wall 112 and the opaque material pattern 801 has been described in detail with reference to FIGS. 26A, 26B, 26C, 26D, 26E, and 26F, a redundant description of this operation will be omitted.

Figure 28B:
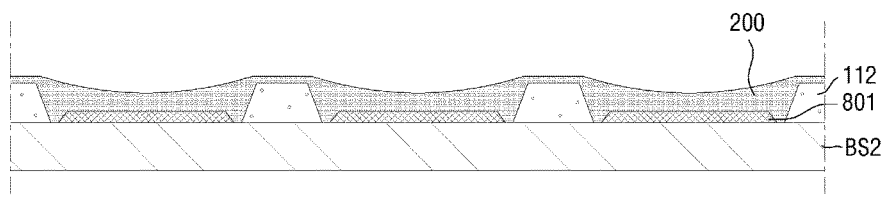

Next, referring to FIG. 28B, a light-shielding member forming composition 200 including a light-shielding material is applied onto the partition wall 112. In exemplary embodiments, prebaking the applied light-shielding member forming composition 200 may be further performed.

Figure 28C:
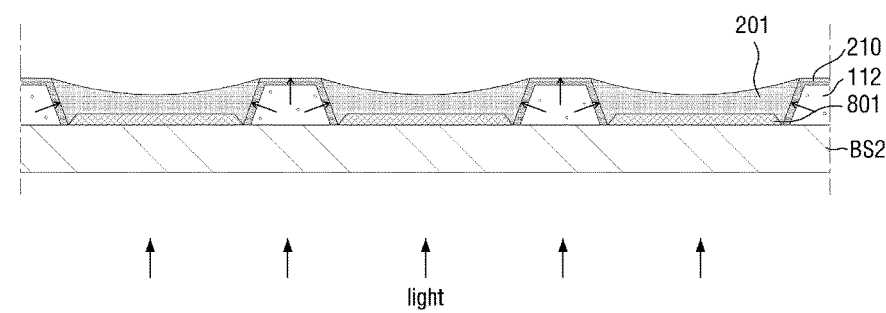

Next, referring to FIG. 28C, a light-shielding member 210 is formed by radiating light from the back of the substrate BS2. Since the forming of the light-shielding member 210 has been described in detail with reference to FIG. 26H, a redundant description of this operation will be omitted.

Figure 28D:
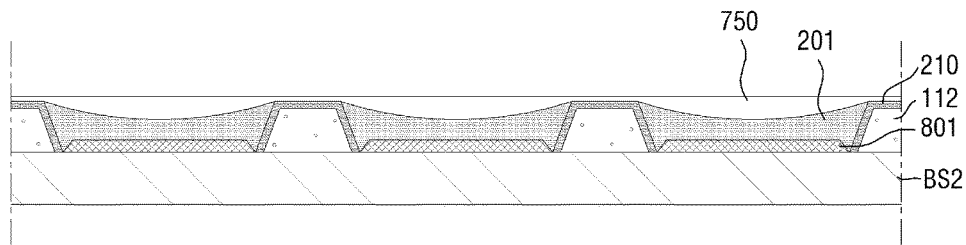

Next, referring to FIG. 28D, a resin layer 750 is formed on the light-shielding to member 210 and uncured portions 201. A method of forming the resin layer 750 is not particularly limited. For example, the resin layer 750 may be formed by applying a UV curable resin material.

Figure 28E:
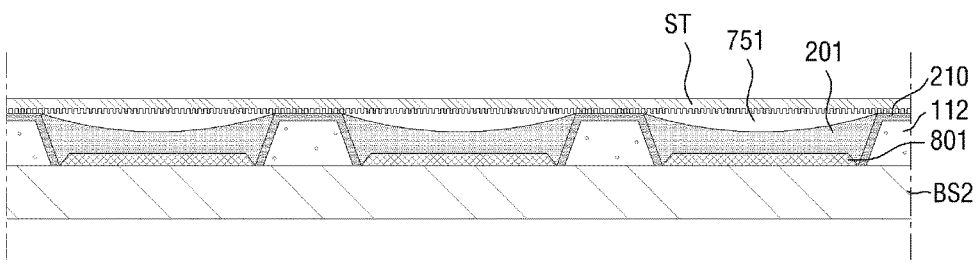

Next, referring to FIG. 28E, the patterned resin layer 750 is formed using a stamp ST. The stamp ST may have reverse patterns of recessed and protruding patterns to be formed. Reverse patterns of the patterns formed on the stamp ST can be transferred to a surface of the resin layer by placing and pressing the stamp ST on the surface of the resin layer.

Figure 28F:
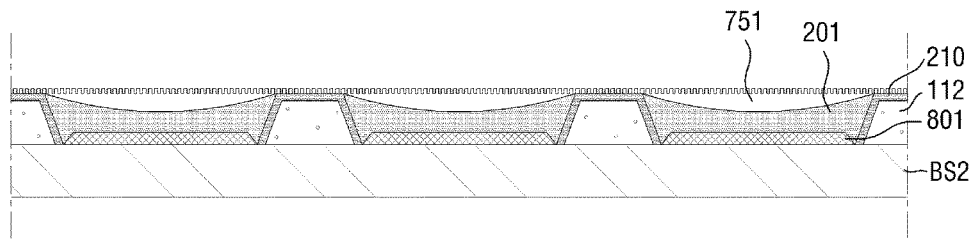

Next, referring to FIG. 28F, the stamp is removed to form a recessed and protruding pattern layer 751 on the light-shielding member 210 and the uncured portions 201.

Figure 28G:
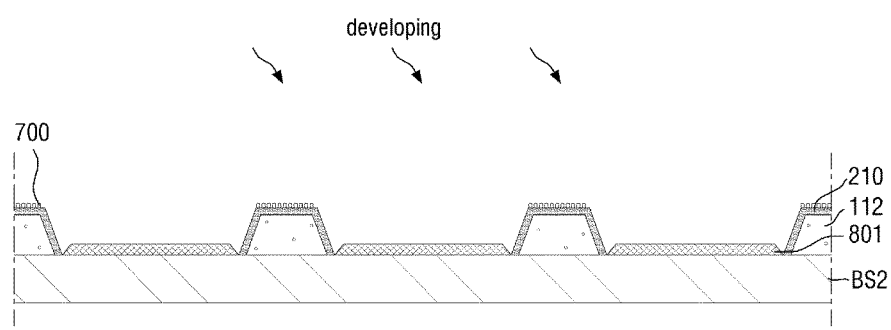

Next, referring to FIG. 28G, the uncured portions 201 of the light-shielding member forming composition 200 is removed to form recessed and protruding patterns 700 on the light-shielding member 210. The removing of the composition may include removing the remaining composition by applying a developer.

In the removing of the remaining light-shielding member forming composition, the recessed and protruding pattern layer overlapping the uncured portion 201 is removed, and the recessed and protruding patterns 700 may remain on a surface of the cured light-shielding member 210.

Figure 28H:
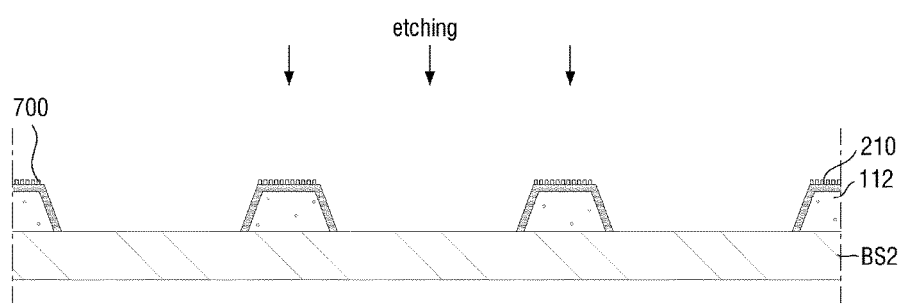

Referring next to FIG. 28H, the opaque material pattern is removed to at least partially expose the surface of the substrate BS2.

Although not illustrated in the drawings, a display device can be manufactured by the same method as described above with reference to FIGS. 26K, 26L, 26M, 26N, and 26O.

FIGS. 29A, 29B, 29C, 29D, 29E, 29F, 29G, and 29H are cross-section views illustrating a method of manufacturing a display device according to an exemplary embodiment.

Figure 29A:
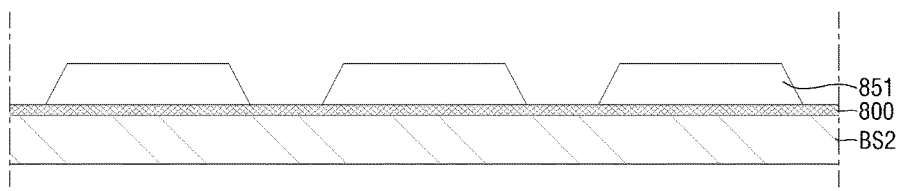

Referring to FIG. 29A, an opaque material layer 800 and a photosensitive pattern layer 851 are formed on a surface of a substrate BS2. Since the forming of the opaque material layer 800 and the photosensitive pattern layer 851 has been described in detail with reference to FIGS. 26A, 26B, and 26C, a redundant description of this operation will be omitted.

Figure 29B:
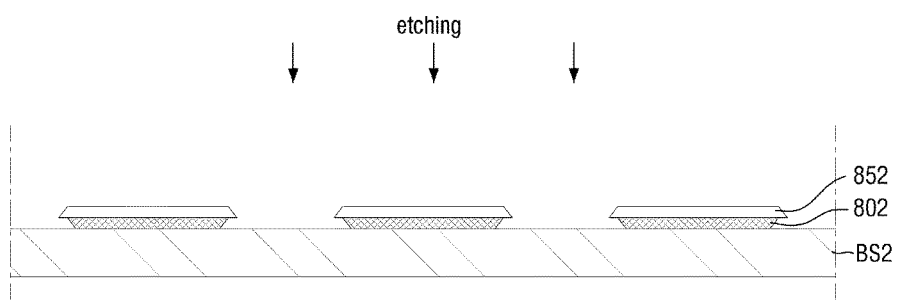

Next, referring to FIG. 29B, an opaque material pattern 802 is formed using the photosensitive pattern layer 852 as an etch mask. The forming of the opaque material pattern 852 may include patterning the opaque material layer 800 using an etching process. In an exemplary embodiment, side surfaces of the opaque material pattern 802 may have an inverted slope. The lateral shape of the opaque material pattern 802 can be controlled by the type of an etching process, an etchant, an etching time, etching conditions, etc. However, the exemplary embodiments are not limited thereto, and the side surfaces of the opaque material pattern 802 can have a non-inverted slope or can be substantially perpendicular to the surface of the substrate BS2. The photosensitive pattern layer 852 used as the etch mask may be removed by an ashing process.

Figure 29C:
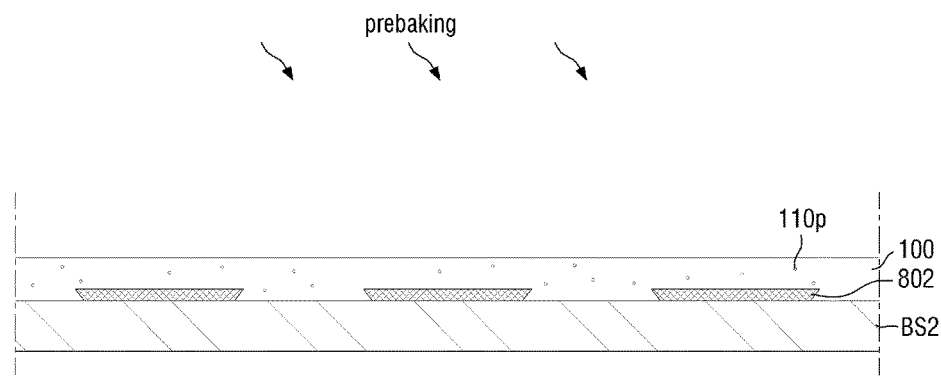

Next, referring to FIG. 29C, an organic layer 100 is formed on the opaque material pattern 802. Since the forming of the organic layer 100 has been described above with reference to FIG. 26E, a redundant description of this operation will be omitted.

Figure 29D:
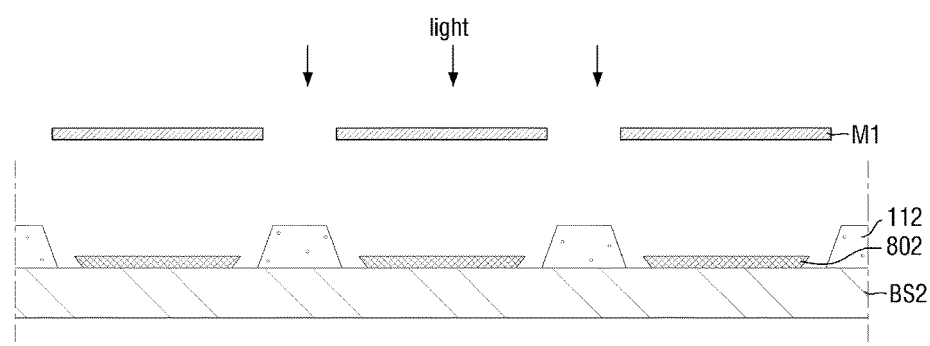

Next, referring to FIG. 29D, a partition wall 112 is formed on the substrate BS2. The forming of the partition wall 112 may include radiating light to the organic layer 100 by using a mask M1 as an exposure mask and forming the partition wall 112 by applying a developer. In the current operation, the partition wall 112 and the opaque material pattern 802 may be separated from each other, and at least a part of the surface of the substrate BS2 may be exposed without being covered by the partition wall 112 and the opaque material pattern 802.

Figure 29E:
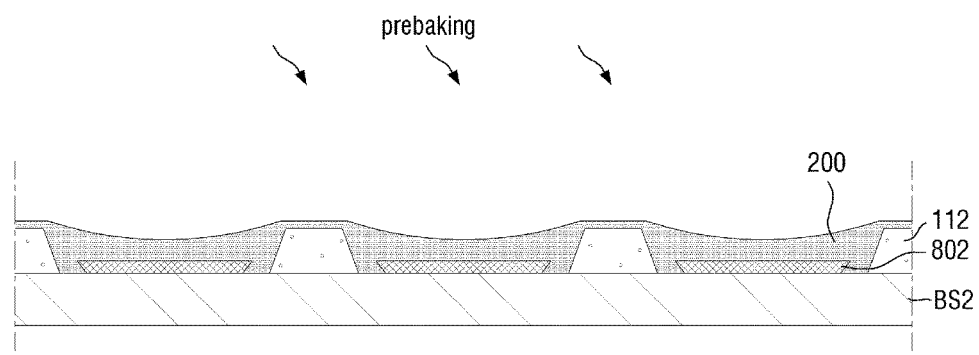

Next, referring to FIG. 29E, a light-shielding member forming composition 200 including a light-shielding material is applied onto the partition wall 112. In exemplary embodiments, prebaking the applied light-shielding member forming composition 200 may be further performed. In the current operation, the light-shielding member forming composition 200 may at least partially fill a space between the partition wall 112 and the opaque material pattern 802.

Figure 29F:
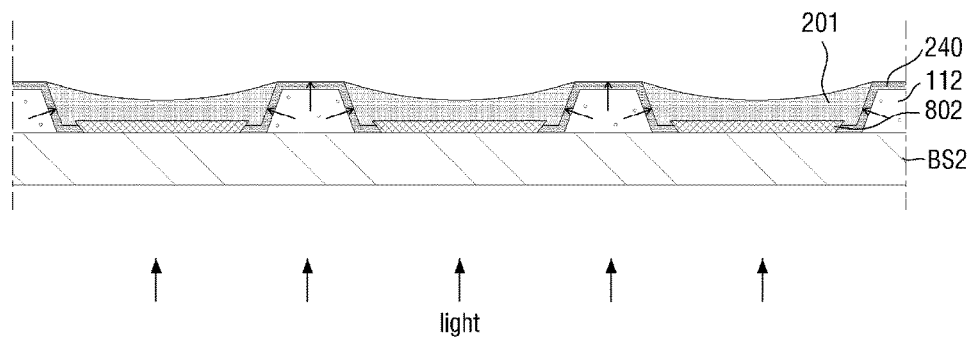

Next, referring to FIG. 29F, a light-shielding member 240 is formed by radiating light from the back of the substrate BS2. Since the forming of the light-shielding member 240 has been described in detail with reference to FIG. 26H, a redundant description of this operation will be omitted.

Figure 29G:
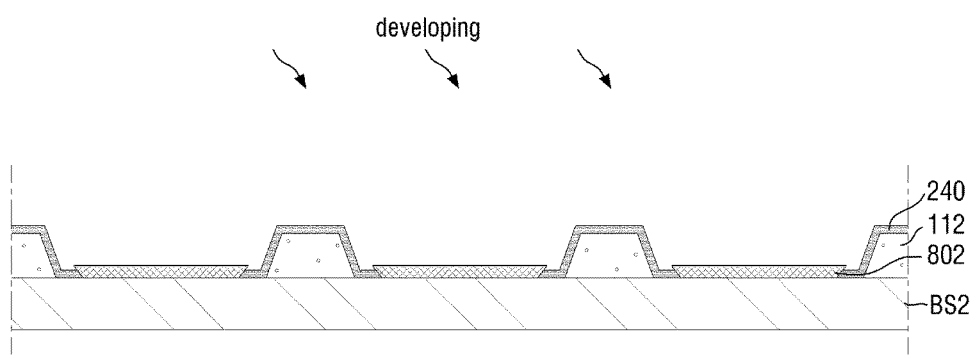

Next, referring to FIG. 29G, the remaining light-shielding member forming composition is removed. The removing of the composition may include removing the remaining composition by applying a developer.

Figure 29H:
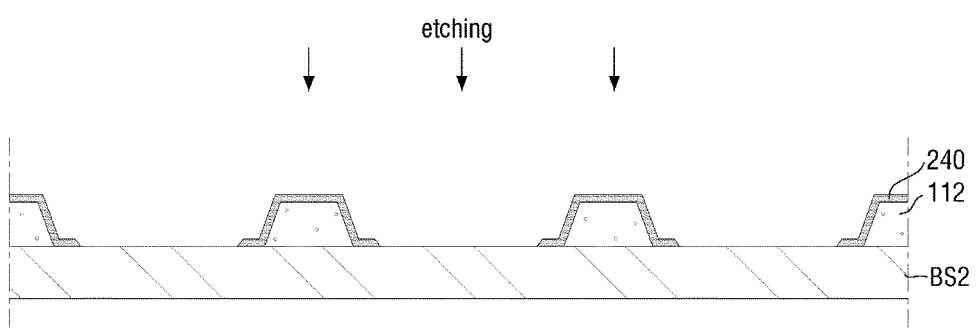

Next, referring to FIG. 29H, the opaque material pattern is removed to at least partially expose the surface of the substrate BS2.

Although not illustrated in the drawings, a display device can be manufactured by the same method as described above with reference to FIGS. 26K, 26L, 26M, 26N, and 26O.

FIGS. 30A, 30B, 30C, 30D, 30E, and 30F are cross-section views illustrating a method of manufacturing a display device according to an exemplary embodiment.

Figure 30A:
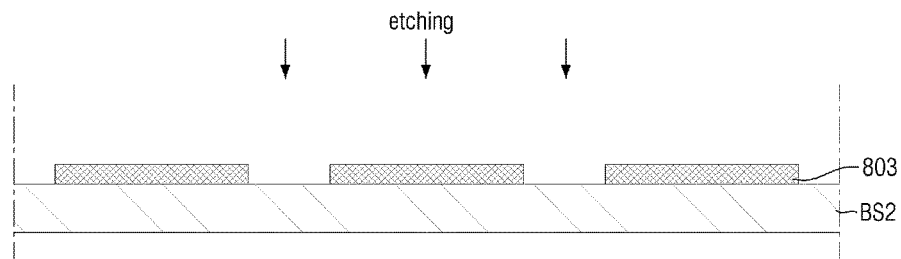

Referring to FIG. 30A, an opaque material pattern 803 is formed on a surface of a substrate BS2. Side surfaces of the opaque material pattern 803 may be substantially perpendicular to the surface of the substrate BS2. Since the method of forming the opaque material pattern 803 has been described in detail with reference to FIGS. 26A, 26B, 26C, and 26D, a redundant description of the method will be omitted.

Figure 30B:
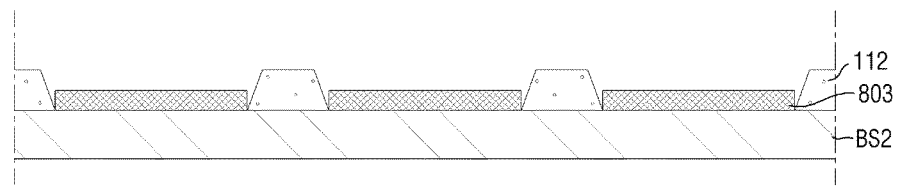

Next, referring to FIG. 30B, a partition wall 112 is formed on the substrate BS2. In the current operation, the partition wall 112 and the opaque material pattern 803 may be at least partially in contact with each other. That is, the surface of the substrate BS2 may be completely covered by the partition wall 112 and the opaque material pattern 803. Since the forming of the partition wall 112 has been described above with reference to FIGS. 26E and 26F, a redundant description of this operation will be omitted.

Figure 30C:
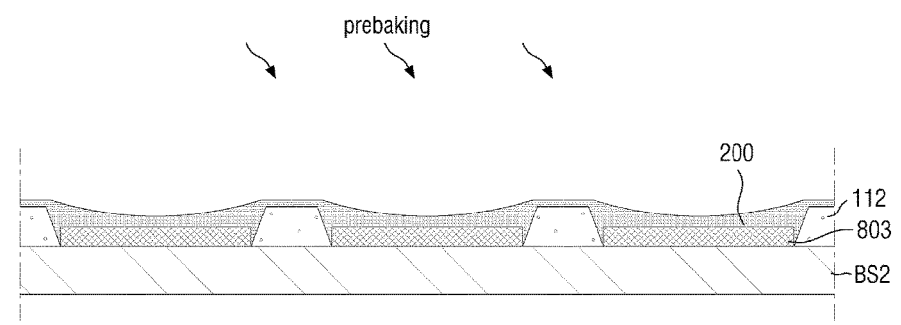

Next, referring to FIG. 30C, a light-shielding member forming composition 200 including a light-shielding material is applied onto the partition wall 112. In exemplary embodiments, prebaking the applied light-shielding member forming composition 200 may be further performed.

Figure 30D:
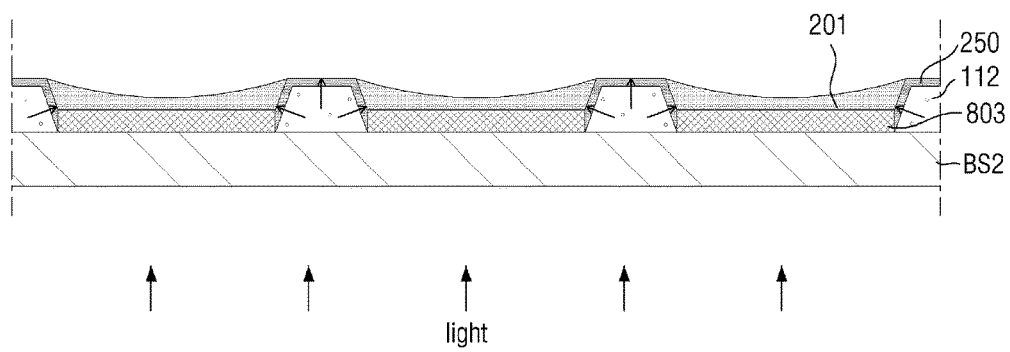

Next, referring to FIG. 30D, a light-shielding member 250 is formed by radiating light from the back of the substrate BS2. When the opaque material pattern 803 having the perpendicular side surfaces is in contact with the partition wall 112, side surfaces of the light-shielding member 250 may also be perpendicular. Since the forming of the light-shielding member 250 has been described in detail with reference to FIG. 26H, a redundant description of this operation will be omitted.

Figure 30E:
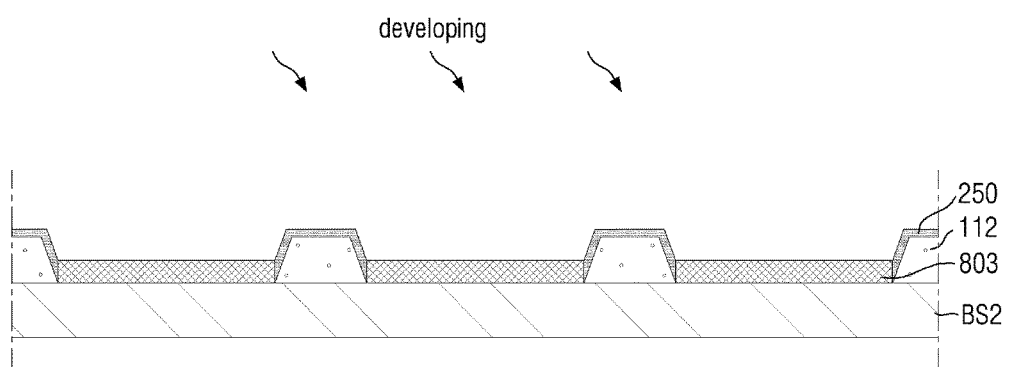

Next, referring to FIG. 30E, the remaining light-shielding member forming composition is removed. The removing of the composition may include removing the remaining composition by applying a developer.

Figure 30F:
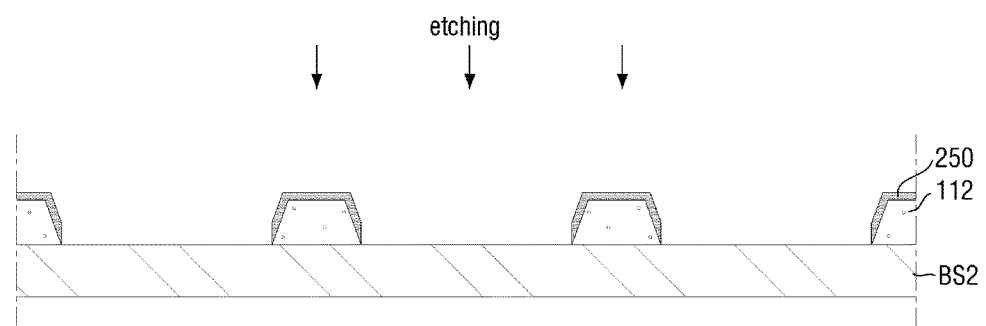

Next, referring to FIG. 30F, the opaque material pattern is removed to at least partially expose the surface of the substrate BS2.

Although not illustrated in the drawings, a display device can be manufactured by the same method as described above with reference to FIGS. 26K, 26L, 26M, 26N, and 26O.

FIGS. 31A, 31B, 31C, 31D, 31E, and 31F are cross-section views illustrating a method of manufacturing a display device according to an exemplary embodiment.

Figure 31A:
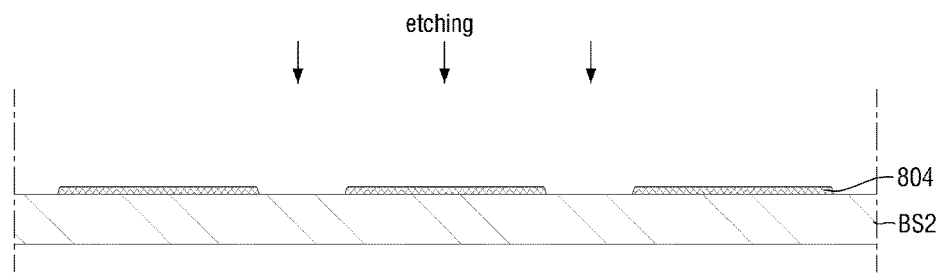

Referring to FIG. 31A, an opaque material pattern 803 is formed on a surface of a substrate BS2. Since the method of forming the opaque material pattern 803 has been described in detail with reference to FIGS. 26A, 26B, 26C and 26D, a redundant description of the method will be omitted.

Figure 31B:
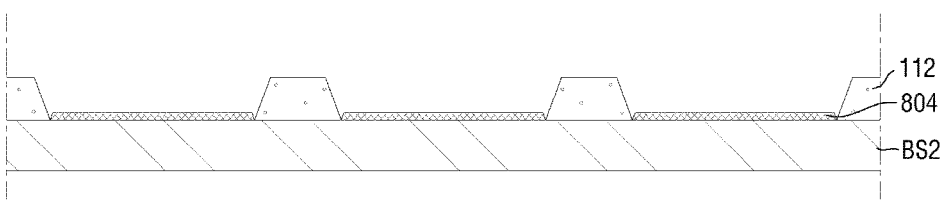

Next, referring to FIG. 31B, a partition wall 112 is formed on the substrate BS2. Since the forming of the partition wall 112 has been described above with reference to FIGS. 26E and 26F, a redundant description of this operation will be omitted.

Figure 31C:
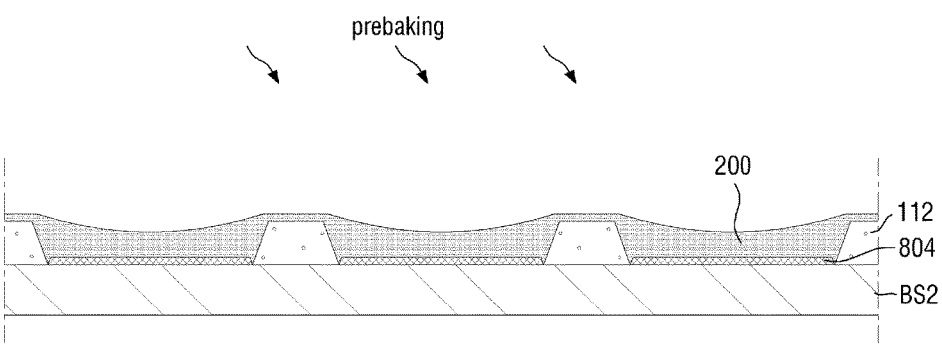

Next, referring to FIG. 31C, a light-shielding member forming composition 200 including a light-shielding material is applied onto the partition wall 112. In exemplary embodiments, prebaking the applied light-shielding member forming composition 200 may be further performed.

Figure 31D:
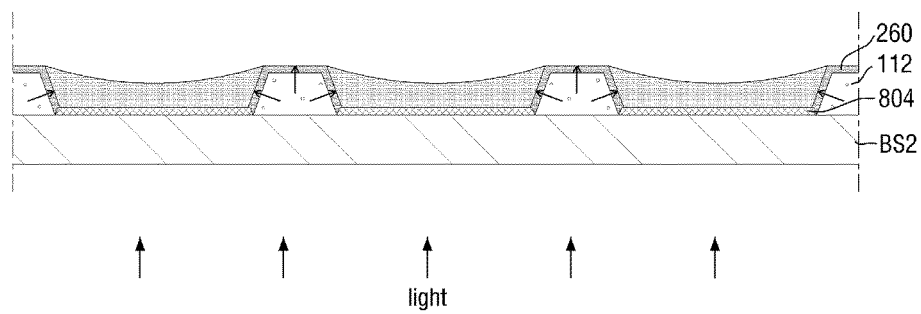

Next, referring to FIG. 31D, a light-shielding member 260 is formed by radiating light from the back of the substrate BS2. In an exemplary embodiment, the light-shielding member 260 may at least partially overlap the opaque material pattern 804. Since the forming of the light-shielding member 260 has been described in detail with reference to FIG. 26H, a redundant description of this operation will be omitted.

Figure 31E:
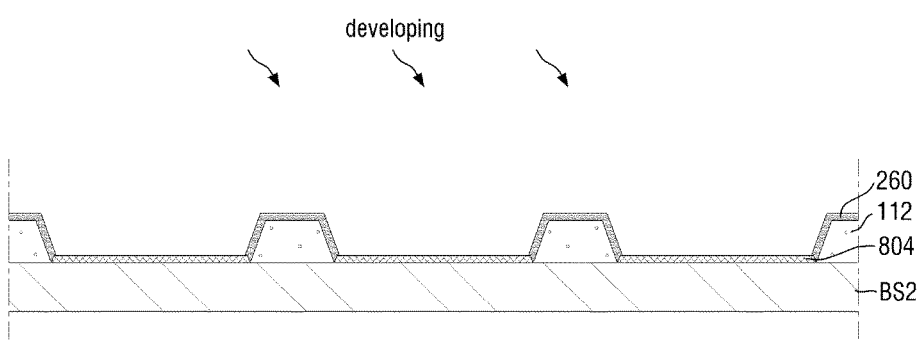

Next, referring to FIG. 31E, the remaining light-shielding member forming composition is removed. The removing of the composition may include removing the remaining composition by applying a developer.

Figure 31F:
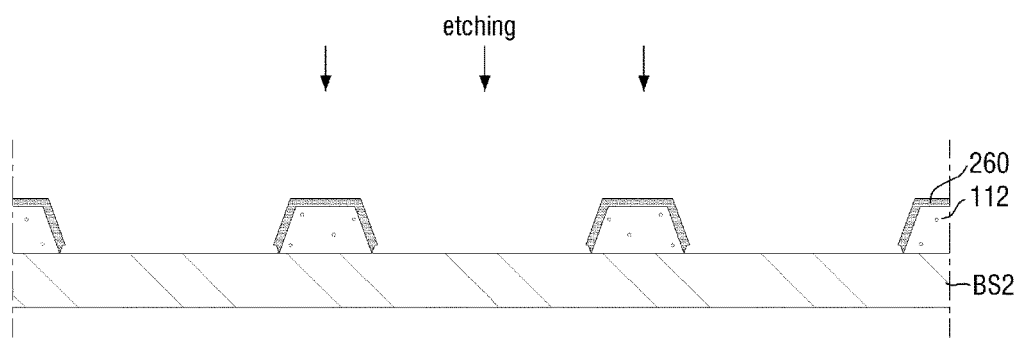

Referring to FIG. 31*f*, the opaque material pattern is removed to at least partially expose the surface of the substrate BS2. Accordingly, the partition wall 112 disposed on the substrate BS2 and the light-shielding member 260 disposed on the partition wall 112 and having an undercut portion can be formed.

Although not illustrated in the drawings, a display device can be manufactured by the same method as described above with reference to FIGS. 26K, 26L, 26M, 26N, and 26O.

FIGS. 32A, 32B, 32C, 32D, 32E, and 32F are cross-section views illustrating a method of manufacturing a display device according to an exemplary embodiment.

Referring to FIGS. 32A, 32B, 32C, 32D, and 32E, a partition wall 112 having translucency and an opaque material pattern 804 are formed on a surface of a substrate BS2. Then, a light-shielding member forming composition 200 is applied, and light is radiated from the back of the substrate BS2 to form a light-shielding member 260. The light-shielding member 260 may at least partially overlap the opaque material pattern 804. Since these operations are substantially the same as those of FIGS. 31A, 31B, 31C, 31D, and 31E, a redundant description will be omitted.

Figure 32A:
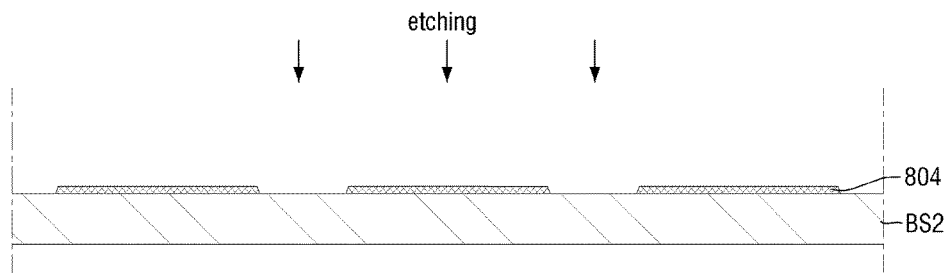
Figure 32B:
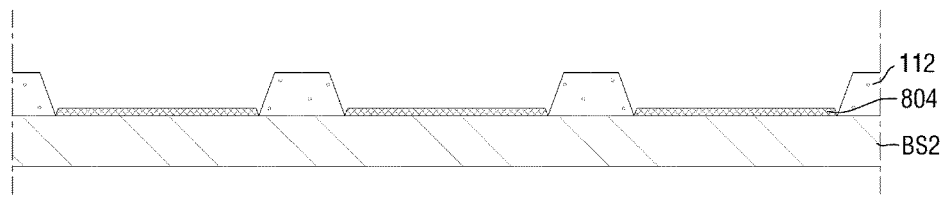
Figure 32C:
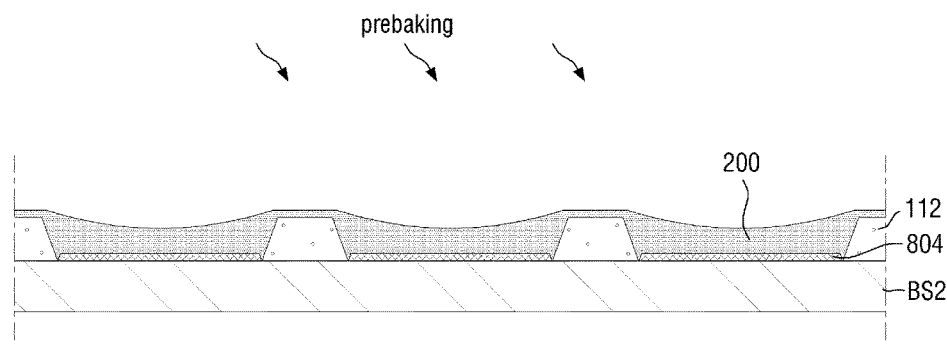
Figure 32D:
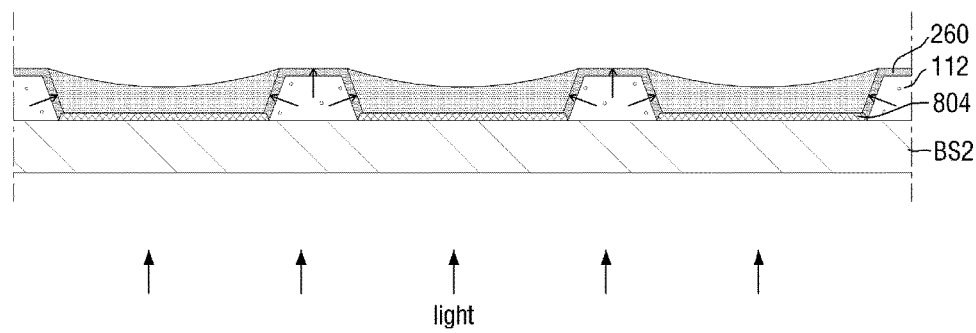
Figure 32E:
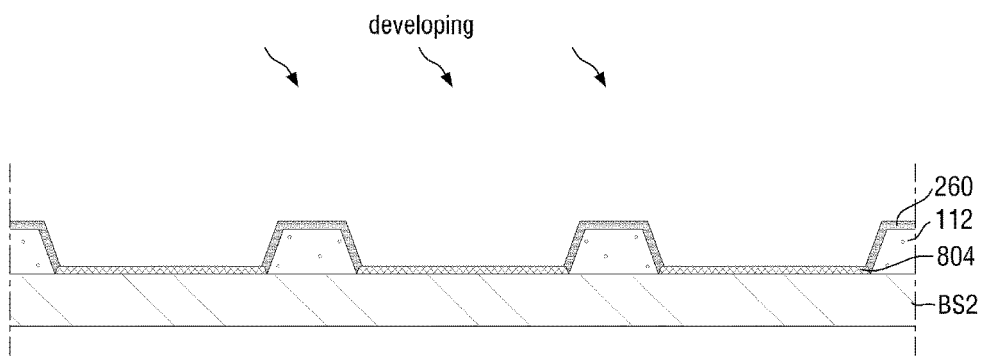
Figure 32F:
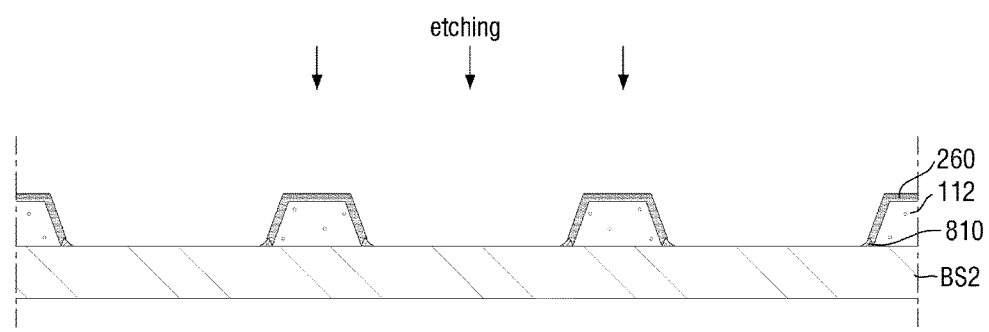

Next, referring to FIG. 32F, the opaque material pattern is removed to at least partially expose the surface of the substrate BS2. In an exemplary embodiment, the opaque material pattern 810 may remain on at least a part of an undercut portion of the shielding member 260. Accordingly, an opaque material pattern 810 may be formed between the light-shielding member 260 and the substrate BS2.

Although not illustrated in the drawings, a display device can be manufactured by the same method as described above with reference to FIGS. 26K, 26L, 26M, 26N, and 26O.

FIGS. 33A, 33B, 33C, 33D, 33E, and 33F are cross-section views illustrating a method of manufacturing a display device according to an exemplary embodiment.

Figure 33A:
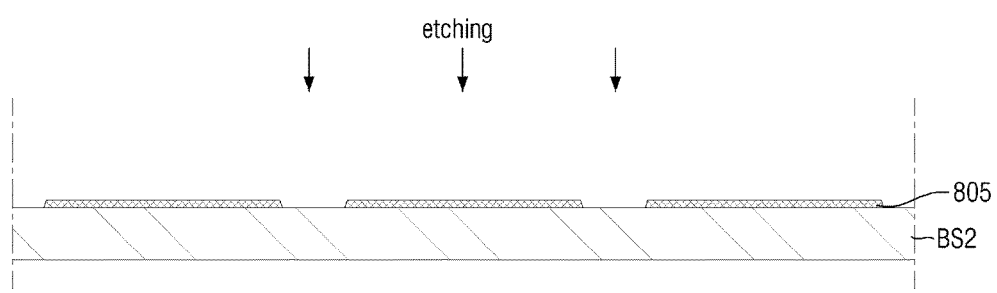

Referring to FIG. 33A, an opaque material pattern 805 is formed on a surface of a substrate BS2. Since the method of forming the opaque material pattern 805 has been described in detail with reference to FIGS. 26A, 26B, 26C, 26D, and 26D, a redundant description of the method will be omitted.

Figure 33B:
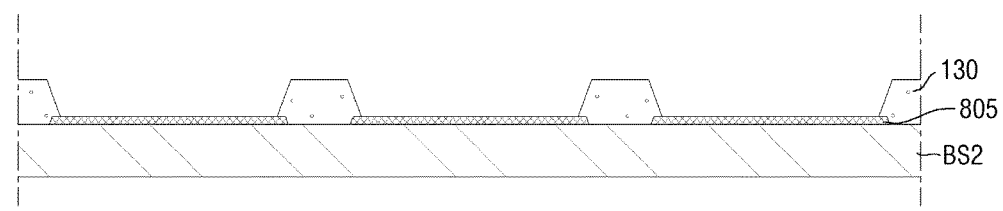

Next, referring to FIG. 33B, a partition wall 112 is formed on the substrate BS2. In an exemplary embodiment, the partition wall 112 may at least partially overlap the opaque material pattern 805. Since the forming of the partition wall 112 has been described with reference to FIGS. 26E and 26F, a redundant description of this operation will be omitted.

Figure 33C:
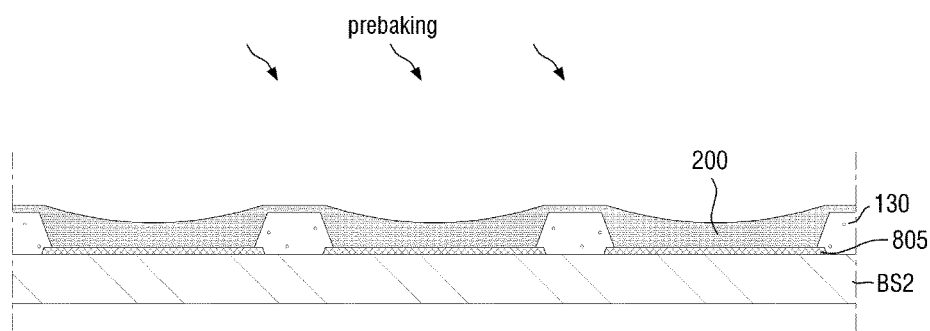
Figure 33D:
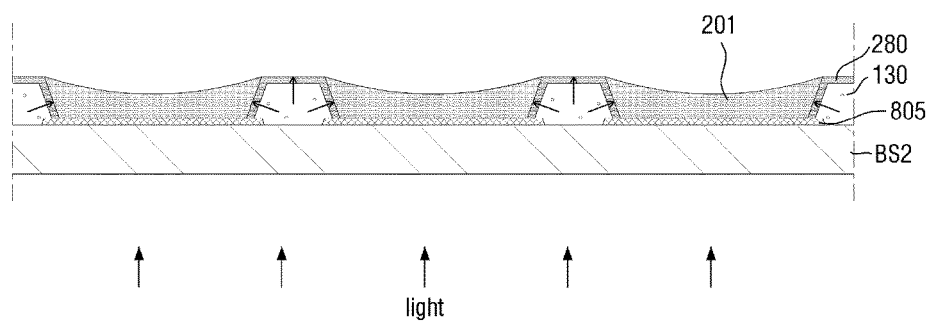
Figure 33E:
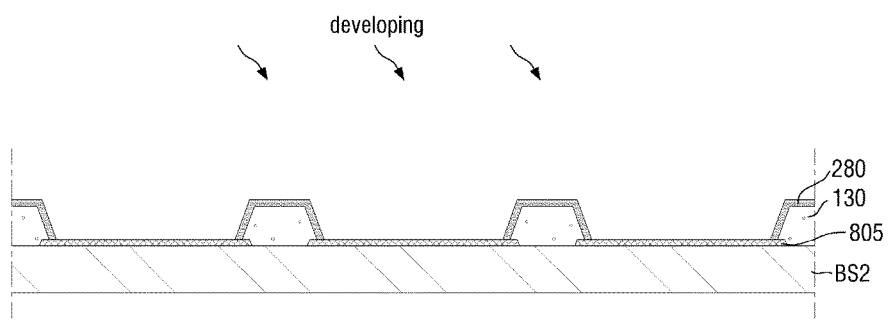
Figure 33F:
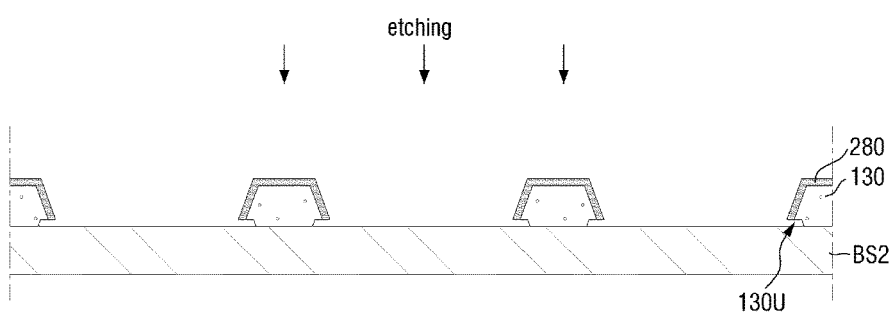

Next, referring to FIGS. 33C, 33F, and 33E, a light-shielding member forming composition 200 including a light-shielding material is applied, light is radiated from the back of the substrate BS2 to form a light-shielding member 280, and the remaining light-shielding member forming composition is removed.

Referring to FIG. 33F, the opaque material pattern is removed to at least partially expose the surface of the substrate BS2. Accordingly, the partition wall 112 disposed on the substrate BS2 and having an undercut portion and the light-shielding member 280 disposed on the partition wall 112 may be formed.

Although not illustrated in the drawings, a display device can be manufactured by the same method as described above with reference to FIGS. 26K, 26L, 26M, 26N, and 26O.

FIGS. 34A, 34B, 34C, 34D, 34E, and 34F are cross-section views illustrating a method of manufacturing a display device according to an exemplary embodiment.

Referring to FIGS. 34A, 34B, 34C, 34D, and 34E, a partition wall 112 having translucency and an opaque material pattern 805 are formed on a surface of a substrate BS2. Then, a light-shielding member forming composition 200 is applied, and light is radiated from the back of the substrate BS2 to form a light-shielding member 280. The partition wall 112 may at least partially overlap the opaque material pattern 805. Since these operations are the same as those of FIGS. 33A, 33B, 33C, 33D, and 33E, a redundant description will be omitted.

Figure 34A:
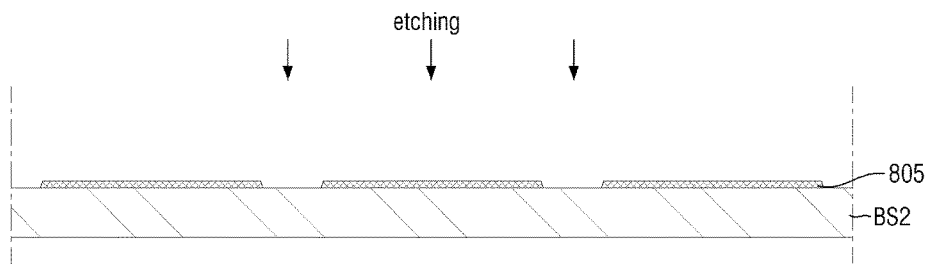
Figure 34B:
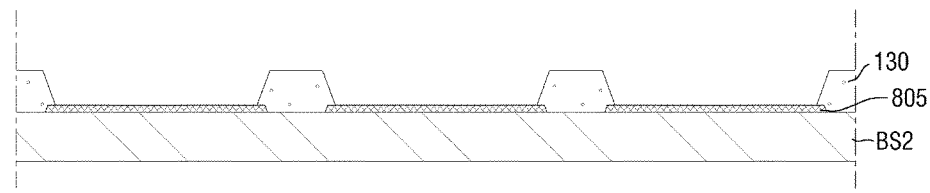
Figure 34C:
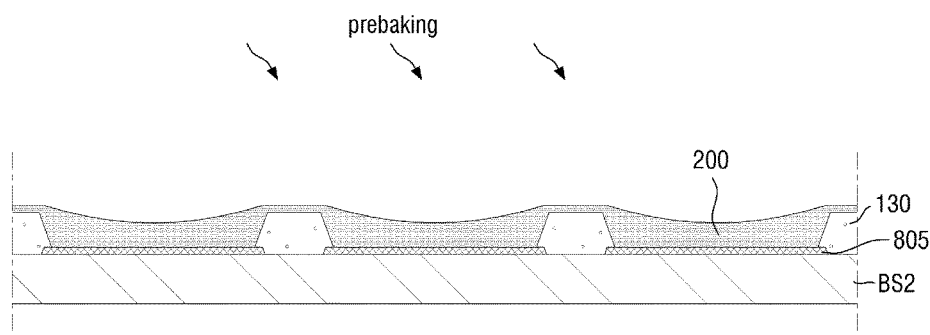
Figure 34D:
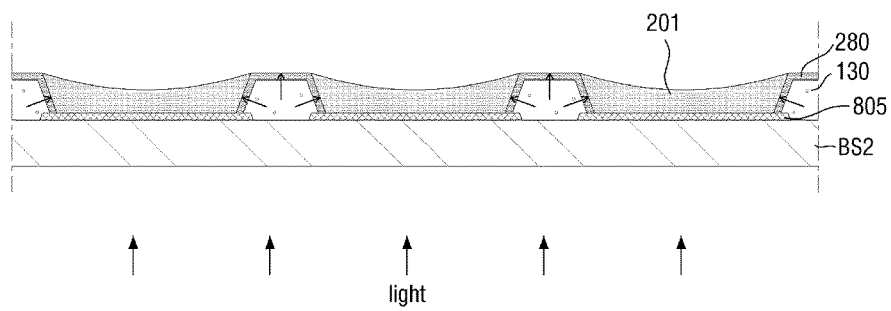
Figure 34E:
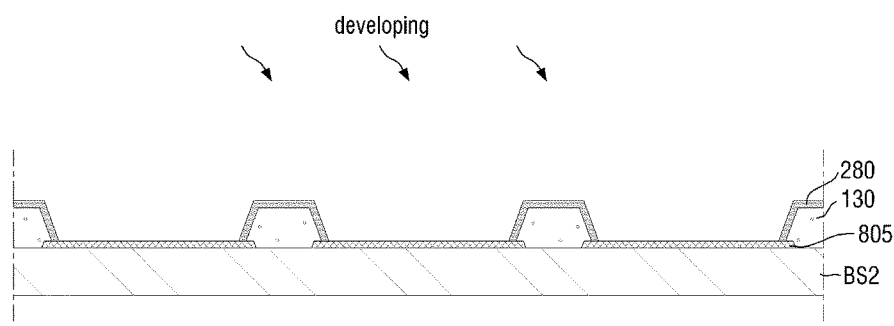
Figure 34F:
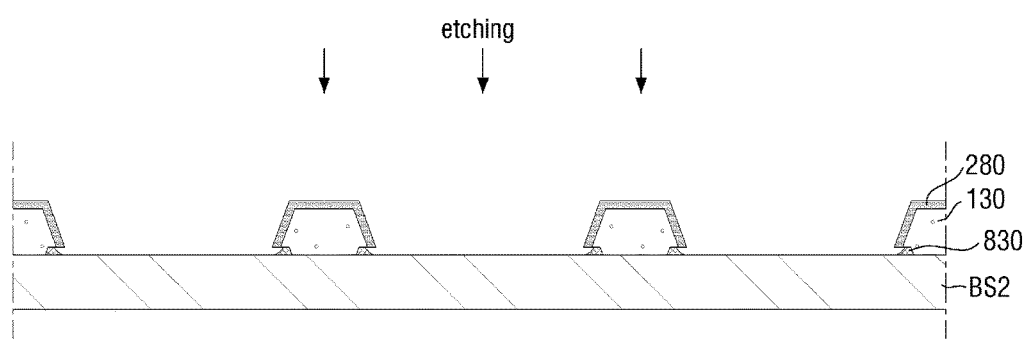

Referring to FIG. 34F, the opaque material pattern is removed to at least partially expose the surface of the substrate BS2. In an exemplary embodiment, the opaque material pattern 340 may remain on at least a part of an undercut portion of the partition wall 112. Accordingly, an opaque material layer 830 may be formed between the partition wall 112 and the substrate BS2.

Although not illustrated in the drawings, a display device can be manufactured by the same method as described above with reference to FIGS. 26K, 26L, 26M, 26N, and 26O.

FIGS. 35A, 35B, 35C, 35D, 35E, 35F, and 35G are cross-section views illustrating a method of manufacturing a display device according to an exemplary embodiment.

Figure 35A:
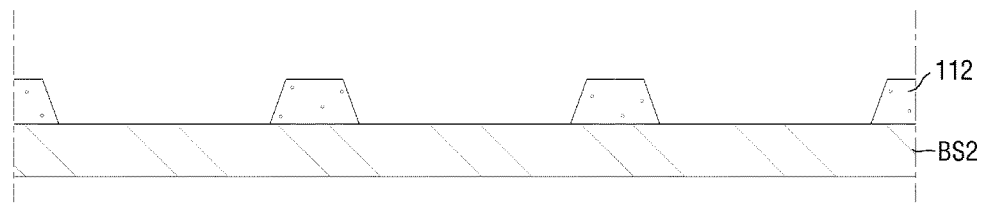

Referring to FIG. 35A, a partition wall 112 is formed on a surface (a top surface in FIG. 35A) of a substrate BS2. The forming of the partition wall 112 may include forming an organic layer and patterning the organic layer. Accordingly, the partition wall 112 which exposes at least a part of the surface of the substrate BS2 may be formed.

Figure 35B:
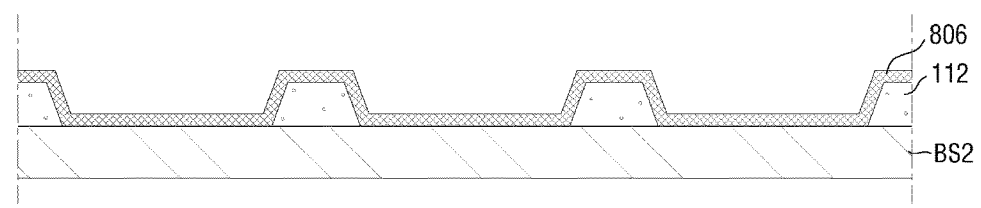

Next, referring to FIG. 35B, an opaque material layer 806 is formed on the substrate BS2 and the partition wall 112. The opaque material layer 806 may include a reflective metal material or an opaque organic material. A method of forming the opaque material layer 806 is not particularly limited. For example, the opaque material layer 806 may be formed by a deposition method such as sputtering.

Figure 35C:
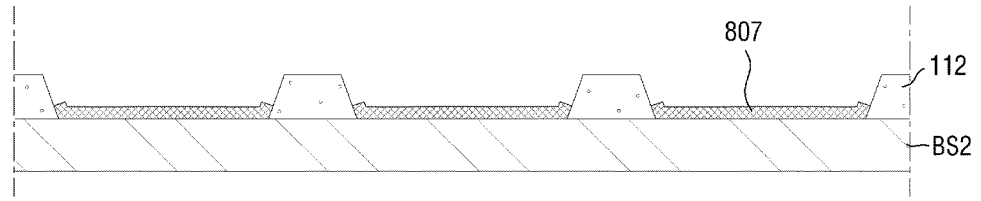

Next, referring to FIG. 35C, an opaque material pattern 807 is formed. The forming of the opaque material pattern 807 may include placing an etch mask and etching the opaque material layer using the etch mask. In an exemplary embodiment, the opaque material pattern 807 may be disposed on at least a part of the partition wall 112. That is, the opaque material pattern 807 may at least partially overlap the partition wall 112. Accordingly, the opaque material pattern 807 may be formed on the exposed surface of the substrate BS2.

Figure 35D:
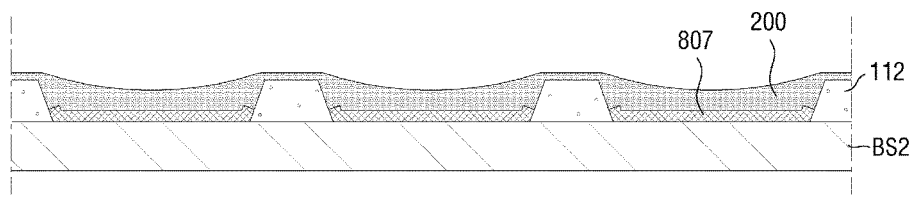

Next, referring to FIG. 35D, a light-shielding member forming composition 200 including a light-shielding material is applied onto the opaque material pattern 807. In exemplary embodiments, prebaking the applied light-shielding member forming composition 200 may be further performed.

Figure 35E:
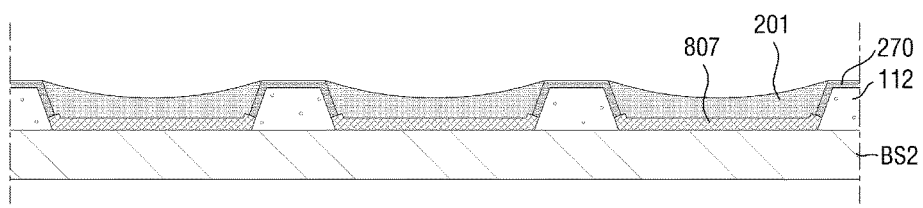

Next, referring to FIG. 35E, a light-shielding member 270 is formed by radiating light from the back of the substrate BS2. Since the forming of the light-shielding member 270 has been described in detail with reference to FIG. 26H, a redundant description of this operation will be omitted.

Figure 35F:
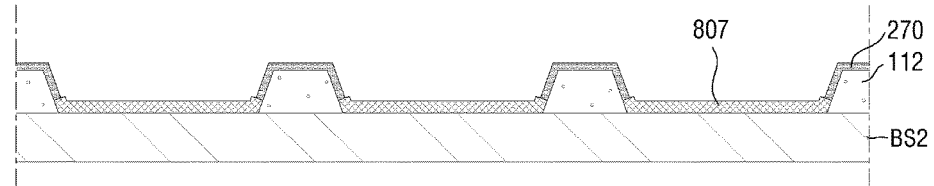

Next, referring to FIG. 35F, the remaining light-shielding member forming composition is removed. The removing of the composition may include removing the remaining composition by applying a developer.

Figure 35G:
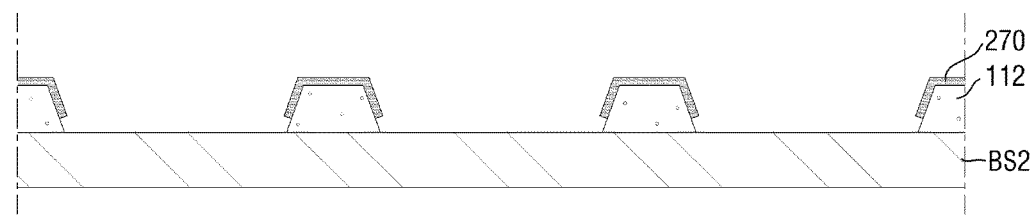

Next, referring to FIG. 35G, the opaque material pattern is removed to at least partially expose the surface of the substrate BS2. Accordingly, the light-shielding member 270 separated from the substrate BS2 may be formed.

Although not illustrated in the drawings, a display device can be manufactured by the same method as described above with reference to FIGS. 26K, 26L, 26M, 26N, and 26O.

FIGS. 36A, 36B, 36C, 36D, 36E, 36F, and 36G are cross-section views illustrating a method of manufacturing a display device according to an exemplary embodiment.

Referring to FIGS. 36A, 36B, 36C, 36D, 36E, and 36F, a partition wall 112 having transparency and an opaque material pattern 807 are formed on a surface of a substrate BS2. Then, a light-shielding member forming composition 200 is applied, and light is radiated from the back of the substrate BS2 to form a light-shielding member 270. The opaque material pattern 807 may at least partially overlap the partition wall 112. Since these operations are substantially the same as those of FIGS. 35A, 35B, 35C, 35D, 35E, and 35F, a redundant description will be omitted.

Figure 36A:
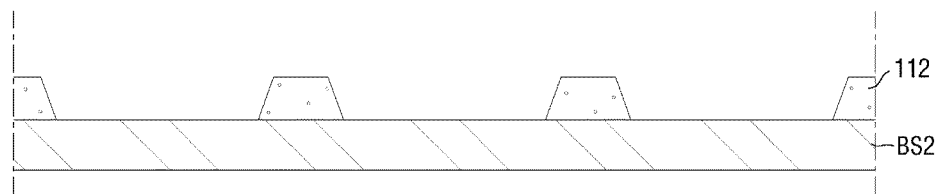
Figure 36B:
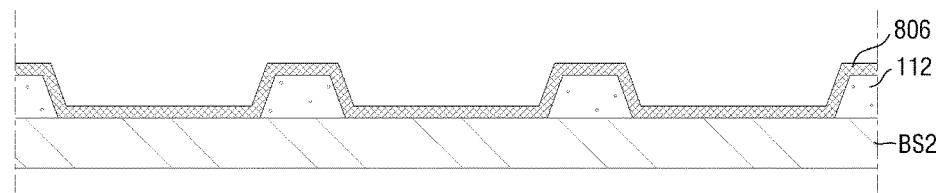
Figure 36C:
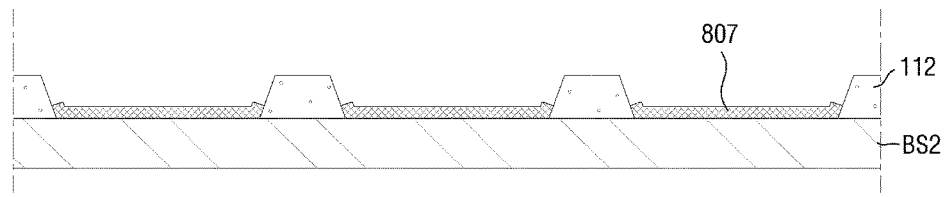
Figure 36D:
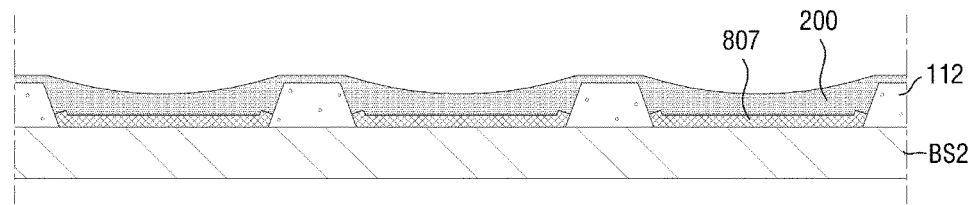
Figure 36E:
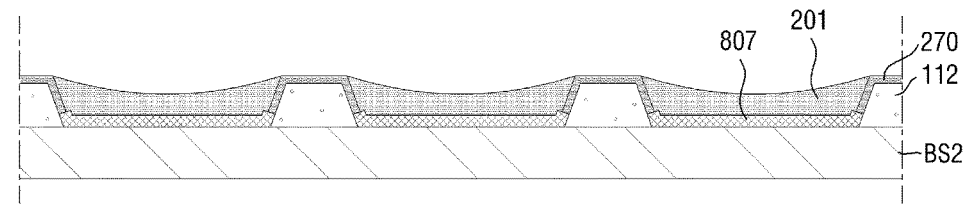
Figure 36F:
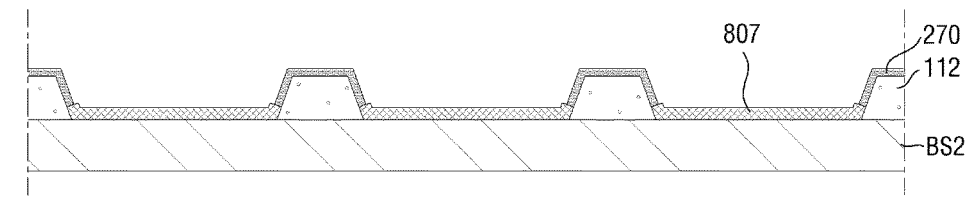
Figure 36G:
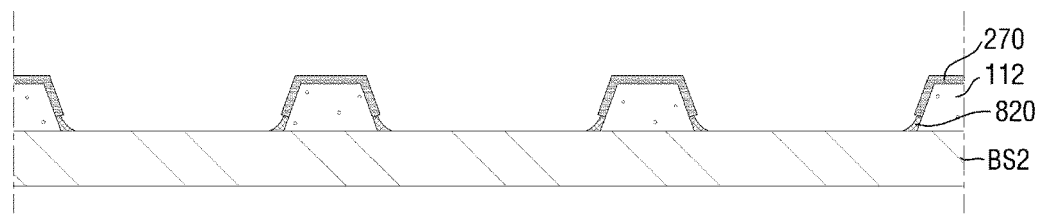

Next, referring to FIG. 36G, the opaque material pattern is removed to at least partially expose the surface of the substrate BS2. In an exemplary embodiment, the opaque material pattern 820 may remain on at least a part of exposed side surfaces of the partition wall 112. Accordingly, an opaque material pattern 820 may be formed to contact the partition wall 112.

Although not illustrated in the drawings, a display device can be manufactured by the same method as described above with reference to FIGS. 26K, 26L, 26M, 26N, and 26O.

FIGS. 37A, 37B, 37C, 37D, 37E, 37F, 37G, and 37H are cross-section views illustrating a method of manufacturing a display device according to an exemplary embodiment.

Figure 37A:
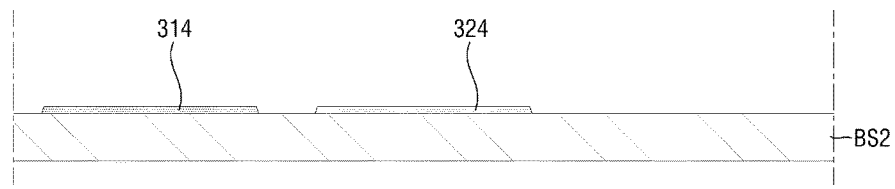

Referring to FIG. 37A, a first wavelength band filter 314 and a second wavelength band filter 324 are formed on a surface (a top surface in FIG. 37A) of a substrate BS2. Each of the first wavelength band filter 314 and the second wavelength band filter 324 may be a wavelength-selective optical filter that transmits light of a specific wavelength band and blocks light of another specific wavelength band. The first wavelength band filter 314 and the second wavelength band filter 324 may be separated from each other.

Figure 37B:
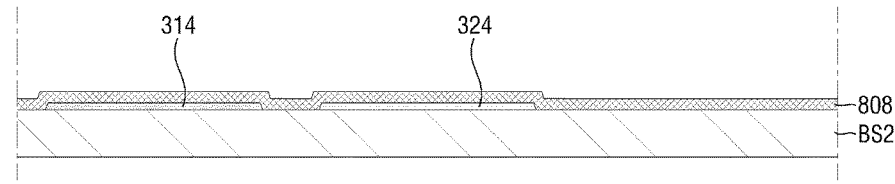

Referring to FIG. 37B, an opaque material layer 808 is formed on the first wavelength band filter 314 and the second wavelength band filter 324. The opaque material layer 808 may include a reflective metal material such as aluminum, copper, silver, gold, titanium, molybdenum, nickel, or an alloy of these materials or may include an opaque organic material.

Figure 37C:
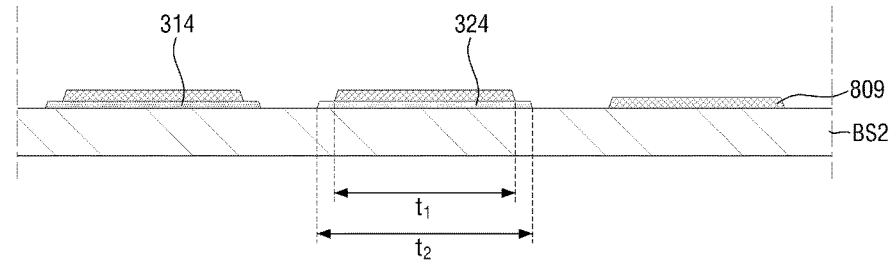

Referring to FIG. 37C, an opaque material pattern 809 is formed by patterning the opaque material layer 808. The forming of the opaque material pattern 809 may include patterning the opaque material layer using an etch mask.

In an exemplary embodiment, a width $t_1$ of the opaque material pattern 809 may be smaller than a width of the first wavelength band filter 314 and a width $t_2$ of the second wavelength band filter 324. That is, the formed opaque material pattern 809 may partially expose the first wavelength band filter 314 and the second wavelength band filter 324 without completely covering the first wavelength band filter 314 and the second wavelength band filter 324.

Figure 37D:
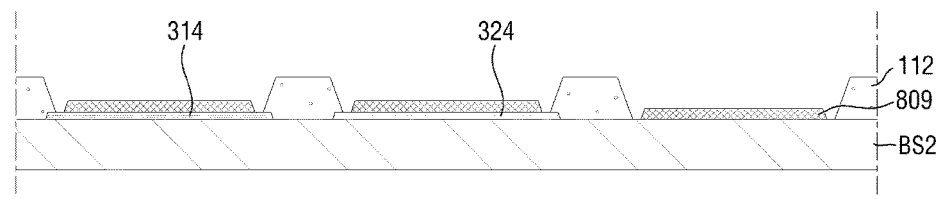

Next, referring to FIG. 37D, a partition wall 112 is formed on the substrate BS2. In an exemplary embodiment, the partition wall 112 may at least partially overlap the first wavelength band filter 314 and/or the second wavelength band filter 324. Since the forming of the partition wall 112 has been described above with reference to FIGS. 26E and 26F, a redundant description of this operation will be omitted.

Figure 37E:
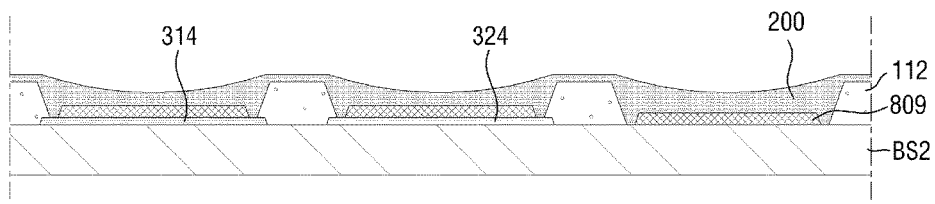
Figure 37F:
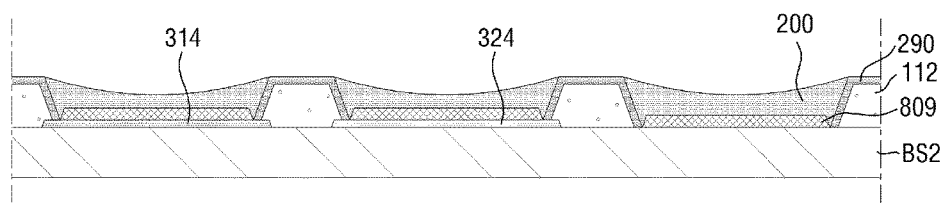
Figure 37G:
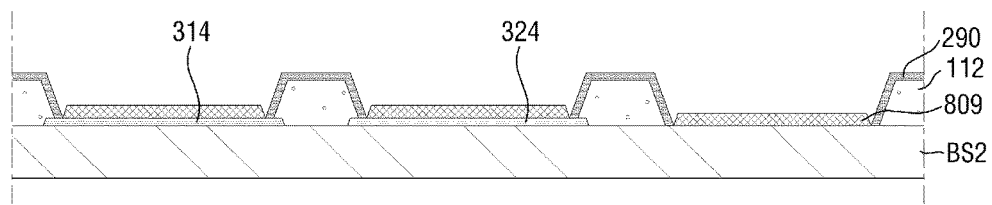

Next, referring to FIGS. 37E, 37F, and 37G, a light-shielding member forming composition 200 including a light-shielding material is applied, light is radiated from the back of the substrate BS2 to form a light-shielding member 290, and the remaining light-shielding member forming composition is removed.

Figure 37H:
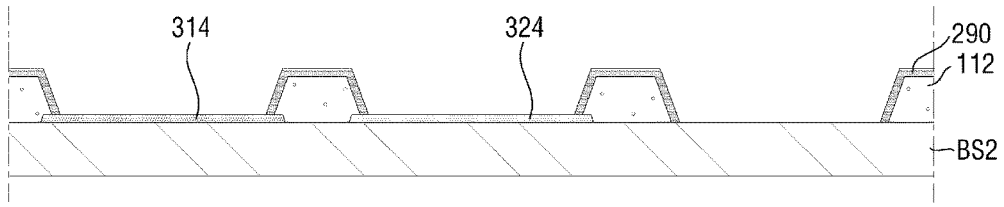

Referring to FIG. 37H, the opaque material pattern is removed to at least partially expose the surface of the substrate BS2 and the first and second wavelength band filters 314 and 324. Accordingly, the first and second wavelength band filters 314 and 324 interposed between the substrate BS2 and the partition wall 112 may be formed.

Although not illustrated in the drawings, a display device can be manufactured by the same method as described above with reference to FIGS. 26K, 26L, 26M, 26N, and 26O.

A display device according to the exemplary embodiment may include a light-shielding member located between adjacent pixels to block the movement of light between the pixels. Therefore, it is possible to suppress or reduce a defect in which light leaks from an unintended pixel, thereby providing a display device with improved display quality.

A method of manufacturing a display device according to the exemplary embodiment can be employed to produce a display device with improved display quality.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A display device comprising:
    a substrate;
    a transparent partition wall disposed on the substrate, the transparent partition wall configured to define a plurality of openings;
    a light-shielding member disposed on a top surface and side surfaces of the transparent partition wall, the light-shielding member comprising a negative photosensitive organic material; and
    a first color conversion pattern disposed in at least one of the plurality of openings, the first color conversion pattern comprising a quantum dot material or a fluorescent material.

2. The display device of claim 1, wherein the transparent partition wall comprises:
    a plurality of first partition wall portions extending in a first direction; and
    a plurality of second partition wall portions extending in a second direction intersecting the first direction,
    wherein the openings are defined by the first partition wall portions and the second partition wall portions, and the light-shielding member has a lattice shape in plan view.

3. The display device of claim 1, wherein a surface of the light-shielding member disposed on the top surface of the transparent partition wall has a hydrophobicity greater than that of a surface of the light-shielding member disposed on the side surfaces of the transparent partition wall.

4. The display device of claim 1, wherein the light-shielding member disposed on the top surface of the transparent partition wall has a thickness greater than that of the light-shielding member disposed on the side surfaces of the transparent partition wall.

5. The display device of claim 1, wherein the light-shielding member disposed on the top surface of the transparent partition wall has a thickness of about 1.3 µm or more and an optical density of about 2.0/1.3 µm or more.

6. The display device of claim 1, wherein the light-shielding member is disposed directly on the transparent partition wall, the light-shielding member comprising:
    a first surface, at least a part of the first surface directly contacting the transparent partition wall; and
    a second surface facing opposite to the first surface,
    wherein a roughness of the second surface is greater than that of the first surface.

7. The display device of claim 6, wherein the light-shielding member further comprises:
    a third surface connecting the first surface and the second surface,
    wherein the roughness of the second surface is greater than that of the third surface.

8. The display device of claim 1, wherein the transparent partition wall has a light transmittance of about 90% or more.

9. The display device of claim 1, wherein the transparent partition wall comprises particles dispersed therein.

10. The display device of claim 1, wherein the side surfaces of the transparent partition wall are inclined at an average inclination angle with respect to a surface of the substrate,
    wherein the transparent partition wall has a height of about 7.0 µm or more, and
    wherein the average inclination angle is about 30 to 85 degrees.

11. The display device of claim 1, comprising:
    a first pixel configured to display a first color;
    a second pixel configured to display a second color having a shorter peak wavelength than the first color;
    a third pixel configured to display a third color having a shorter peak wavelength than the second color are defined,
    wherein the display device further comprises:
    a liquid crystal layer disposed on the first color conversion pattern;
    a wavelength band filter disposed between the first color conversion pattern and the liquid crystal layer, the wavelength band filter is configured to selectively transmit light having a wavelength band comprising the peak wavelength of the third color, and selectively block light having a wavelength band comprising a peak wavelength longer than the peak wavelength of the third color; and
    a light source disposed on the liquid crystal layer, the light source configured to provide light of the third color,
    wherein the first color conversion pattern is disposed in the first pixel, the first color conversion pattern is configured to convert a color of incident light into the first color, and
    wherein at least a part of the wavelength band filter directly contacts the light-shielding member.

12. The display device of claim 11, wherein at least a part of the wavelength band filter directly contacts the first color conversion pattern and the light-shielding member, the wavelength band filter having a substantially constant thickness.

13. The display device of claim 11, further comprising:
    a second color conversion pattern disposed in the second pixel; and
    a light transmission pattern disposed in the third pixel,
    wherein the second color conversion pattern is configured to convert a color of incident light into the second color,
    wherein the light-shielding member is interposed between the first color conversion pattern and the second color conversion pattern, and
    wherein the light-shielding member is interposed between the first color conversion pattern and the light transmission pattern.

14. The display device of claim 1, comprising:
    a first pixel configured to display a first color;
    a second pixel configured to display a second color having a shorter peak wavelength than the first color; and
    a third pixel configured to display a third color having a shorter peak wavelength than the second color are defined,
    wherein the display device further comprises:
    a liquid crystal layer disposed on the first color conversion pattern;
    a light source disposed on the liquid crystal layer, the light source configured to provide light of the third color; and
    a wavelength band filter disposed between the light-shielding member and the first color conversion pattern, the wavelength band filter is configured to selectively transmit light having a wavelength band comprising a peak wavelength longer than the peak wavelength of the third color, and selectively block light having a wavelength band comprising the peak wavelength of the third color,
    wherein at least a part of the wavelength band filter is disposed on the top surface of the transparent partition wall.

15. The display device of claim 1, further comprising a wavelength band filter disposed between the light-shielding member and the first color conversion pattern, the wavelength band filter is configured to selectively transmit light of a specific wavelength band,
- wherein the wavelength band filter does not overlap the top surface of the transparent partition wall, and
- wherein at least a part of the first color conversion pattern directly contacts the light-shielding member.

16. The display device of claim 1, further comprising a wavelength band filter disposed between the substrate and the transparent partition wall, the wavelength band filter is configured to selectively transmit light of a specific wavelength band.

17. The display device of claim 16, further comprising an opaque material pattern disposed between the wavelength band filter and the transparent partition wall, the opaque material pattern comprising a different material from the light-shielding member.

18. The display device of claim 1, further comprising:
- a wavelength band filter disposed between the substrate and the first color conversion pattern, the wavelength band filter is configured to selectively transmit light of a specific wavelength band; and
- an opaque material pattern disposed between the substrate and the light-shielding member, the opaque material pattern comprising a different material from the light-shielding member.

19. The display device of claim 1, further comprising:
- a wavelength band filter disposed between the substrate and the first color conversion pattern, the wavelength band filter is configured to selectively transmit light of a specific wavelength band; and
- an opaque material pattern disposed between the substrate and the transparent partition wall, the opaque material pattern comprising a different material from the light-shielding member.

20. The display device of claim 1, further comprising:
- a first light-transmitting layer disposed on the light-shielding member to surround at least parts of the light-shielding member; and
- a second light-transmitting layer disposed directly on the first light-transmitting layer to surround at least parts of the first light-transmitting layer,
- wherein a refractive index of the second light-transmitting layer is greater than that of the first light-transmitting layer.

21. The display device of claim 1, further comprising:
- a first light-transmitting layer disposed on the top surface and the side surfaces of the transparent partition wall to surround at least parts of the transparent partition wall; and
- a second light-transmitting layer disposed between the first light-transmitting layer and the light-shielding member to surround at least parts of the first light-transmitting layer,
- wherein a refractive index of the second light-transmitting layer is greater than that of the first light-transmitting layer.

22. A method of manufacturing a display device, the method comprising:
- disposing a partition wall pattern having translucency and an opaque material pattern on a first surface of a substrate;
- applying a light-shielding member forming composition onto the partition wall pattern and the opaque material pattern; and
- forming a light-shielding member on a top surface and side surfaces of the partition wall pattern by radiating light from a second surface of the substrate, using the opaque material pattern as a light-shielding mask.

23. The method of claim 22, wherein the disposing of the partition wall pattern and the opaque material pattern comprises:
- disposing the opaque material pattern on the first surface of the substrate such that at least a part of the first surface of the substrate is exposed; and
- disposing the partition wall pattern on the exposed first surface of the substrate.

24. The method of claim 23, wherein the disposing of the opaque material pattern comprises:
- disposing an opaque material pattern on the first surface of the substrate;
- disposing a positive photosensitive layer on the opaque material pattern;
- forming a positive photosensitive pattern layer using a mask as a light-shielding mask; and
- forming the opaque material pattern by partially etching the opaque material pattern using the positive photosensitive pattern layer as an etch mask,
- wherein the disposing of the partition wall pattern comprises:
  - disposing a negative photosensitive layer on the opaque material pattern; and
  - forming the partition wall pattern using the mask as a light-shielding mask.

25. The method of claim 23, wherein at least a part of the partition wall pattern overlaps the opaque material pattern.

26. The method of claim 23, wherein the partition wall pattern is separated from the opaque material pattern, and
- wherein at least a part of the first surface of the substrate is exposed without being covered by the partition wall pattern and the opaque material pattern.

27. The method of claim 26, wherein the applying of the light-shielding member forming composition comprises disposing the light-shielding member forming composition in a space between the partition wall pattern and the opaque material pattern, and
- wherein at least a part of the light-shielding member directly contacts the substrate.

28. The method of claim 22, wherein the applying of the light-shielding member forming composition comprises disposing the light-shielding member forming composition to have a thickness greater than a height of the partition wall pattern.

29. The method of claim 22, further comprising:
- treating the entire surface of the applied light-shielding member forming composition with fluorine after the applying of the light-shielding member forming composition.

30. The method of claim 22, further comprising forming a recessed and protruding pattern layer on the surface of the uncured light-shielding member forming composition and on a surface of the light-shielding member formed on the top surface of the partition wall pattern after radiating light.

31. The method of claim 22, further comprising:
- disposing a wavelength band filter pattern on the first surface of the substrate before the disposing of the partition wall pattern and the opaque material pattern,
- wherein the opaque material pattern is formed on the wavelength band filter pattern to overlap the wavelength band filter pattern, and
- wherein the opaque material pattern is narrower than the wavelength band filter pattern.

32. The method of claim 22, wherein the disposing of the partition wall pattern and the opaque material pattern comprises:
- disposing the partition wall pattern on the first surface of the substrate such that at least a part of the first surface of the substrate is exposed; and
- disposing the opaque material pattern on the part of the first surface of the substrate exposed by the partition wall pattern.

33. The method of claim 32, wherein at least a part of the opaque material pattern overlaps the partition wall pattern.

34. The method of claim 22, further comprising, after the forming of the light-shielding member:
- exposing at least a part of the first surface of the substrate by removing at least a part of the opaque material pattern;
- disposing an ink composition onto the exposed first surface of the substrate, the ink composition containing a wavelength shift material; and
- curing the ink composition.

35. The method of claim 34, wherein the forming of the light-shielding member comprises:
- prebaking the light-shielding member forming composition;
- partially photo-curing the prebaked light-shielding member forming composition by using the opaque material pattern as a light-shielding mask;
- developing the light-shielding member disposed on the top surface and the side surfaces of the partition wall pattern by applying a developer onto the partially photo-cured light-shielding member forming composition; and
- hard-baking the light-shielding member, wherein the partially photo-curing of the prebaked light-shielding member forming composition comprises:
- radiating light from the second surface of the substrate;
- transmitting the light through the substrate;
- transmitting the light through the partition wall pattern;
- transmitting the light through the top surface of the partition wall pattern; and
- transmitting the light through the side surfaces of the partition wall pattern.

\* \* \* \* \*